(12) United States Patent
Clayton et al.

(10) Patent No.: US 10,614,389 B1
(45) Date of Patent: Apr. 7, 2020

(54) CASINO MANAGEMENT SYSTEM AND METHOD OF USE

(71) Applicant: Wynn Resorts Holdings, LLC, Las Vegas, NV (US)

(72) Inventors: Jay Dee Clayton, Macau (MO); Andre Mung Dick Ong, Taipa (MO); Bernadette Theresa Keefe, Macau (MO); Wayne Keung Hom, San Mateo, CA (US)

(73) Assignee: Wynn Resorts Holdings, LLC, Las Vegas, NV (US)

( * ) Notice: Subject to any disclaimer, the term of this patent is extended or adjusted under 35 U.S.C. 154(b) by 646 days.

(21) Appl. No.: 15/395,567

(22) Filed: Dec. 30, 2016

Related U.S. Application Data

(63) Continuation of application No. 12/895,405, filed on Sep. 30, 2010, now abandoned.

(51) Int. Cl.
| | |
|---|---|
| *G06Q 10/10* | (2012.01) |
| *G06Q 10/06* | (2012.01) |
| *G07F 17/32* | (2006.01) |
| *G06Q 40/00* | (2012.01) |
| *G06Q 20/10* | (2012.01) |
| *G06Q 30/02* | (2012.01) |

(52) U.S. Cl.
CPC ......... *G06Q 10/06* (2013.01); *G06Q 10/0639* (2013.01); *G06Q 10/06311* (2013.01); *G06Q 10/10* (2013.01); *G06Q 30/0208* (2013.01); *G06Q 30/0209* (2013.01)

(58) Field of Classification Search
None
See application file for complete search history.

(56) References Cited

U.S. PATENT DOCUMENTS

| | | | | |
|---|---|---|---|---|
| 6,514,140 | B1* | 2/2003 | Storch | G07F 1/06 463/13 |
| 7,878,909 | B2* | 2/2011 | Kessman | G06Q 10/1097 463/16 |
| 2006/0046839 | A1* | 3/2006 | Nguyen | G07F 17/32 463/25 |
| 2007/0060307 | A1* | 3/2007 | Mathis | G07F 17/32 463/25 |
| 2007/0155490 | A1* | 7/2007 | Phillips | G07F 17/32 463/29 |
| 2008/0058105 | A1* | 3/2008 | Combs | G07F 17/32 463/42 |
| 2010/0227675 | A1* | 9/2010 | Luxton | G07F 17/32 463/25 |
| 2012/0058818 | A1* | 3/2012 | Kelly | G07F 17/3239 463/25 |
| 2013/0196760 | A1* | 8/2013 | Patel | A63F 3/081 463/31 |

* cited by examiner

*Primary Examiner* — Yongjia Pan
(74) *Attorney, Agent, or Firm* — Brownstein Hyatt Farber Schreck, LLP

(57) ABSTRACT

A casino management system having a plurality of virtual workspaces. The intelligent virtual workspaces include storage and processing means. Graphical user interfaces displayed on monitors of the virtual workspaces are object oriented depicting objects which mimic real casino objects to create an intuitive environment allowing users to more efficiently and effectively undertake and complete casino tasks associated with the various workspace locations (e.g., gaming tables, cage, pit, etc.). The system is event and model driven.

18 Claims, 132 Drawing Sheets

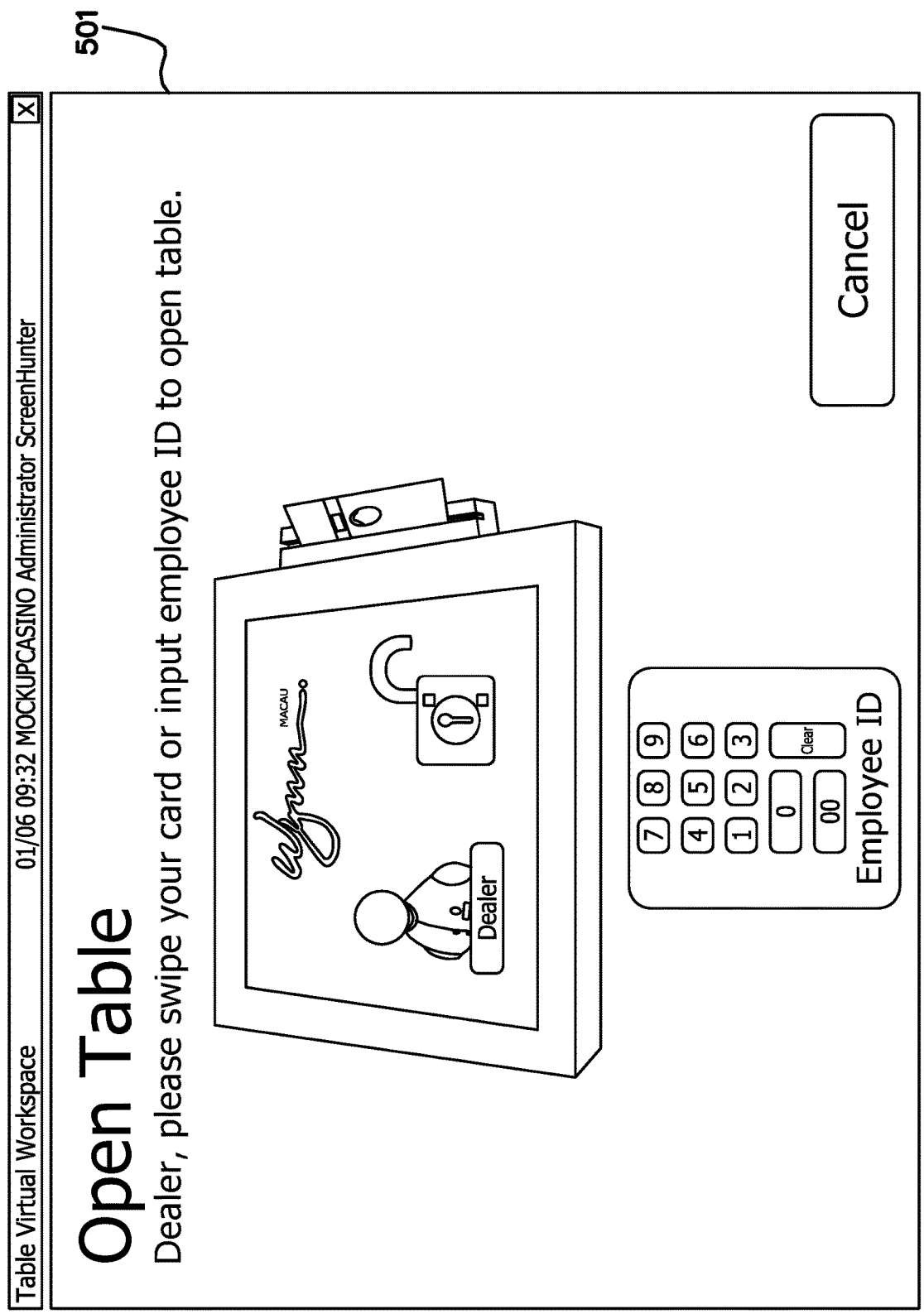

Open Table (Bottom Rack) 512

Please press each chip then specify count of chips.

HKD-Cash-1

Total Amount: 1,000,000 HKD

Close Table (Bottom Rack)

All chip sets below must be counted. Please choose a chip set to count or correct.

- HKD-Cash-1
- HKD-NN-1
- HKD-NN-2

515

Next △  Cancel

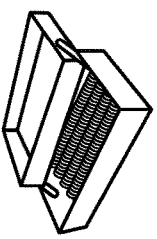
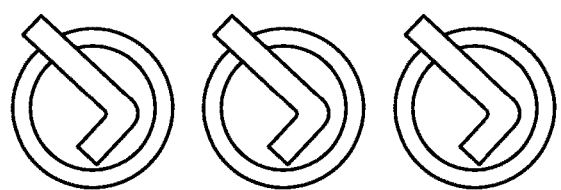
FIG. 5Q

Input DOC ID

Please input the last 4-digit number from DOC ID then press Next.

521

DOC ID:

Next △

Cancel

Table Virtual Workspace    01/06 09:51 MOCKUPCASINO Administrator ScreenHunter

FIG. 5V

Create Chip Fill

Please choose a chip set to fill.

- HKD-Cash-1
- HKD-NN-1
- HKD-NN-2

525

Cancel

Table Virtual Workspace — 01/06 09:39 MOCKUPCASINO Administrator ScreenHunter

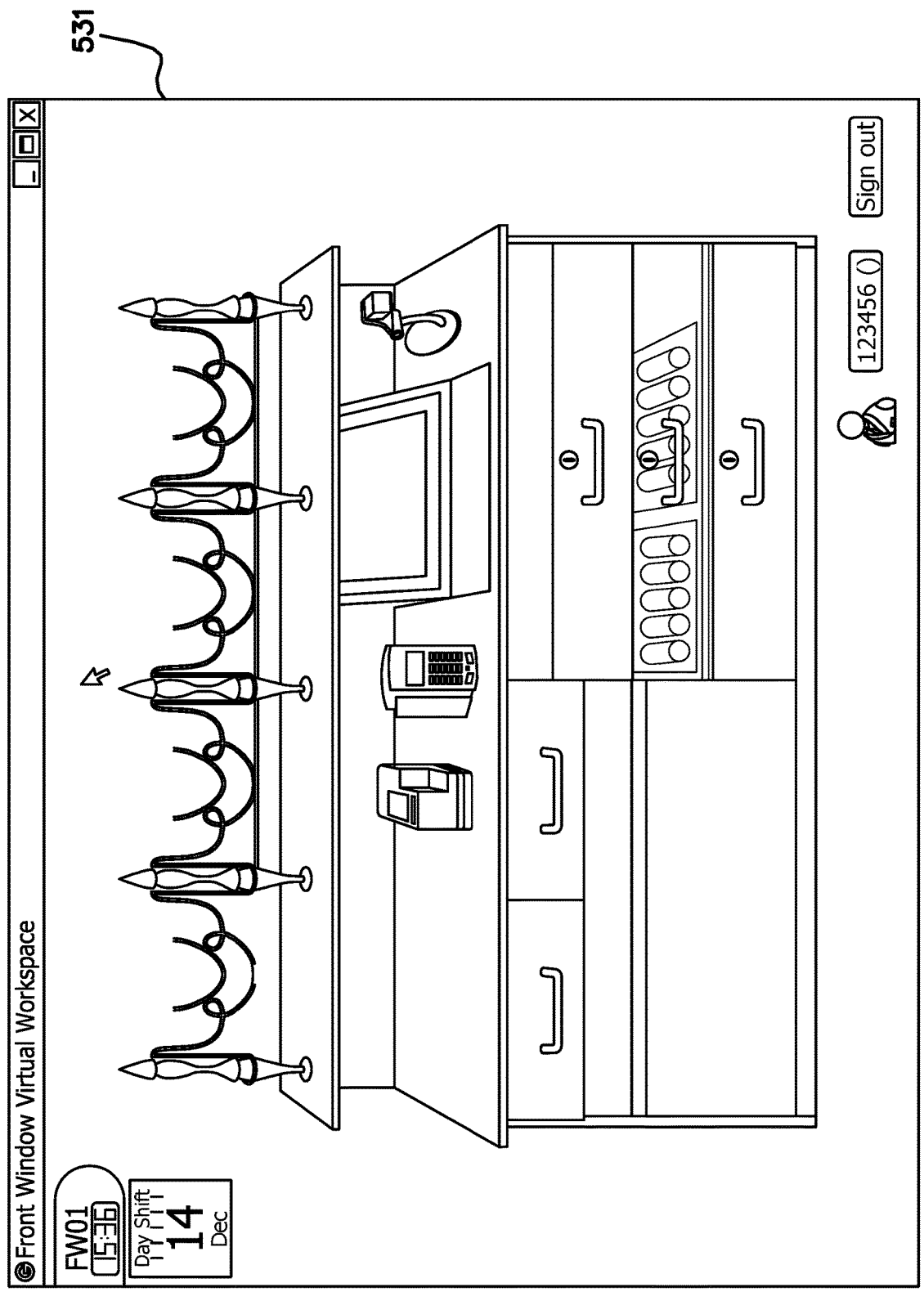

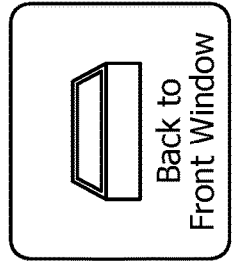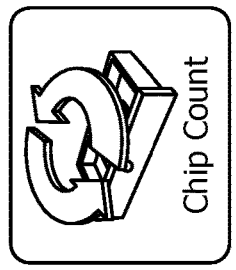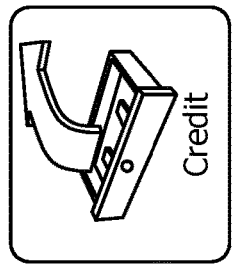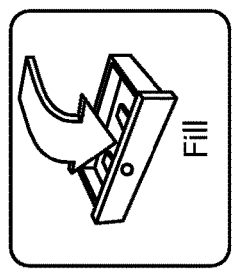
FIG. 6C

534

Create Chip Fill
Please choose a chip set then input count of chips.

○ Please choose a chip set:

HKD ▷   Cash ▷

NN ▷   HKD-NN-1   HKD-NN-2
       HKD-NN-3   HKD-NN-4

HKD-NN-1

○ Please input count of chips:

| Denomination | Count | Amount | Denomination | Count | Amount |
|---|---|---|---|---|---|
| $1,000,000 | 13 | 13,000,000 | $5,000 | 0 | 0 |
| $500,000 | 0 | 0 | $1,000 | 0 | 0 |
| $250,000 | 0 | 0 | | | |
| $100,000 | 0 | 0 | | | |
| $50,000 | 0 | 0 | | | |
| $10,000 | 0 | 0 | | | |

Total Amount: 13,000,000 HKD

[Next ▷]
[Cancel]

Chip Count for Unredeemed Chip Liability

Please choose a chip set to count or correct.

HKD-Cash-1
Please input count of chips.

| Denomination | Count | Amount | Denomination | Count | Amount |
|---|---|---|---|---|---|
| $1,000,000 | 12 | 12,000,000 | $5,000 | 0 | 0 |
| $500,000 | 0 | 0 | $1,000 | 0 | 0 |
| $250,000 | 0 | 0 | $500 | 0 | 0 |
| $100,000 | 0 | 0 | $100 | 0 | 0 |
| $50,000 | 0 | 0 | $25 | 0 | 0 |
| $10,000 | 0 | 0 | $5 | 0 | 0 |

Total Amount: 12,000,000 HKD

[OK] [Cancel]

[Next] [Cancel]

Chip Count for Unredeemed Chip Liability
Please choose a chip set to count or correct.

HKD-Cash-1
Please input count of chips.

| Denomination | Count | Amount | Denomination | Count | Amount |
|---|---|---|---|---|---|
| $1,000,000 | 12 | 12,000,000 | $5,000 | 6,555 | 32,775,000 |
| $500,000 | 50 | 25,000,000 | $1,000 | 32,212 | 32,212,000 |
| $250,000 | 50 | 12,500,000 | $500 | 0 | 0 |
| $100,000 | 21 | 2,100,000 | $100 | 2 | 200 |
| $50,000 | 855 | 42,750,000 | $25 | 2 | 50 |
| $10,000 | 534 | 5,340,000 | $5 | 222 | 1,110 |

Total Amount: 164,678,360 HKD

[OK] [Cancel]  [Next] [Cancel]

540

Chip Count for Unredeemed Chip Liability

Please review the chip inventory then click Confirm.

HKD

Date : 14-12-2007    Cage Shift : Day    Front Window : FW01    DOC ID : 1000 0002

541

| Denomination | HKD-Cash-1 | | HKD-NN-1 | | HKD-NN-2 | | HKD-NN-3 | |
|---|---|---|---|---|---|---|---|---|
| | Count | Amount (HKD) | Count | Amount (HKD) | Count | Amount (HKD) | Count | Amount (HKD) |
| $1,000,000 | 12 | 12,000,000 | 0 | 0 | 0 | 0 | 0 | 0 |
| $500,000 | 50 | 25,000,000 | 0 | 0 | 0 | 0 | 0 | 0 |
| $250,000 | 50 | 12,500,000 | 0 | 0 | 0 | 0 | 0 | 0 |
| $100,000 | 21 | 2,100,000 | 0 | 0 | 0 | 0 | 0 | 0 |
| $50,000 | 855 | 42,750,000 | 0 | 0 | 0 | 0 | 0 | 0 |
| $10,000 | 534 | 6,340,000 | 0 | 0 | 0 | 0 | 0 | 0 |
| $5,000 | 6,666 | 32,775,000 | 0 | 0 | 0 | 0 | 0 | 0 |
| $1,000 | 32,212 | 32,212,000 | 0 | 0 | 0 | 0 | 0 | 0 |
| $500 | 0 | 0 | | | | | | |
| $100 | 2 | 200 | | | | | | |
| $25 | 2 | 50 | | | | | | |
| $5 | 222 | 1,110 | | | | | | |
| TOTAL | HKD | 164,678,360 | HKD | 0 | HKD | 0 | HKD | 0 |
| Fill | | 0 | | | | 0 | | 0 |
| Credit | | 0 | | | | 0 | | 0 |

G Chip Bank Virtual Workspace

CB01 Ext.253

▽ 06-01-2008 △

▽ 06-01-2008 △
Jan                2008
| Sun | Mon | Tue | Wed | Thu | Fri | Sat |
|---|---|---|---|---|---|---|
|  |  | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 |  |  |

☐ Current Gaming Day:06-01-2008

Bank to Bank Transaction                    Reprint

| DOC ID | Request Location | Shift | Total Amount | Status |
|---|---|---|---|---|
| 90257 | 01BJ02 | Day | 200,000 HKD | Completed |
| 73597 | 01BJ02 | Day | 100,000 HKD | Completed |

☑ Sent Request

| Request Type | Requested Time | DOC ID | Location | Shift | Total Amount | Status |
|---|---|---|---|---|---|---|

[ Inventory ] [ Transfer In ] [ Transfer Out ]

[ OK ]

555

G Chip Bank Virtual Workspace

CB01 Ext.253

| 12-12-2007 ▽ | | | | | | | | Bank to Bank Transaction | | | | 🖨 Reprint |
|---|---|---|---|---|---|---|---|---|---|---|---|---|

△ 12-12-2007 △
Dec 2007

| Sun | Mon | Tue | Wed | Thu | Fri | Sat |
|---|---|---|---|---|---|---|
|  |  |  |  |  |  | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 |  |  |  |  |  |

☐ Current-Gaming Day: 12-12-2007

| DOC ID | Request Location | Shift | Total Amount | Status |
|---|---|---|---|---|
| 34268 | 01BJ02 | Day | 8,540,000 HKD | Completed |
| 29273 | PW01 | Day | 300,000 HKD | Completed |
| 65786 | 02BB01 | Day | 122,500 HKD | Completed |
| 22982 | 02BB01 | Day | 120,000 HKD | Completed |
| 96087 | 02BB01 | Day | 30,000 HKD | Completed |
| 53178 | CB02 | Day | 404,000 HKD | Completed |
| 41155 | PW01 | Day | 40,010,000 HKD | Completed |

Front Window 12-12-2007 16:17 70635825 27,500,000 HKD Completed

▽ △

☑ Sent Request

| Request Type | Requested Time | DOC ID | Location | Shift | Total Amount | Status |
|---|---|---|---|---|---|---|
| Bank to Bank | 12-12-2007 15:42 | 10824037 | CB02 | Day | 55,000,000 HKD | Completed |

▽ △

[ Inventory ] [ Transfer In ] [ Transfer Out ]

G Chip Bank Virtual Workspace

CB01 Ext.253

⑧ Received Request
Type: ☑ Fill  ☑ Credit  ☑ Bank to Bank Transaction
Status: ☑ Completed ☑ Voided

| Request Type | Requested Time | DOC ID | Request Location | Shift | Total Amount | Status |
|---|---|---|---|---|---|---|
| Table Fill | 12-12-2007 10:11 | 09134268 | 01BJ02 | Day | 8,540,000 HKD | Completed |
| Front Window | 12-12-2007 16:11 | 11629273 | PW01 | Day | 300,000 HKD | Completed |
| Table Fill | 12-12-2007 01:34 | 27165786 | 02BB01 | Day | 122,500 HKD | Completed |
| Table Credit | 12-12-2007 01:40 | 33122982 | 02BB01 | Day | 120,000 HKD | Completed |
| Table Credit | 12-12-2007 15:20 | 36196087 | 02BB01 | Day | 30,000 HKD | Completed |
| Table Fill | 12-12-2007 14:52 | 63353178 | CB02 | Day | 404,000 HKD | Completed |
| Bank to Bank.. | 12-12-2007 10:33 | 64841155 | CB02 | Day | 40,010,000 HKD | Completed |
| Front Window | 12-12-2007 16:17 | 70635825 | PW01 | Day | 27,500,000 HKD | Completed |

Reprint

④ Sent Request

| Request Type | Requested Time | DOC ID | Location | Shift | Total Amount | Status |
|---|---|---|---|---|---|---|
| Bank to Bank | 12-12-2007 15:42 | 10824037 | CB02 | Day | 55,000,000 HKD | Completed |

Inventory | Transfer In | Transfer Out

OK

Chip Bank Inventory

| Bank ID | Total Amount |
|---|---|
| CB01(Current CB) | 689,066,527,000 HKD |
| CB02 | 689,241,204,787 HKD |
| CB03 | 689,357,385,000 HKD |
| CB11 | 689,362,550,000 HKD |
| CB12 | 689,382,400,000 HKD |

558

Transaction

Cancel

*FIG. 71*

Chip Bank Virtual Workspace

Inventory

559

| HKD | MOP |
|---|---|

Date: 07-01-2008 10:27  Chip Bank Location: CB03 Ext.253  Cage Shift: Day

|  | HKD-NN-1 | | HKD-NN-2 | | HKD-NN-3 | |
|---|---|---|---|---|---|---|
| Denomination | Count | Amount (HKD) | Count | Amount (HKD) | Count | Amount (HKD) |
| $1,000,000 | 10,964 | 10,964,000,000 | 10,995 | 10,995,000,000 | 11,000 | 11,000,000,000 |
| $500,000 | 11,944 | 5,972,000,000 | 12,000 | 6,000,000,000 | 12,000 | 6,000,000,000 |
| $250,000 | 24,000 | 6,000,000,000 | 24,000 | 6,000,000,000 | 24,000 | 6,000,000,000 |
| $100,000 | 12,032 | 1,203,200,000 | 12,000 | 1,200,000,000 | 12,000 | 1,200,000,000 |
| $50,000 | 13,000 | 650,000,000 | 13,000 | 650,000,000 | 13,000 | 650,000,000 |
| $10,000 | 40,620 | 406,200,000 | 41,000 | 410,000,000 | 41,000 | 410,000,000 |
| $5,000 | 11,560 | 57,800,000 | 13,000 | 65,000,000 | 13,000 | 65,000,000 |
| $1,000 | 51,700 | 51,700,000 | 52,000 | 52,000,000 | 52,000 | 52,000,000 |
| $500 |  |  |  |  |  |  |
| $100 |  |  |  |  |  |  |
| $25 |  |  |  |  |  |  |
| $5 |  |  |  |  |  |  |
| TOTAL |  |  |  |  |  |  |

Total Amount: 275,083,947,000 HKD  Total Amount: 318,500,000 MOP

Chip Bank Shift Rolling

All chip sets below must be counted. Please choose one to count or correct.

○ Please choose a chip set:

HKD ▽    NN ▽    HKD-NN-1    HKD-NN-2

MOP ▽    Cash ▽    HKD-NN-3    HKD-NN-4

HKD-NN-1

○ Please input count of chips:

| Denomination | Count | Amount | Denomination | Count | Amount |
|---|---|---|---|---|---|
| $1,000,000 | 0 | 0 | $5,000 | 0 | 0 |
| $500,000 | 0 | 0 | $1,000 | 0 | 0 |
| $250,000 | 0 | 0 | | | |
| $100,000 | 0 | 0 | | | |
| $50,000 | 0 | 0 | | | |
| $10,000 | 0 | 0 | | | |

Total Amount: 0 HKD

Next ▷    Cancel

Chip Bank Shift Rolling

All chip sets below must be counted. Please choose one to count or correct.

○ Please choose a chip set:

HKD ▽   NN ▽

MOP ▽   Cash ▽   HKD-Cash-1

HKD-Cash-1

○ Please input count of chips:

| Denomination | Count | Amount | Denomination | Count | Amount |
|---|---|---|---|---|---|
| $1,000,000 | 0 | 0 | $5,000 | 0 | 0 |
| $500,000 | 0 | 0 | $1,000 | 0 | 0 |
| $250,000 | 0 | 0 | $500 | 0 | 0 |
| $100,000 | 0 | 0 | $100 | 0 | 0 |
| $50,000 | 0 | 0 | $25 | 0 | 0 |
| $10,000 | 0 | 0 | $5 | 0 | 0 |

Total Amount: 0 HKD

Next △

Cancel

FIG. 7M

Chip Bank Shift Rolling

All chip sets below must be counted. Please choose one to count or correct.

○ Please choose a chip set:

[HKD ▽] [NN ▽]

[MOP ▽] [Cash ▽]

[HKD-Cash-1]

HKD-Cash-1

○ Please input count of chips:

| Denomination | Count | Amount | Denomination | Count | Amount |
|---|---|---|---|---|---|
| $1,000,000 | 0 | 0 | $5,000 | 0 | 0 |
| $500,000 | 0 | 0 | $1,000 | 0 | 0 |
| $250,000 | 0 | 0 | $500 | 0 | 0 |
| $100,000 | 0 | 0 | $100 | 0 | 0 |
| $50,000 | 0 | 0 | $25 | 0 | 0 |
| $10,000 | 0 | 0 | $5 | 0 | 0 |

Total Amount: [0] HKD

[Next △]  [Cancel]

Accept Variance of Chip Bank Shift Rolling

Please review the variance of the chip set inventory then click Roll.

Date: 07-01-2008    Cage Shift: Morning    Chip Bank: CB01    DOC ID: 8811 7806

| Denomination | HKD-NN-1 Manual | System | Variance | HKD-NN-2 Manual | System | Variance | HKD-NN-3 Manual | System | Variance | HKD-NN-4 Manual | System | Variance |
|---|---|---|---|---|---|---|---|---|---|---|---|---|
| $1,000,000 | 0 | 0 | -10964 | 0 | 0 | -10995 | 0 | 0 | -11000 | 0 | 0 | -11000 |
| $500,000 | 0 | 0 | -11944 | 0 | 0 | -12000 | 0 | 0 | -12000 | 0 | 0 | -12000 |
| $250,000 | 0 | 0 | -24000 | 0 | 0 | -24000 | 0 | 0 | -24000 | 0 | 0 | -24000 |
| $100,000 | 0 | 0 | -12032 | 0 | 0 | -12000 | 0 | 0 | -12000 | 0 | 0 | -12000 |
| $50,000 | 0 | 0 | -13000 | 0 | 0 | -13000 | 0 | 0 | -13000 | 0 | 0 | -13000 |
| $10,000 | 0 | 0 | -40620 | 0 | 0 | -41000 | 0 | 0 | -41000 | 0 | 0 | -41000 |
| $5,000 | 0 | 0 | -11660 | 0 | 0 | -13000 | 0 | 0 | -13000 | 0 | 0 | -13000 |
| $1,000 | 0 | 0 | -51700 | 0 | 0 | -52000 | 0 | 0 | -52000 | 0 | 0 | -52000 |
| $500 | | | | | | | | | | | | |
| $100 | | | | | | | | | | | | |
| $25 | | | | | | | | | | | | |
| $5 | | | | | | | | | | | | |
| TOTAL HKD | | | 0 | HKD | | 0 | HKD | | 0 | HKD | | 0 |

[Roll]  [Cancel]

Create Outside Location Transfer In Request

Please choose a chip set then input count of chips.

○ Please choose a chip set:

| HKD ▷ | Cash ▷ | HKD-Cash-1 |
|---|---|---|
| | NN ▷ | |

HKD-Cash-1

○ Please input count of chips:

| Denomination | Count | Amount | Denomination | Count | Amount |
|---|---|---|---|---|---|
| $1,000,000 | 10 | 10,000,000 | $5,000 | 0 | 0 |
| $500,000 | 0 | 0 | $1,000 | 0 | 0 |
| $250,000 | 0 | 0 | $500 | 0 | 0 |
| $100,000 | 0 | 0 | $100 | 0 | 0 |
| $50,000 | 0 | 0 | $25 | 0 | 0 |
| $10,000 | 0 | 0 | $5 | 0 | 0 |

Total Amount: 10,000,000 HKD

△ ▽  Next △

Cancel

G Chip Bank Virtual Workspace

FIG. 7S

Create Outside Location Transfer In Request

Please review outside location transfer in receipt then press Next.

569

G Chip Bank Virtual Workspace _ □ X

Wynn Macau       DOC ID: 00736275

Outside Location
Transfer In

Request Location CB01
                 Location:

Date 07-01-2008 10:46
Cage Shift: Day

Chip Type            Denomination    Qty
HKD 1000000 Cash-1   $ 1,000,000     10   HK $10,000,000

[HKD]10,000,000

△ ▽
Next
Cancel

G Chip Bank Virtual Workspace

CB01 Ext.253

Day Shift 7 Jan

☐ Received Request  ☑ Sent Request  ☐ Current shift History

DOC ID:

| Request Type | Requested Time | DOC ID | Location | Total Amount | Status |
|---|---|---|---|---|---|
| Outside Tra... | 10:46 07-01-2008 | 00736275 | | 10,000,000 HKD | Submitted for 0 min |

Reprint
Void
Complete

Chip Bank Inventory
Outside Transfer In
Outside Transfer Out peter sam 0
Sign in
Sign out

Income Control Virtual Workspace-Build 1.0.3040.31485

5 Opener  4/29/2008

Filter Transactions:
Pit: All   Table ID: All
Adjusted: ☑ Yes ☑ No   Accepted: ☑ Yes ☑ No

| Pit | Table ID | DOC ID | Total Amount(HKD) | Total AMount(MOP) | Opener Variance (HKD) | Opener Variance (MOP) |
|---|---|---|---|---|---|---|
| Pit01... | 01BB06 | 90300022 | 0 | 0 | | |
| Pit01... | 01BB07 | 90300031 | 0 | 0 | | |
| Pit04 | 04BB01 | 90300017 | 1,533,555 | 0 | 4,000 | |
| Pit92 | 92VB02 | 90300023 | 0 | 0 | (5,555) | |
| Pit92 | 92VB01 | 90300024 | 0 | 0 | | |

585

Details

| | | |
|---|---|---|
| ▼HKD | | 1,533,555 HKD |
| ▼HKD-Cash-1 | | 1,533,555 HKD |
| Denomination | Count | Amount |
| $1,000,000 | 0 | 0 HKD |
| $500,000 | 0 | 0 HKD |
| $250,000 | 0 | 0 HKD |
| $100,000 | 0 | 0 HKD |
| $50,000 | 0 | 0 HKD |
| $10,000 | 100 | 1,000,000 HKD |
| $5,000 | 80 | 400,000 HKD |
| $1,000 | 80 | 80,000 HKD |
| $500 | 80 | 40,000 HKD |
| $100 | 80 | 8,000 HKD |
| $25 | 0 | 0 HKD |
| $5 | 1,111 | 5,555 HKD |
| ▼HKD-Cash-2 | | 0 HKD |
| Denomination | Count | Amount |
| $1,000 | 0 | 0 HKD |
| $500 | 0 | 0 HKD |
| ▼HKD-NN-1 | | 3,000,000 HKD |
| Denomination | Count | Amount |
| $1,000,000 | 0 | 0 HKD |
| $500,000 | 0 | 0 HKD |
| $250,000 | 0 | 0 HKD |
| $100,000 | 0 | 0 HKD |
| $50,000 | 0 | 0 HKD |
| $10,000 | 0 | 0 HKD |
| $5,000 | 0 | 0 HKD |
| $1,000 | 0 | 0 HKD |
| ▼HKD-NN-2 | | 0 HKD |

Sum of Total Amount (Filtered Transactions): 1,533,555 HKD   0 MOP

FIG. 8F

Income Control Virtual Workspace-Build 1.0.3040.31485

Closer 4/29/2008

Filter Transactions:
- Pit: All
- Table ID: All
- Adjusted: ☑ Yes ☑ No
- Accepted: ☑ Yes ☑ No

| Pit | Table ID | DOC ID | Total Amount(HKD) | Total AMount(MOP) | Adjusted | Accepted |
|---|---|---|---|---|---|---|
| Pit0... | 01BB06 | 90300827 | 3,920,000 | 0 | | |
| Pit04 | 04BB01 | 90300028 | 1,316,000 | 0 | | |
| Pit92 | 92VB02 | 90300032 | 10,116,500 | 0 | | |
| Pit92 | 92VB01 | 90300033 | 6,865,200 | 0 | | |

Details — 586

| ▼HKD | | 3,920,000 HKD |
|---|---|---|
| ▼HKD-Cash-1 | | 920,000 HKD |
| Denomination | Count | Amount |
| $1,000,000 | 0 | 0 HKD |
| $500,000 | 0 | 0 HKD |
| $250,000 | 0 | 0 HKD |
| $100,000 | 0 | 0 HKD |
| $50,000 | 60 | 600,000 HKD |
| $10,000 | 60 | 300,000 HKD |
| $5,000 | 0 | 0 HKD |
| $1,000 | 0 | 0 HKD |
| $500 | 200 | 20,000 HKD |
| $100 | 0 | 0 HKD |
| $25 | 0 | 0 HKD |
| $5 | 0 | 0 HKD |
| ▼HKD-Cash-2 | | 0 HKD |
| Denomination | Count | Amount |
| $1,000 | 0 | 0 HKD |
| $500 | 0 | 0 HKD |
| ▼HKD-NN-1 | | 3,000,000 HKD |
| Denomination | Count | Amount |
| $1,000,000 | 0 | 0 HKD |
| $500,000 | 0 | 0 HKD |
| $250,000 | 0 | 0 HKD |
| $100,000 | 30 | 3,000,000 HKD |
| $50,000 | 0 | 0 HKD |
| $10,000 | 0 | 0 HKD |
| $5,000 | 0 | 0 HKD |
| $1,000 | 0 | 0 HKD |
| ▼HKD-NN-2 | | 0 HKD |

Buttons: Accept, Reprint, Adjustment, Accept All, Add, Export To Excel, Save to Main Screen

Sum of Total Amount (Filtered Transactions): 22,217,700 HKD  0 MOP

Legend: Adjusted, Added

| Pit | Table ID | Drop Box Collected Time | Actual Cash Drop (HKD) | Actual Cash Drop (MOP) | Adjusted | Accepted |
|---|---|---|---|---|---|---|
| Pi... | 01BB06 | 11:14 AM 4/30/2... | 0 | 0 | | |
| Pi... | 01BB07 | 3:39 PM 4/29/2008 | | | | |
| Pi... | 04BB01 | 11:21 AM 4/30/2... | 0 | 0 | | |
| Pi... | 92VB02 | 9:35 AM 4/30/2008 | 0 | 0 | | |
| Pi... | 92VJ01 | 9:41 AM 4/30/2008 | 0 | 0 | | |

589

Actual Total Amount Details

Sum of Total Amount (Filtered Cash Drops): 0 HKD  0 MOP

Legend: Adjusted

FIG. 8J

| Income Control Virtual Workspace-Build 1.0.3040.31485 | | | | | | | _ □ X |
|---|---|---|---|---|---|---|---|
| ⑤ Voucher Drop 4/29/2008 | | | | | | ⊠ Accept | 📄 Adjustment |
| Filter Voucher Drops: | | | | | | | |
| Pit: All ▽  Table ID: All ▽ | | | | | | | |
| Adjusted: ☑ Yes ☑ No  Accepted: ☑ Yes ☑ No | | | | | | | |

| Pit | Table ID | Drop Box Collected Time | Total Amount | Adjusted | Accepted | 590 Actual Total Amount Details | | | ○ Import  ✓✓ Accept All  📤 Export To Excel  💾 Save to Main Screen |
|---|---|---|---|---|---|---|---|---|---|
| Pi... | 01BB06 | 11:14 AM 4/30/2... | 0 | | | | | | |
| Pi... | 01BB07 | 3:39 PM 4/29/2008 | 0 | | | | | | |
| Pi... | 04BB01 | 11:21 AM 4/30/2... | 0 | | | | | | |
| Pi... | 92VB02 | 9:35 AM 4/30/2008 | 0 | | | | | | |
| Pi... | 92VJ01 | 9:41 AM 4/30/2008 | 0 | | | | | | |

Sum of Total Amount (Filtered Voucher Drops):
[ 0 ] HKD

Legend: [ ] Adjusted

Income Control Virtual Workspace

11:40  Accounting Period 26/27 Dec

| Transactions | Status | Accounting Period |

Table ID: All

Table Status: ☑ Drop Box Not Yet Changed
☑ Drop Box Changed
☑ Auditing
☑ Accepted

| Pit | Table ID | Status |
|-----|----------|--------|
| All | 01BJ11 | Drop Box Not Yet Changed |
| 01 | | |

Total Drop Boxes: 1

1 peter chan ()  Sign out

591

Add Cash Drop

Please press a commonly used value or input by number pad.

603

55,000 HKD

| +100 | +500 |
| +1000 | +5000 |
| +10000 | +50000 |

| 7 | 8 | 9 |
| 4 | 5 | 6 |
| 1 | 2 | 3 |
| 0 | 00 |

History  Clear  Confirm  Cancel

Total Amount: 55,000 HKD

*FIG. 9D*

Add Cash Drop

Please press a commonly used value or input by number pad.

605

| | | | | |
|---|---|---|---|---|
| 7 | 8 | 9 | | History |
| 4 | 5 | 6 | | Clear |
| 1 | 2 | 3 | | Confirm |
| 0 | 00 | | | Cancel |

0 HKD

| +100 | +500 |
| +1000 | +5000 |
| +10000 | +50000 |

Total Amount: 55,000 HKD

*FIG. 9F*

Cash Drop History

Please choose one of the following cash drops to edit.

607

| 09:52 | 50,000 HKD |
| 09:50 | 55,000 HKD |

Edit

▽

Cancel

Total Amount: 105,000 HKD

*FIG. 9H*

Table Virtual Workspace - Build 1.0.3040.31485

Cash Drop History
Please choose one of the following cash drops to edit.

608

09:52  [ 50,000 HKD ]

09:50  [ 55,000 HKD ]

[ Edit ]

▽

[ Cancel ]

Total Amount: [ 105,000 ] HKD

*FIG. 9I*

Edit Cash Drop

Please press a commonly used value or input by number pad to edit cash drop.

09:50

[60,000] HKD

609

| 7 | 8 | 9 | Clear | Confirm |
| 4 | 5 | 6 | | |
| 1 | 2 | 3 | 0 | Cancel |
| ▽ | | | 00 | |

+100   +500
+1000  +5000
+10000 +50000

Total Amount: [110,000] HKD

Table Virtual Workspace - Build 1.0.3040.31485

Rack Count
Please select a reason to do rack count.

622

Periodic rack count

Other

Cancel

Rack Count (Top Rack) *626*

Please press the chip that needs modification then specify its new count.

HKD-Cash-1

Total Amount: 5,444,600 HKD

*FIG. 10G*

Rack Count

627

Please choose a chip set to count or correct.

Top Rack: 5,444,600 HKD

- HKD-Cash-1 — 5,444,600 HKD
- Non-configured Chips

Bottom Rack: 6,965,400 HKD

- HKD-Cash-1 — 6,965,400 HKD
- Non-configured Chips

Rack Total: 12,410,000 HKD

[Confirm] [Cancel]

*FIG. 10H*

Rack Count

Please choose a chip set to count or correct.

630

Top Rack: 5,444,600 HKD

| HKD-Cash-1 | Non-configured |
| 5,444,600HKD | Chips |

Bottom Rack: 4,979,800 HKD

| HKD-Cash-1 | Non-configured |
| 4,979,800HKD | Chips |

Rack Total: 10,424,400 HKD

▽  Confirm
    Cancel

Table Virtual Workspace - Build 1.0.3040.31485

*FIG. 11A*

Approve Adding Non-configured Chips

Non-configured chips are going to be added to the table.

Assista[nt ... ap]prove.

HKD-NN-1: 600,000 HKD

636

Employee ID

Figure 12B:
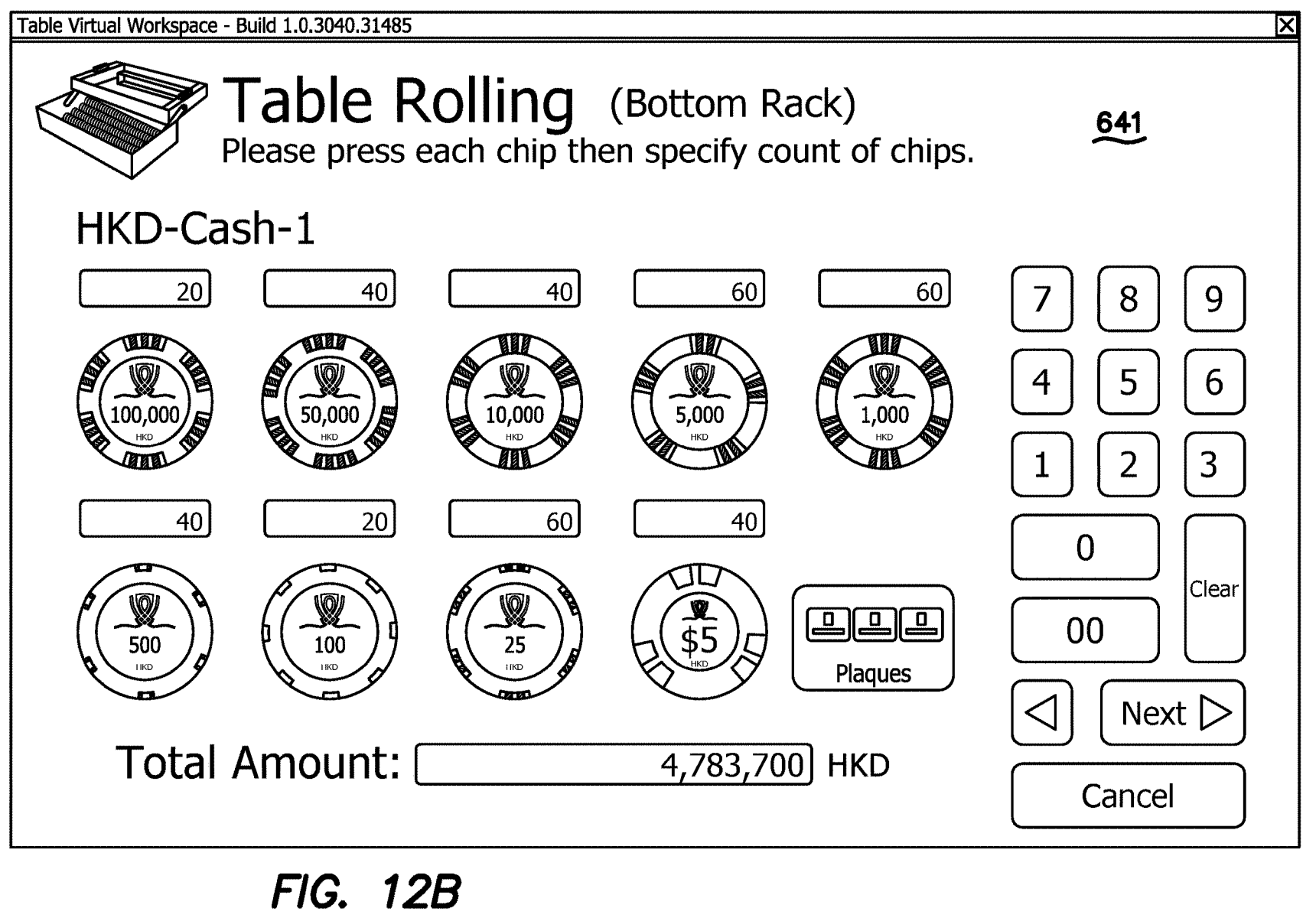

Table Rolling (Bottom Rack) 641

Please press each chip then specify count of chips.

HKD-Cash-1

| Chip | Count |
|---|---|
| 100,000 HKD | 20 |
| 50,000 HKD | 40 |
| 10,000 HKD | 40 |
| 5,000 HKD | 60 |
| 1,000 HKD | 60 |
| 500 HKD | 40 |
| 100 HKD | 20 |
| 25 HKD | 60 |
| $5 HKD | 40 |

Plaques

Total Amount: 4,783,700 HKD

Keypad: 7 8 9 / 4 5 6 / 1 2 3 / 0 00 / Clear / △ ▽ / Next △ / Cancel

Table Rolling (Bottom Rack)

643

Please review rack inventory then press Next.

Table Closer
Date: 4/30/2008 9:24 AM     Location: 92VB02
Gaming Day 4/29/2008
Bottom Rack
HKD-Cash-1

| Denomination | Qty | Amount |
|---|---|---|
| $1,000,000 | 0 | 0 |
| $500,000 | 0 | 0 |
| $250,000 | 0 | 0 |
| $100,000 | 20 | $2,000,000 |
| $50,000 | 40 | $2,000,000 |
| $10,000 | 40 | $400,000 |
| $5,000 | 60 | $300,000 |
| $1,000 | 60 | $60,000 |
| $500 | 40 | $20,000 |
| $100 | 20 | $2,000 |
| $25 | 60 | $1,500 |
| $5 | 40 | $200 |
| Total | | $4,783,700 |

[HKD] 4,783,700

FIG. 12D

Table Rolling (Top Rack)

All chip sets below must be counted. Please choose a chip set to count or correct.

Table Virtual Workspace - Build 1.0.3040.31485

☒

Next △

Cancel

HKD-Cash-1

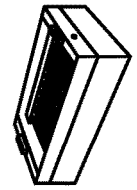
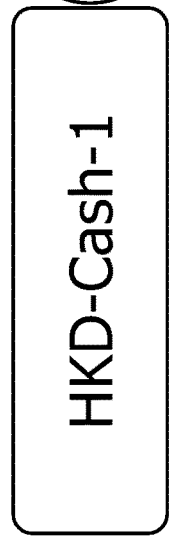
FIG. 12H

Table Rolling (Top Rack)

648

Please review rack inventory then press Next.

Table Closer
Date: 4/30/2008 9:26AM    Location: 92VB02
Gaming Day 4/29/2008

Top Rack
HKD-Cash-1

| Denomination | Qty | Amount |
|---|---|---|
| $1,000,000 | 0 | 0 |
| $500,000 | 0 | 0 |
| $250,000 | 0 | 0 |
| $100,000 | 40 | $4,000,000 |
| $50,000 | 20 | $1,000,000 |
| $10,000 | 20 | $200,000 |
| $5,000 | 20 | $100,000 |
| $1,000 | 20 | $20,000 |
| $500 | 20 | $10,000 |
| $100 | 20 | $2,000 |
| $25 | 20 | $500 |
| $5 | 60 | $300 |
| Total | | $5,332,800 |

[HKD] 5,332,800

FIG. 12I

Rack Inventory — 92VJ01 Win/Loss (HKD K) 660
| | Opener | Fill | Credit | Rack Inventory | Cash Drop | Win/Loss | Hold (%) |
|---|---|---|---|---|---|---|---|
| | | | | Latest | | | |
| Latest TOTAL | 6,865 | 0 | 0 | 6,865 | 0 | 0 | N/A |
| Since LAST | 6,865 | 0 | 0 | 6,865 | 0 | 0 | N/A |
| | | | | Confirmed | | | |
| Confirmed TOTAL | 6,865 | 0 | 0 | 6,865 | 0 | 0 | N/A |
| | | | | | | | |
| OPEN 09:40 | 6,865 | 0 | 0 | 6,865 | 0 | 0 | N/A |
Buttons: Fill 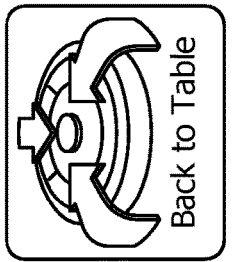, Credit 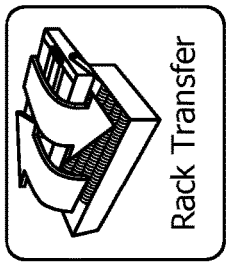, Rack Count 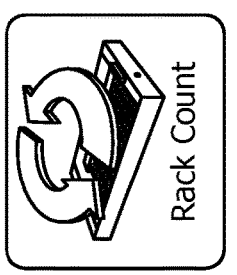, Rack Transfer 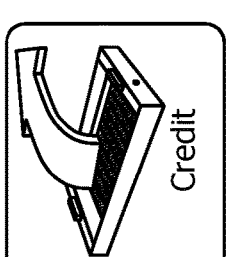, Back to Table 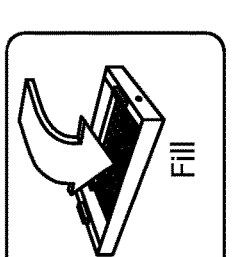
FIG. 13A

Rack Inventory — 92VJ01 Win/Loss(HKD K)  _662_

| | Opener | Fill | Credit | Rack Inventory | Cash Drop | Win/Loss | Hold (%) |
|---|---|---|---|---|---|---|---|
| Latest | | | | | | | |
| Latest TOTAL | 6,865 | 1,335 | 320 | 13,425 | 105 | 5,650 | 5380.76% |
| Since LAST | 12,410 | 1,335 | 320 | 13,425 | 105 | 105 | 100.00% |
| Confirmed | | | | | | | |
| Confirmed TOTAL | 6,865 | 0 | 0 | 12,410 | 0 | 5,545 | N/A |
| LAST 09:45 | 6,865 | 0 | 0 | 12,410 | 0 | 5,545 | N/A |
| OPEN 09:40 | 6,865 | 0 | 0 | 6,865 | 0 | 0 | N/A |

Fill | Credit | Rack Count | Rack Transfer | Back to Table

FIG. 13C

Rack Inventory — 92VJ01 Win/Loss(HKD K) 663

| | Opener | Fill | Credit | Rack Inventory | Cash Drop | Win/Loss | Hold (%) |
|---|---|---|---|---|---|---|---|
| Latest TOTAL | 6,865 | 1,335 | 320 | 13,424 | 105 | 5,650 | 5380.57% |
| Since LAST | 13,424 | 0 | 0 | 13,424 | 0 | 0 | N/A |
| Confirmed TOTAL | 6,865 | 1,335 | 320 | 13,424 | 105 | 5,650 | 5380.57% |
| LAST 10:00 | 12,410 | 1,335 | 320 | 13,424 | 105 | 105 | 99.81% |
| 09:45 | 6,865 | 0 | 0 | 12,410 | 0 | 5,545 | N/A |
| OPEN 09:40 | 6,865 | 0 | 0 | 6,865 | 0 | 0 | N/A |

Fill | Credit | Rack Count | Rack Transfer | Back to Table

*FIG. 13D*

Table Virtual Workspace - Build 1.0.3040.31485

Rack Inventory

92VJ01 Win/Loss(HKD K) 664

| | Opener | Fill | Credit | Rack Inventory | Cash Drop | Win/Loss | Hold (%) |
|---|---|---|---|---|---|---|---|
| Latest | | | | | | | |
| Latest TOTAL | 6,865 | 1,335 | 320 | 10,424 | 105 | 2,650 | 2523.42% |
| Since LAST | 10,424 | 0 | 0 | 10,424 | 0 | 0 | N/A |
| Confirmed | | | | | | | |
| Confirmed TOTAL | 6,865 | 1,335 | 320 | 10,424 | 105 | 2,650 | 2523.42% |
| LAST 10:00 | 13,424 | 0 | 0 | 10,424 | 0 | (3,000) | N/A |
| 10:00 | 12,410 | 1,335 | 320 | 13,424 | 105 | 105 | 99.81% |
| 09:45 | 6,865 | 0 | 0 | 12,410 | 0 | 5,545 | N/A |
| OPEN 09:40 | 6,865 | 0 | 0 | 6,865 | 0 | 0 | N/A |

Fill | Credit | Rack Count | Rack Transfer | Back to Table

*FIG. 13E*

Pit Podium Virtual Workspace - Build 1.0.3040.31485

Wynn Macau | Cash Drop (HKD K): 110 | Win/Loss (HKD K): 3,355

671

Current Gaming Day: 29-Apr | New Gaming Day: 30-Apr

Type: ○ Property View  ● Business Section View  ○ Zone View  ○ Pit View  ○ Area View  ○ Table View Filter: VIP Gaming | ▶ All Zones | ▶ All Pits | ▶ All Areas | ▶ All Tables

● HKD  ○ USD

VIPGaming Opener Variance: 100

|  |  | Opener | Fill | Credit | Rack Inventory | Cash Drop | Win/Loss | Hold (%) |
|---|---|---|---|---|---|---|---|---|
|  | Lastest TOTAL | 16,982 | 1,335 | 320 | 21,241 | 110 | 3,355 | 3,049.64% |
|  | Since LAST | 21,241 | 0 | 0 | 21,241 | 0 | 0 | N/A |
|  | Confirmed TO | 16,982 | 1,335 | 320 | 21,241 | 110 | 3,355 | 3,049.64% |
| Chairman's • | Since LAST | 21,241 | 0 | 0 | 21,241 | 0 | 0 | N/A |
|  | Confirmed TO | 16,982 | 1,335 | 320 | 21,241 | 110 | 3,355 | 3,049.64% |
|  | LAST 11:00 | 20,641 | 0 | 0 | 20,641 | 0 | 600 | N/A |
|  | OPEN 10:00 | 16,982 | 1,335 | 320 | 20,641 | 110 | 2,755 | 2,504.18% |

Legend: ○ Drop Box Not Changed

☐ View Reports ⓘ      ○ Refresh (F5)  Last Refresh 10:09 AM

PM_1 (999329)  Sign out

Pit Podium Virtual Workspace - Build 1.0.3040.31485

| | Wynn Macau | Cash Drop (HKD K) | Win/Loss (HKD K) |
|---|---|---|---|
| | 675 | 110 | 3,355 |

Current Gaming Day: 29-Apr | New Gaming Day: 30-Apr

Type: ○ Property View  ○ Business Section View  ○ Zone View  ○ Pit View  ○ Area View  ● Table View Filter: (VIP Gaming) ⊙ Chairman's ⊙ Pit92 ⊙ CMS Room 1 ⊙ 92VJ01

◉ HKD   ○ USD

| | Opener | Fill | Credit | Rack Inventory | Cash Drop | Win/Loss | Hold (%) |
|---|---|---|---|---|---|---|---|
| Lastest TOTAL | 6,865 | 1,335 | 320 | 11,024 | 110 | 3,255 | 2,958.73% |
| Since LAST | 11,024 | 0 | 0 | 11,024 | 0 | 0 | N/A |
| Confirmed TOTAL | 6,865 | 1,335 | 320 | 11,024 | 110 | 3,255 | 2,958.73% |
| LAST 10:04 | 10,424 | 0 | 0 | 11,024 | 0 | 600 | N/A |
| 10:00 | 13,424 | 0 | 0 | 10,424 | 0 | (3,000) | N/A |
| 10:00 | 12,410 | 1,335 | 320 | 13,424 | 110 | 110 | 99.82% |
| 09:45 | 6,865 | 0 | 0 | 12,410 | 0 | 5,545 | N/A |
| OPEN 09:40 | 6,865 | 0 | 0 | 6,865 | 0 | 0 | N/A |

| Signed In | | | Signed In Time |
|---|---|---|---|
| Dealer | 999101 | Dealer1 | 11:57 |
| Supervisor | 999102 | Supervisor1 | 11:57 |

Legend: ○ Drop Box Not Changed

☐ View Reports ⊙

○ Refresh (F5)
  Last Refresh 10:11 AM

[ PM_1 (999329) ] [ Sign out ]

CASINO MANAGEMENT SYSTEM AND METHOD OF USE

CROSS-REFERENCE TO RELATED APPLICATION

This application is a continuation patent application of U.S. patent application Ser. No. 12/895,405, filed Sep. 30, 2010, and titled "Casino Management System and Method of Use," the disclosure of which is hereby incorporated herein by reference in its entirety.

FIELD OF THE INVENTION

The embodiments of the present invention relate to a casino management system and method of using the same.

BACKGROUND

Casinos have become more technologically advanced over the years. As such, most casinos now utilize software-driven casino management systems to monitor many casino operations including table games, electronic games, player tracking, surveillance, marketing and the like. Despite the number of casino management systems available, there are drawbacks associated with each.

Therefore, it would be advantageous to create an improved casino management system which overcomes the drawbacks of the available systems including, but not limited to, ease of use and expansion while minimizing training time.

SUMMARY

Accordingly, a first embodiment of the present invention is a casino management system comprising: a central computer comprising one or more servers, said central computer configured to run executable instructions in the form of casino management software; a series of virtual workspaces configured to communicate with said central computer and one another, said workspaces including at least a monitor, storage and processing power; and object oriented user interfaces presentable to users via said workspace monitors, said object oriented user interfaces depicting objects which mimic corresponding actual casino operations objects and providing an intuitive environment for users to perform casino services.

Another embodiment of the present invention is a casino management system comprising: A casino management system comprising: one or more servers running casino management software; a series of workspaces including at least a user interface, storage, monitor and processing power, said workspaces configured to communicate with said one or more servers, said user interface configured to permit users to interact with graphical user interfaces wherein said graphical user interfaces depict objects which mimic corresponding actual casino operations objects and providing an intuitive environment for users to perform casino services via said workspaces.

Another embodiment of the present invention is a casino management method comprising: running executable instructions in the form of casino management software on a central computer formed of one or more servers; communicatively linking a series of virtual workspaces with said central computer and one another, said workspaces including at least a monitor, storage, user interface and processing power; and presenting to users object oriented graphical user interfaces presentable via said workspace monitors, said object oriented graphical user interfaces depicting objects which mimic corresponding actual casino operations objects and providing an intuitive environment for users to perform casino services via said workspaces.

Other variations, embodiments and features of the present invention will become evident from the following detailed description, drawings and claims.

BRIEF DESCRIPTION OF THE DRAWINGS

Figure 6I:
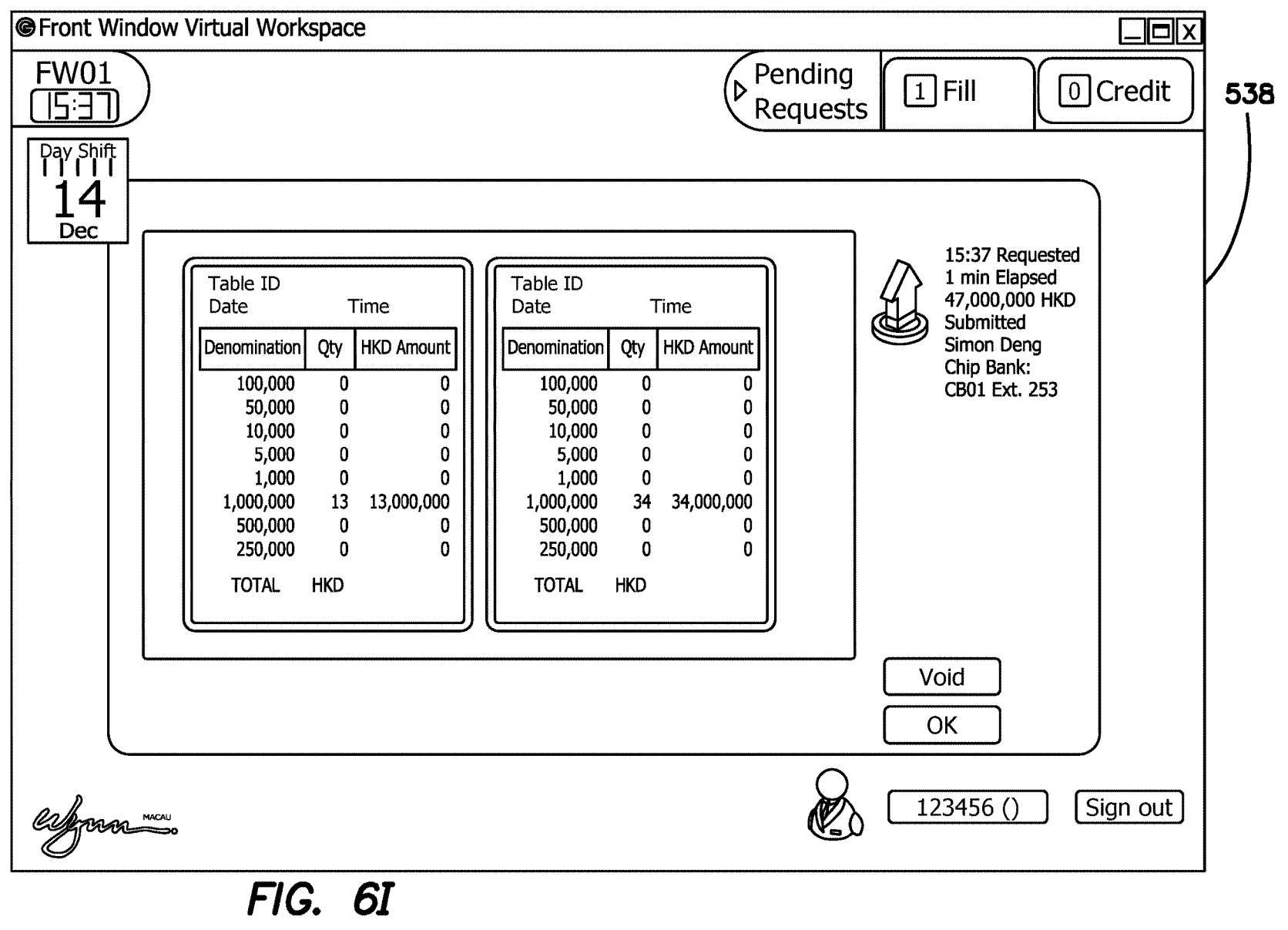

FIGS. 6a-6l illustrate user screen shots of a front window workspace according to the embodiments of the present invention;

Figure 8D:
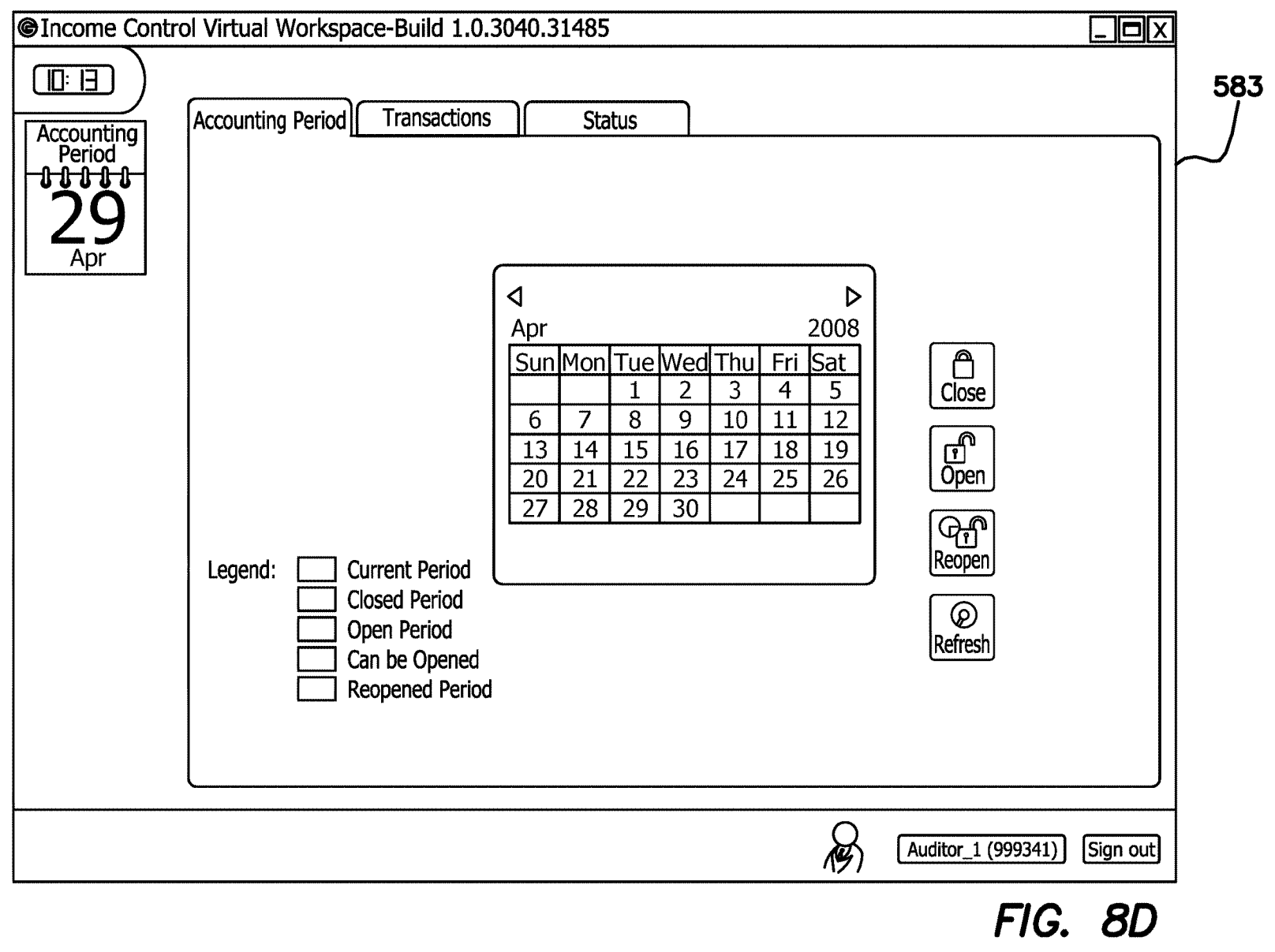
Figure 8H:
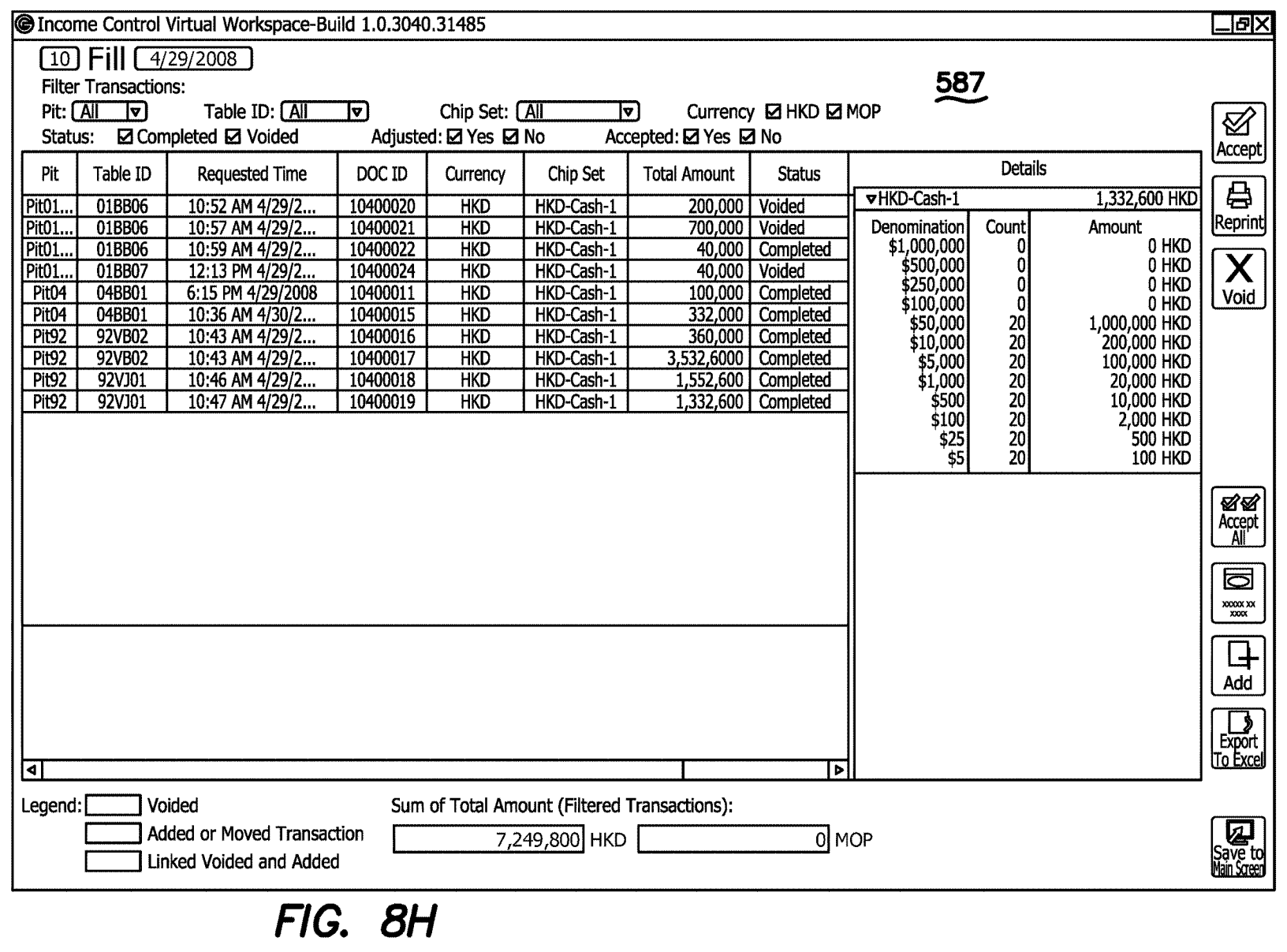
Figure 8I:
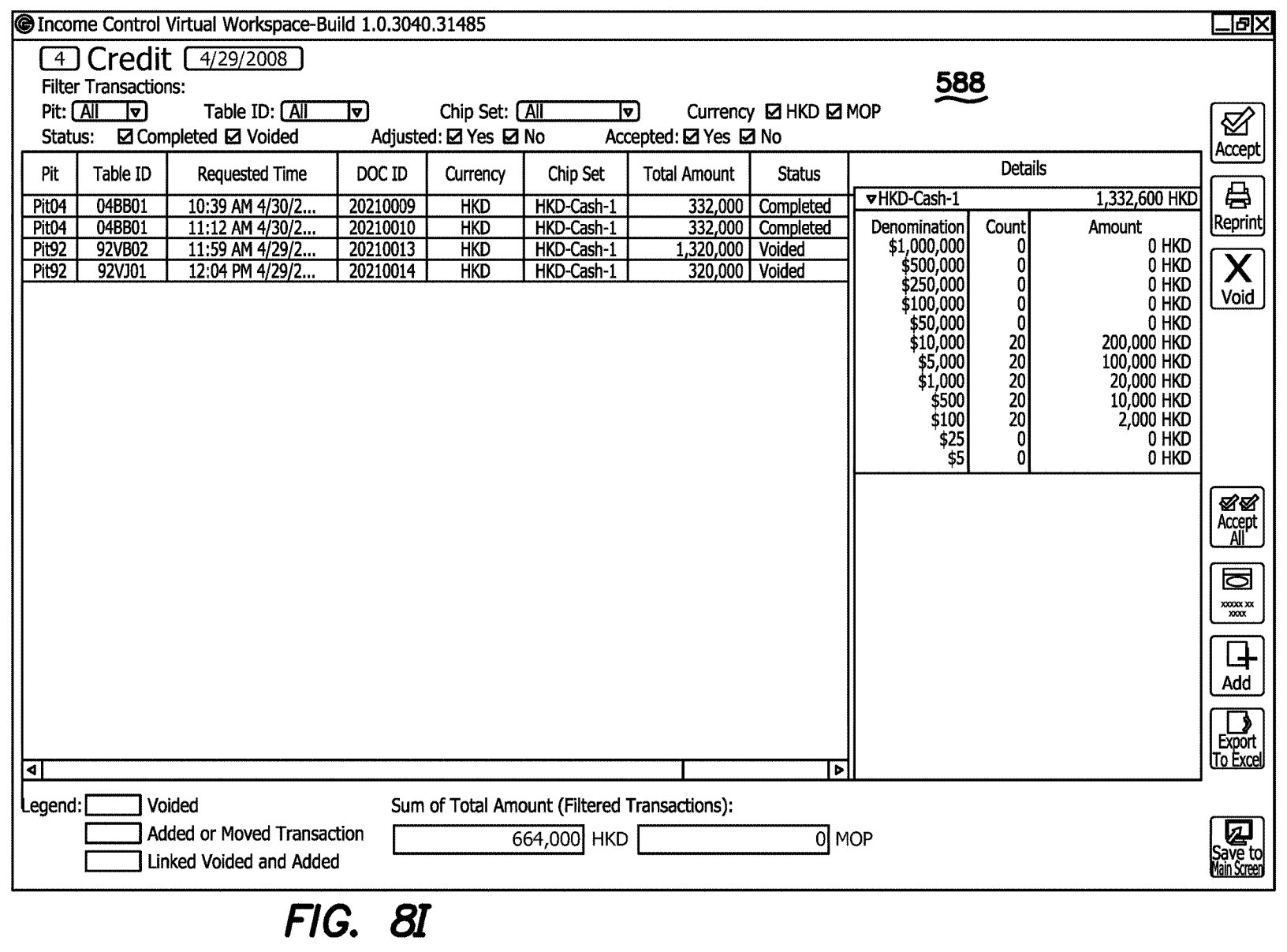

FIGS. 8a-8l illustrate user screen shots of an income control virtual workspace according to the embodiments of the present invention;

FIGS. 9a-9k illustrate user screen shots of a cash drop procedure according to the embodiments of the present invention;

Figure 10B:
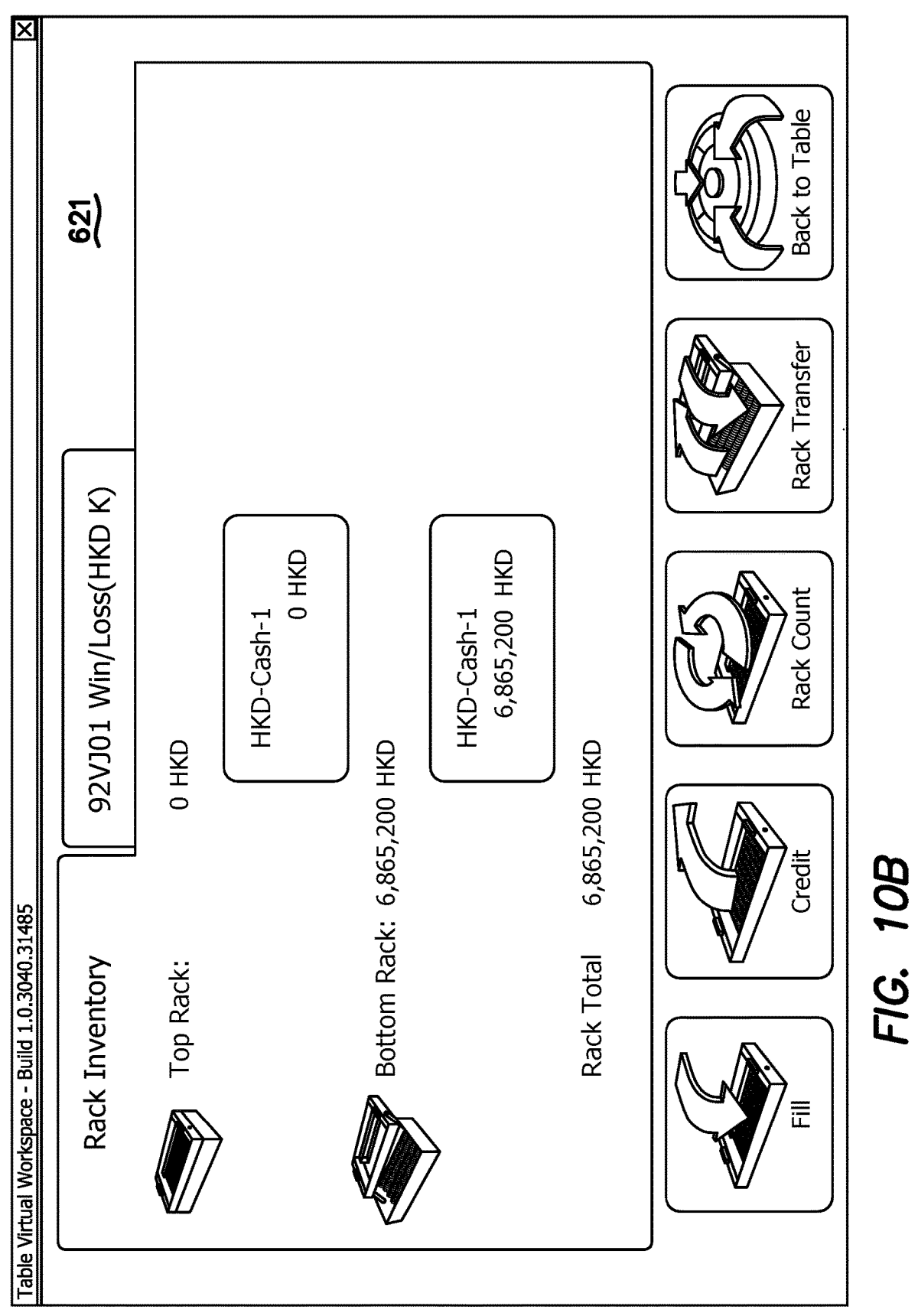
Figure 10D:
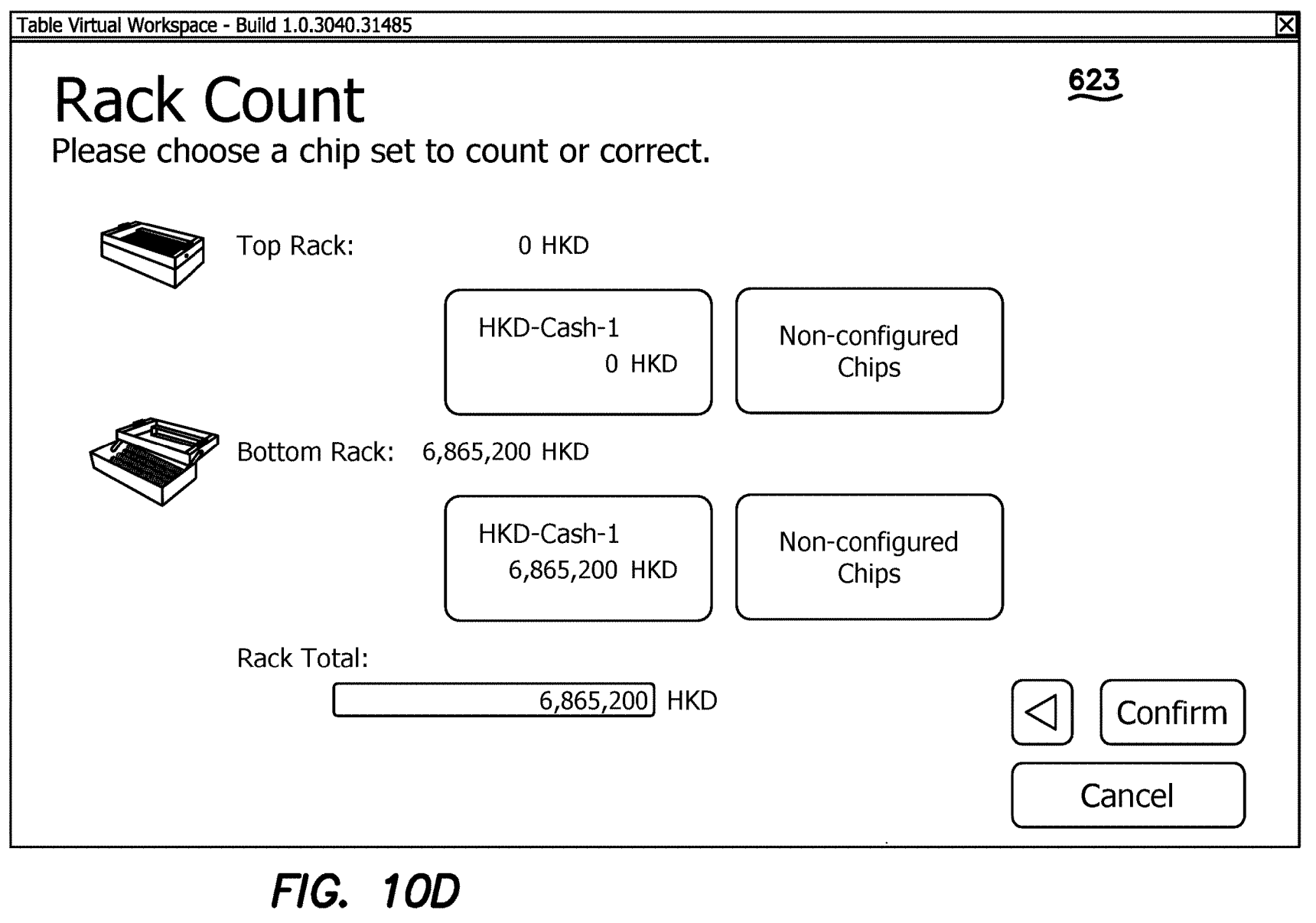
Figure 10E:
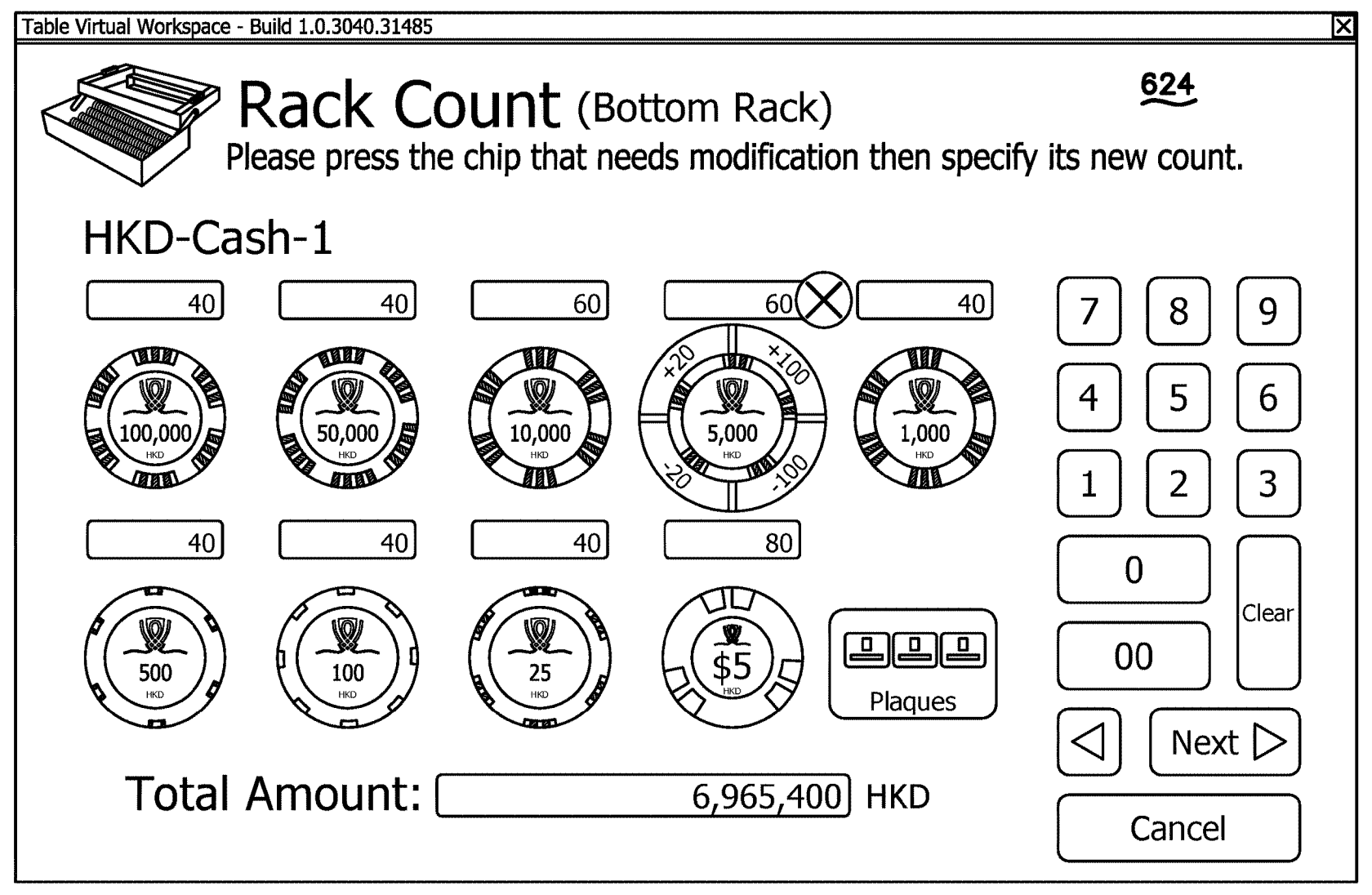
Figure 10F:
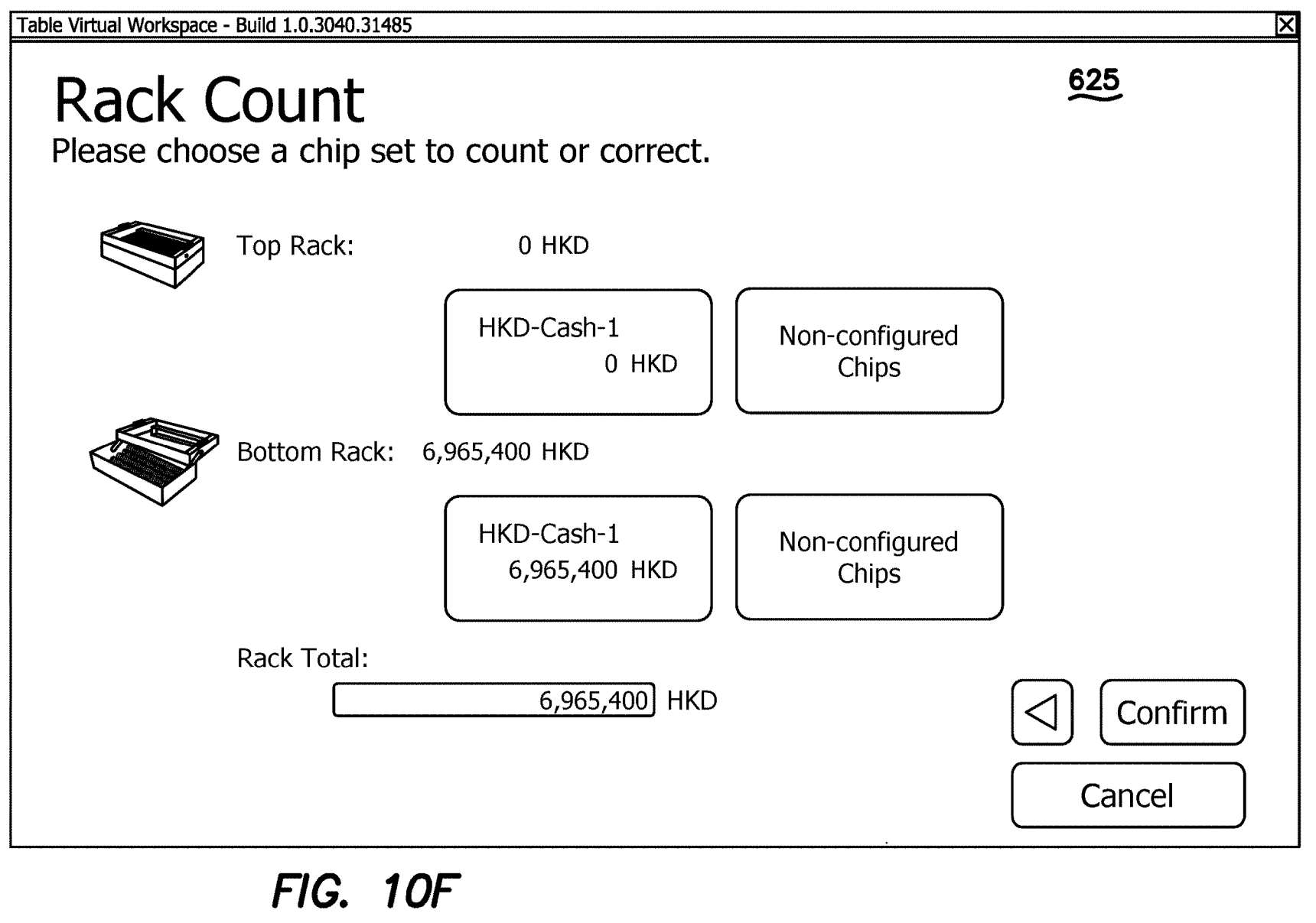

FIGS. 10a-10h illustrate user screen shots of a rack count according to the embodiments of the present invention;

Figure 11H:
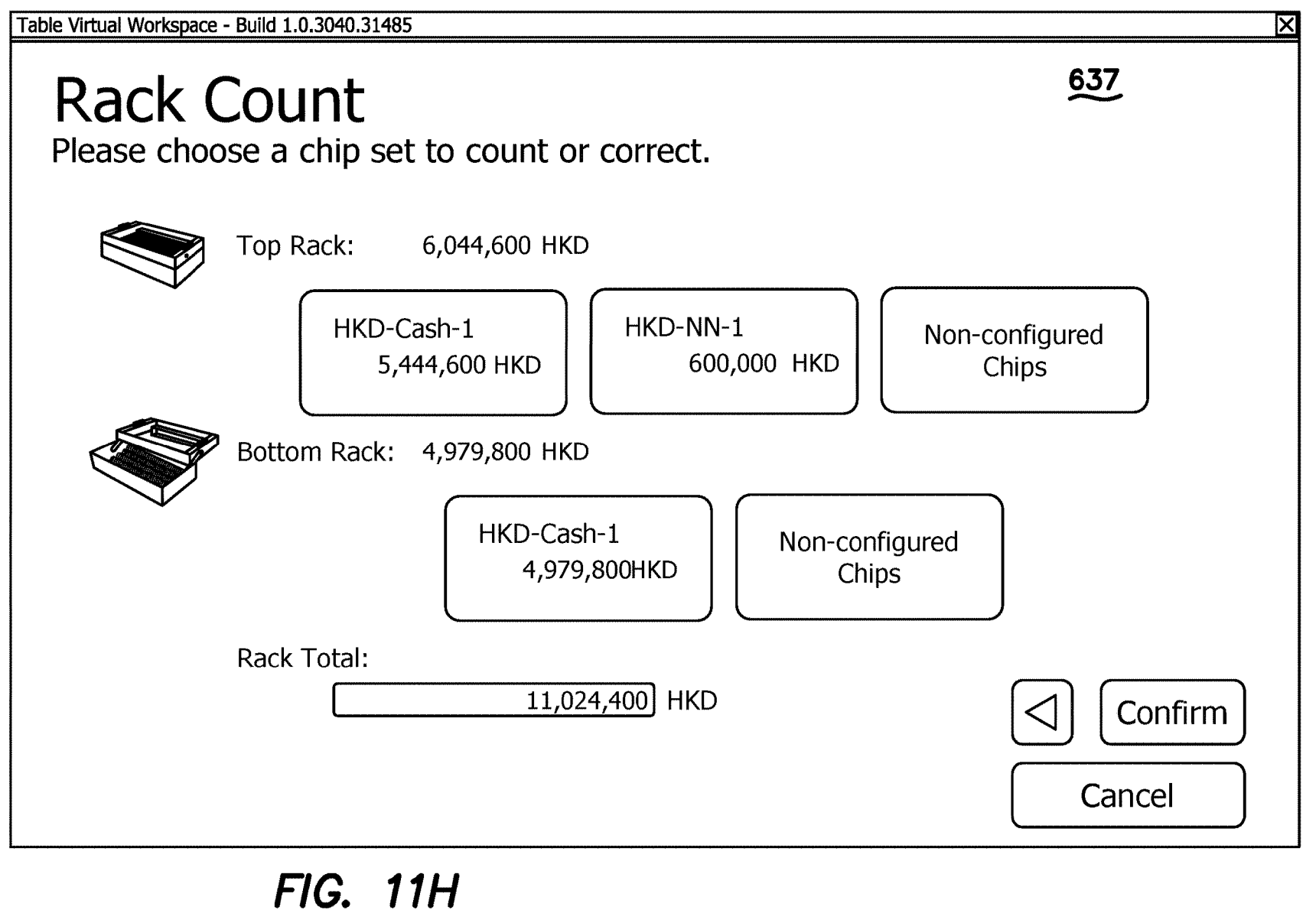

FIGS. 11a-11i illustrate user screen shots of non-configured chip rack count procedure according to the embodiments of the present invention;

Figure 12C:
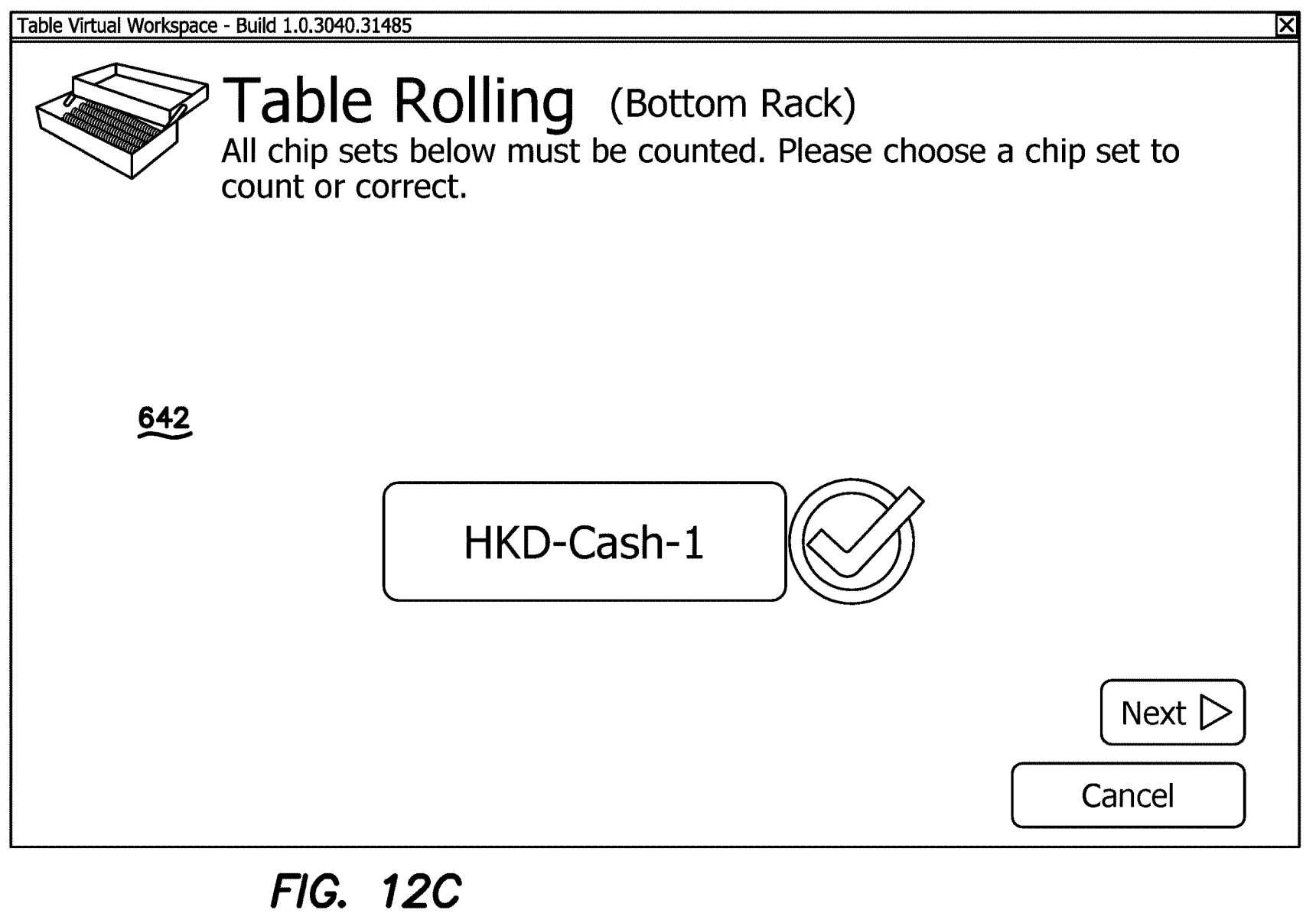
Figure 12G:
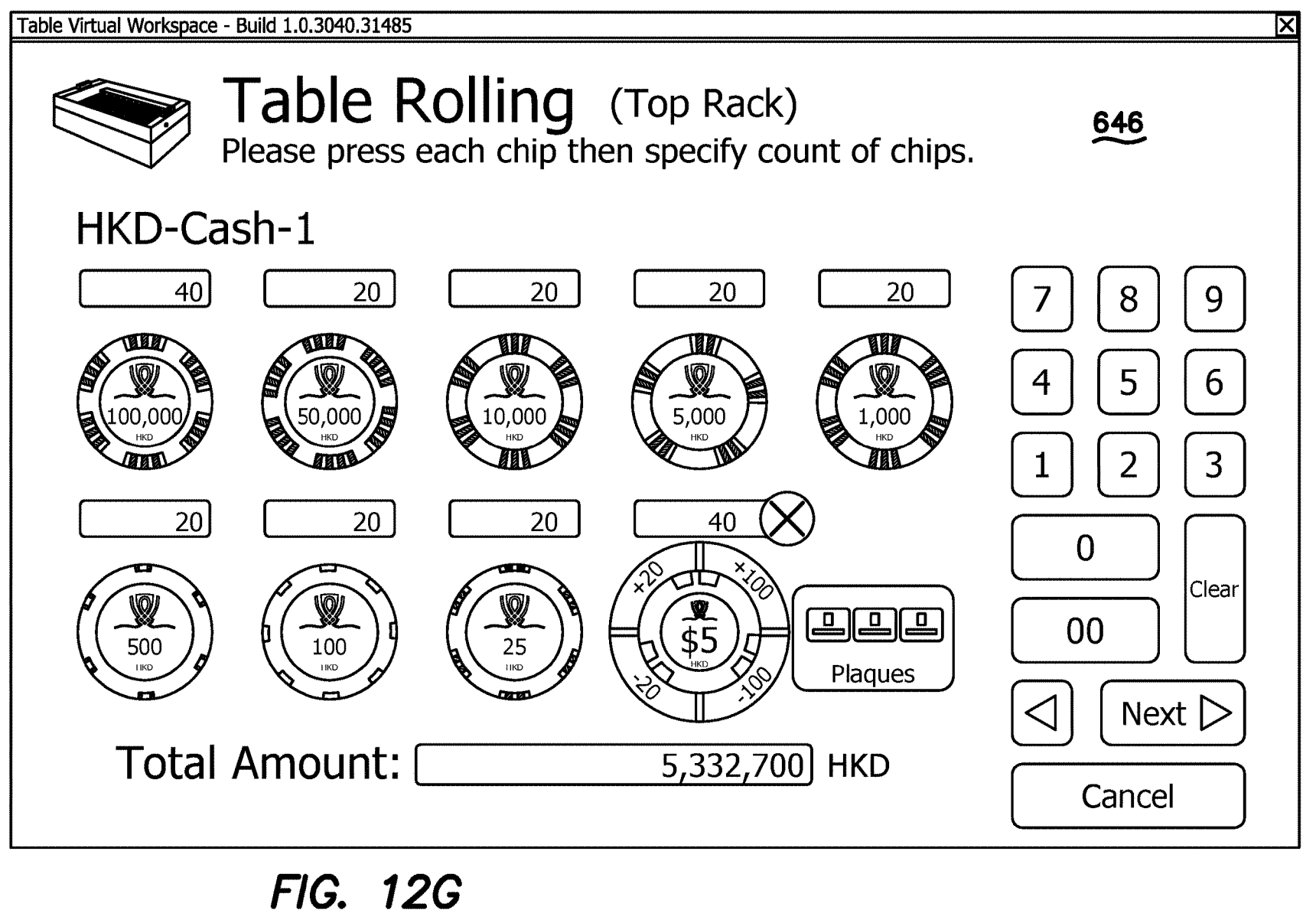

FIGS. 12a-12k illustrate user screen shots of table rolling procedure according to the embodiments of the present invention;

FIGS. 13a-13e illustrate user screen shots of a table win/loss procedure according to the embodiments of the present invention; and FIGS. 14a-14f illustrate user screen shots of a pit podium according to the embodiments of the present invention.

DETAILED DESCRIPTION

Figure 1:
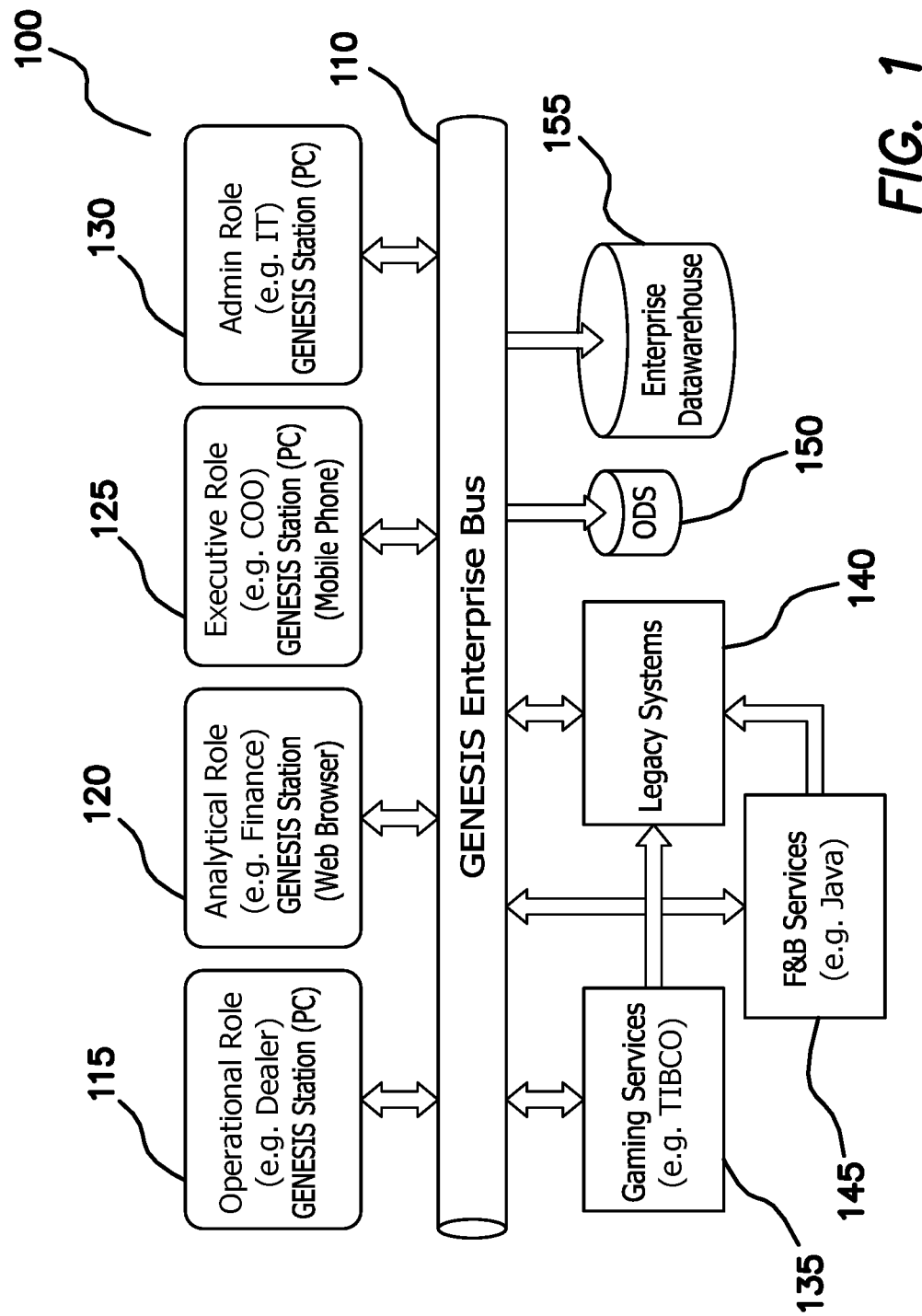
FIG. 1 illustrates an architectural block diagram of a casino management system platform according to one embodiment of the present invention.

For the purpose of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

The system described herein is a network including a central computer comprising one or more servers accessible via clients (e.g., personal computers) which are connected to one another. The clients also referred to as workspaces or workstations include at least monitors and user interfaces and are made intelligent using incorporated logic and processing capabilities. Software running on the central computer and/or workspaces facilitates the casino management system detailed herein. The system is configured for a single property based on the parameters and needs of the property.

FIG. 1 illustrates an architectural block diagram of a casino management system platform 100 according to the embodiments of the present invention. An event bus 110 provides a route for bi-directional communication between various users. For example, a dealer, defined as operational personnel 115, communicatively joined to the bus 110 via a personal computer (PC), financial persons, defined as analytical personnel 120, are communicatively joined to the bus 110 via a web browser, a chief operating officer, defined as executive personnel 125, is communicatively joined to the bus 110 via a mobile device (e.g., cell phone) and a IT person, defined as a administrator 130, is communicatively joined to the bus 110 via a personal computer. Gaming services 135 is communicatively joined to the bus 110 and are further communicatively joined to the legacy systems 140. The bus 110 has access to operation data store (ODS) 150 and enterprise data warehouse 155 through a link.

The central element of the casino management system platform 100 is the enterprise event bus 110. In one embodiment, the casino management system platform 100 defines "events" as noteworthy incidents or occurrences. For example, a "request for a fill" is deemed an event. The request may then be addressed by a user of the system who need not be specifically identified. That is, one or more users may ignore the request while one or more other users may take action to complete the request. For example, a chip bank may elect to prepare the necessary gaming chips to accomplish the fill request while another user may elect to review the total value of the fill request and, if above a certain pre-established threshold, email gaming operations executive the appropriate notice email.

Figure 2:
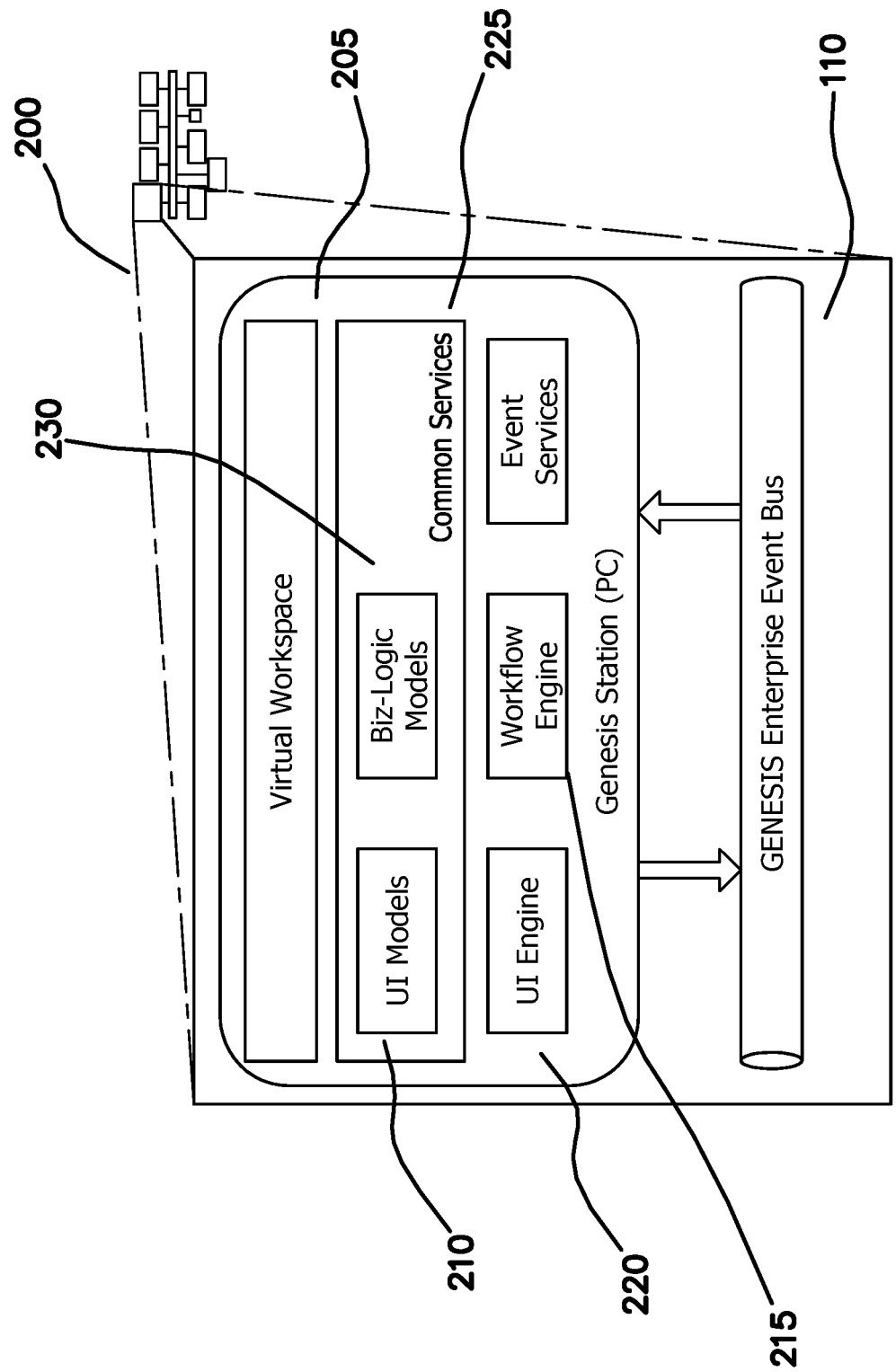
FIG. 2 illustrates an architectural block diagram of an intelligent client according to one embodiment of the present invention.

Now referring to FIG. 2, a block diagram 200 details a client architecture implemented via a personal computer. The end user of the casino management system platform 100 navigates via a virtual workspace 205. The virtual workspace 205 provides users with a realistic look and feel (as shown in the figures hereof) making the user actions intuitive. For example, objects depicted in the virtual workspace appear as the objects appear in real life. User interface models 210 are declarative representations of the virtual workspace 205. The models 210 include visual representations and interactive behaviors which may include animation. The models 210 are created and maintained by intuitive tools such as popular vector drawing applications and rapid application development (RAD) tools allowing custom controls, including buttons and visually styled list boxes, to be created quickly.

A model-driven workflow and business rules engine 215 and user interface engine 220 handle the business logic of flow, sequence of user interface screens and local data validation. The engines 215, 220 provide a high level of abstraction for developers to create business logic on the intelligent client. In one embodiment, the models are XML-based and represent threshold limitation, decision branches, data entry confirmation and any other appropriate logic designed to function while the client is offline. As designed, the intelligent clients act as service providers on the event bus 110 when connected to the network. Intelligent clients are able top publish services responsive to events which require reporting of client state (e.g., current workflow running and its state) as well as housekeeping and system administrative functions (e.g., publish a new set of models, load and restart with new models, shutdown, etc.). A services architecture 300 is shown in FIG. 3.

A common services layer 225 encapsulates often-used functions, abstractions of key gaming concepts and event communication utilities necessary for other functions. Common services include gaming day service, human accountability service, model publishing and activation service, table status service and exception handling service. The gaming day service monitors events indicating table open, table roll and table close allowing each table to have a corresponding "gaming day" based upon the start time and speed by which each table can be rolled to the next day. Such a service is transparent to all other applications which may require such information. The human accountability service handles persons accountable for certain services. Thus, events are generated with multiple responsible parties collaborating as a team. For example, blackjack may have two responsible parties comprising the dealer and a supervisor (or team leader) performing a majority of business functions (e.g., table credits). On the other hand, a craps game has three dealers and a supervisor dedicated to a single craps table. The human accountability service manages the login and authentication of all responsible parties and the shift roll of the responsible parties. The model publishing and activation service enables models to be centrally managed and pushed to the various clients. In one embodiment, the publishing service is facilitated by the Altiris Deployment Solution marketed and produced by Symantec of Mountain View, Calif. The table status service reports the current state (e.g., open, close, suspend and rolling) of each table for a client hosting a table virtual workspace. The exception handling service provides a generalized logging and handling of system level exceptions which are generated. An event services module 235 and business logic model 230 are also integrated with the virtual workspace 205.

Figure 3:
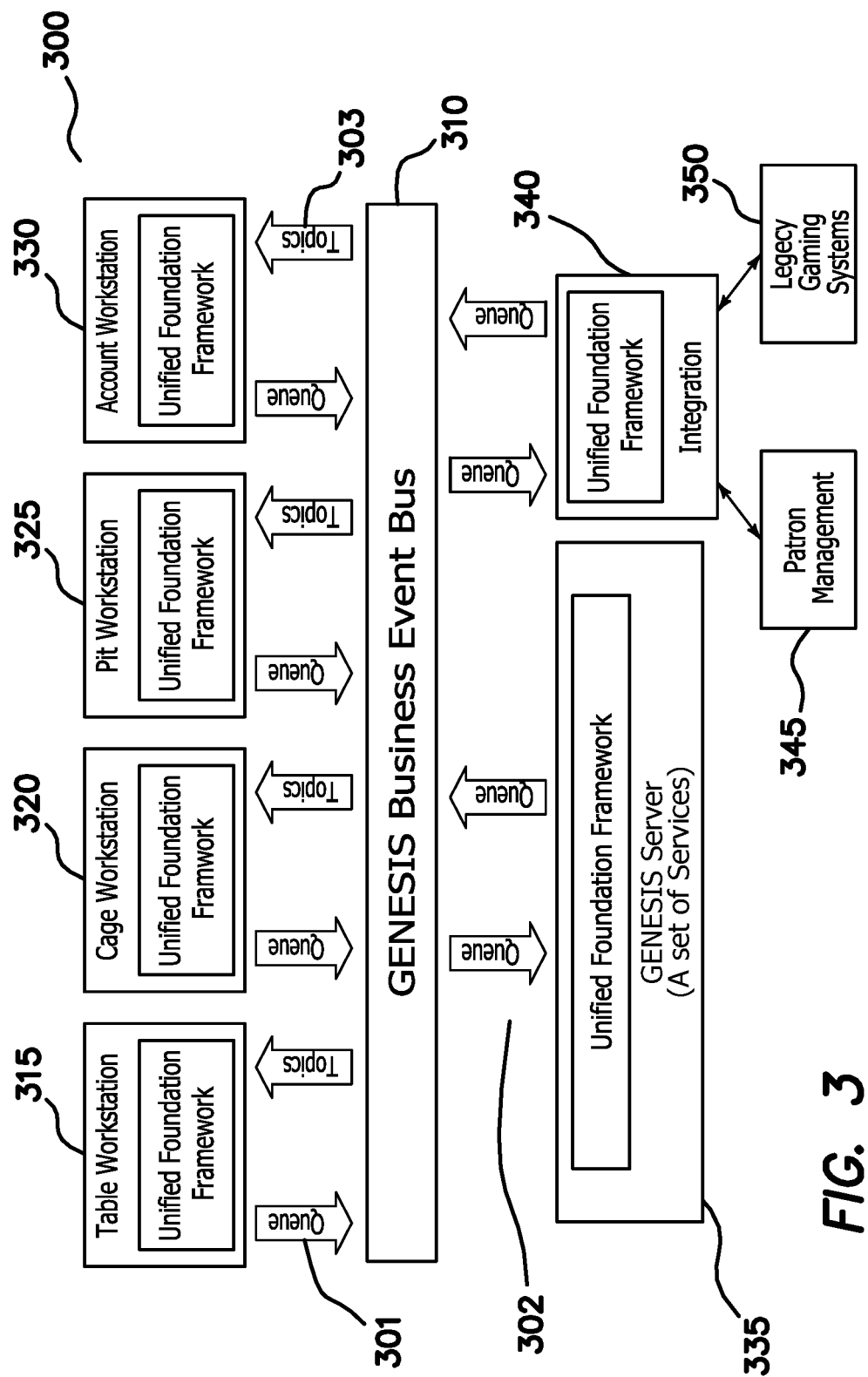
FIG. 3 illustrates an architectural block diagram of services according to one embodiment of the present invention.

FIG. 3 shows a services architecture system platform 300 based on a service oriented architecture (SOA). A business event bus 310 manages the platform 300. A table workstation 315, cage workstation 320, pit workstation 325 and account workstation 330 are each communicatively joined to the business event bus 310. A server 335 and integration module 340, formed of a patron management module 345 and legacy gaming systems module 350. The platform 300 facilitates completion of services. The table workstation 315, cage workstation 320, pit workstation 325 and account workstation 330 transmits requests or messages into the business event bus queue 301 which transmits the requests or messages to the server queue 302. Once the server 335 handles the request or message, a response is transmitted to the business event queue 301. Finally, the response is transmitted as a topic 303 to the appropriate workstation. The integration module 340 handles non-compliant requests and messages via the business event queue 301, server queue 302 and topics 303. The services are consumed by various unique consumers or such services. Service invocation is asynchronous and is achieved by sending a business event to a service. All business events are logged for audit purposes and can be transformed and loaded into a data warehouse. In one embodiment, the operation of the service architecture is facilitated by a business process management system and EAI platform marketed by TWO of Palo Alto, Calif.

Figure 4:
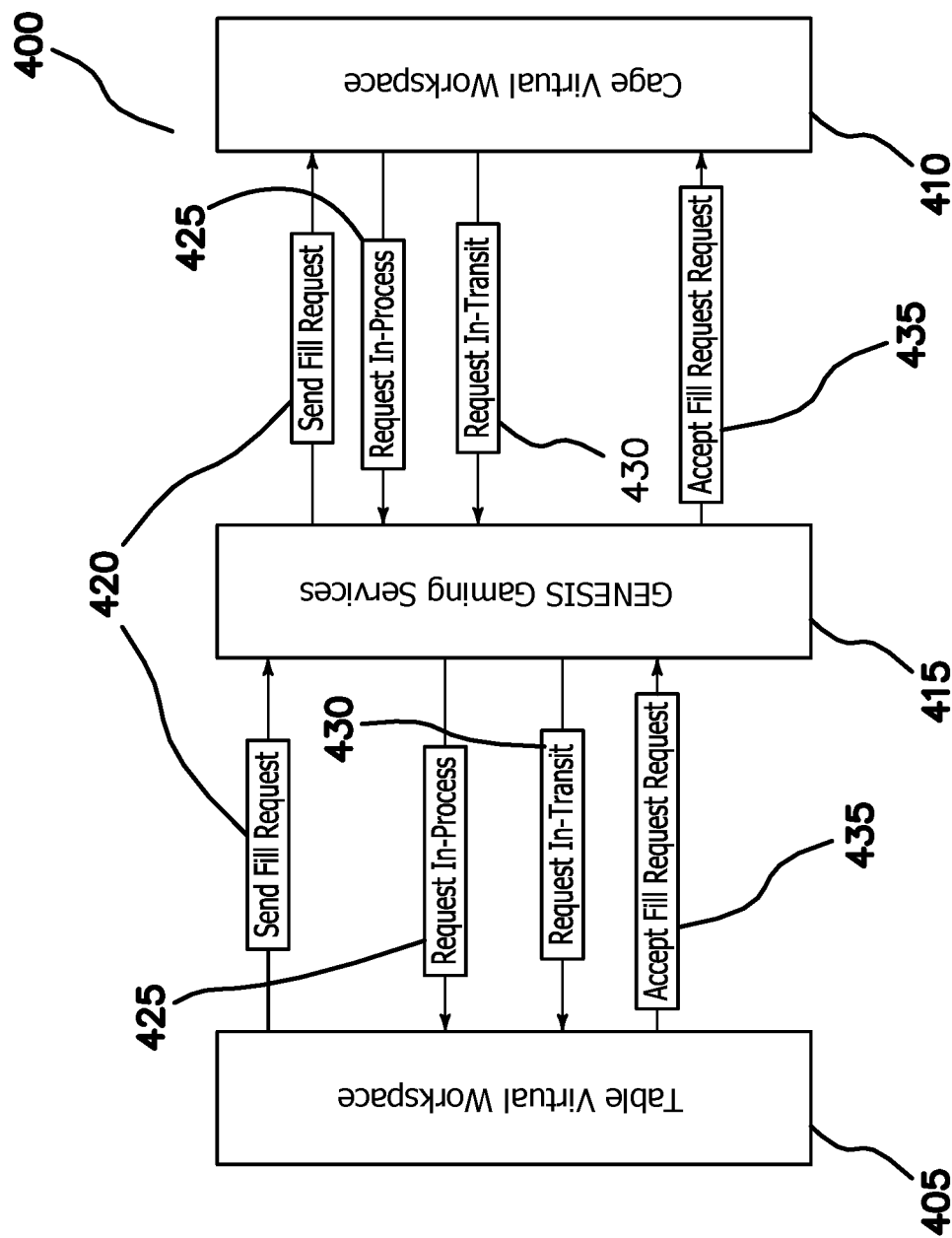
FIG. 4 illustrates an architectural block diagram of the handling of a business event according to the embodiments of the present invention.
Figure 5A:
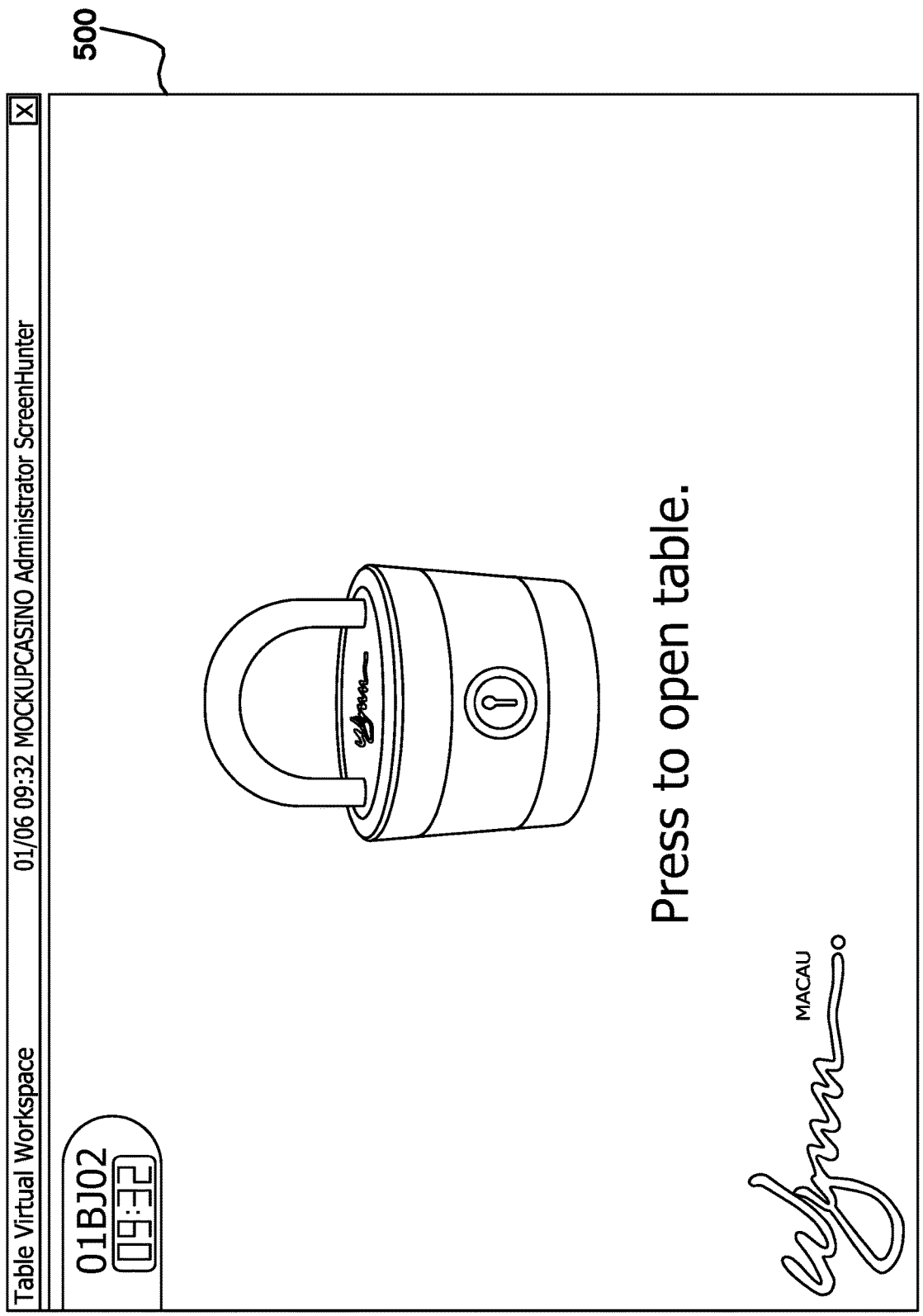
FIGS. 5a-5dd illustrate user screen shots of a table virtual workspace according to the embodiments of the present invention
Figure 5C:
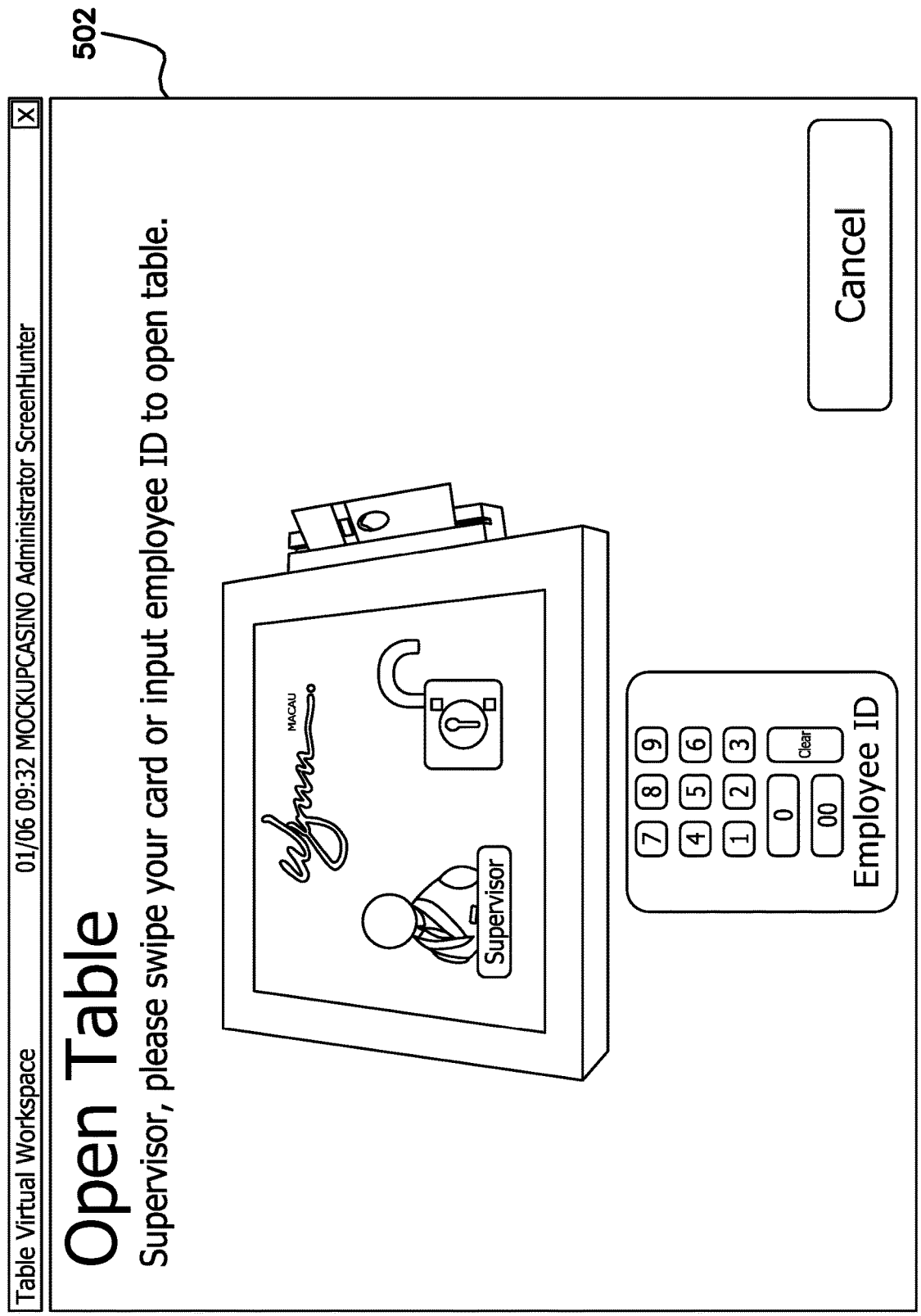
Figure 5D:
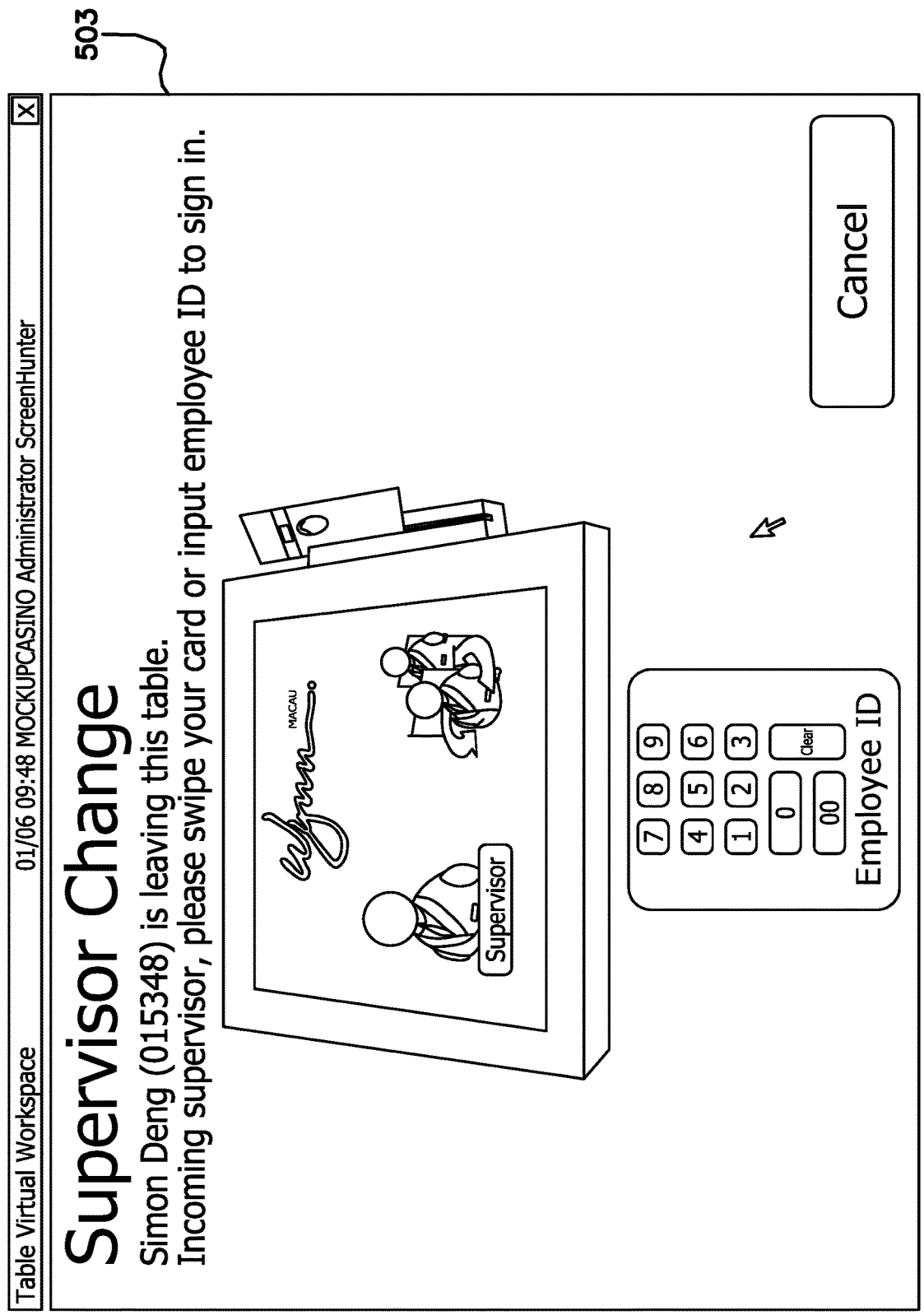
Figure 5E:
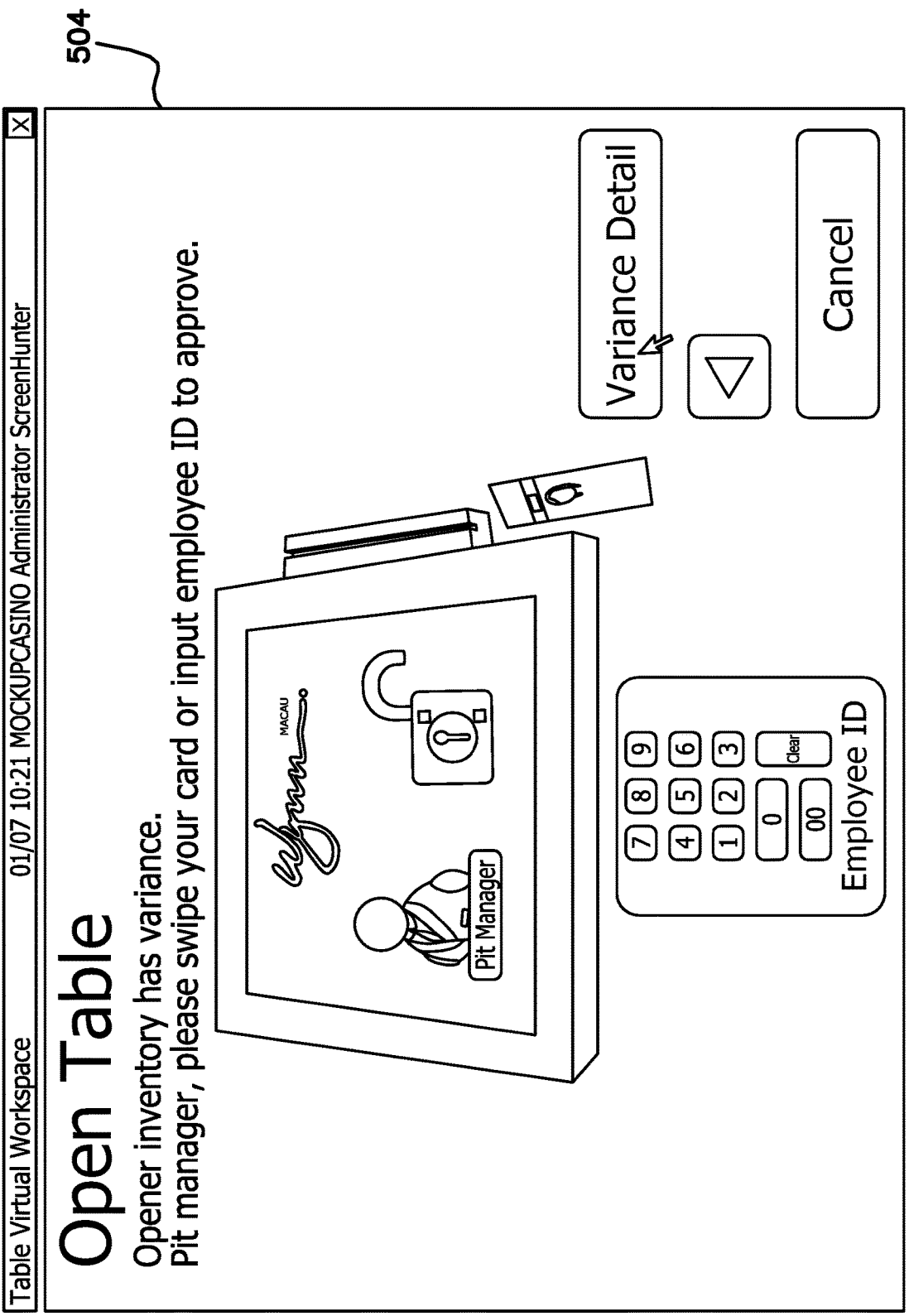
Figure 5F:
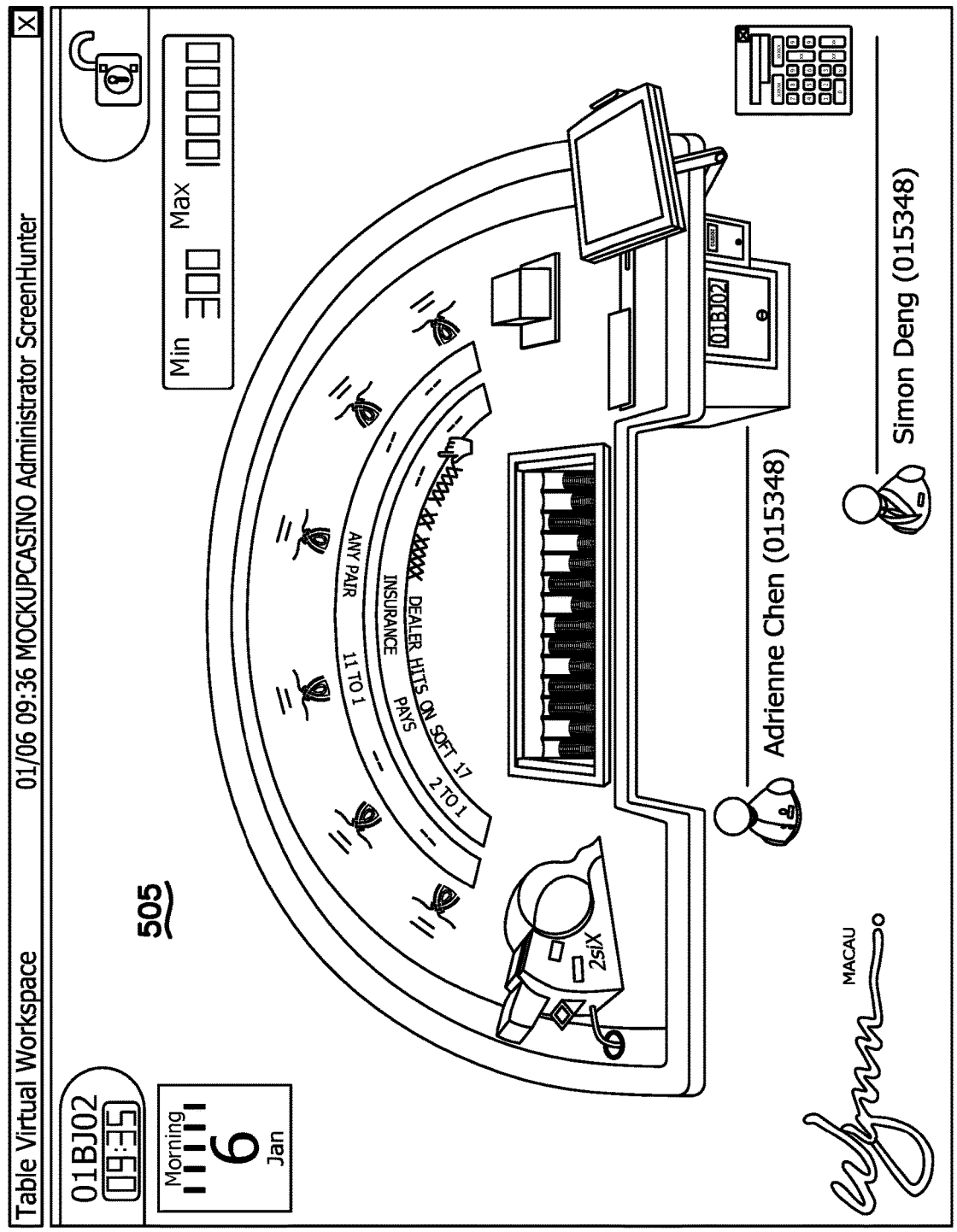
Figure 5G:
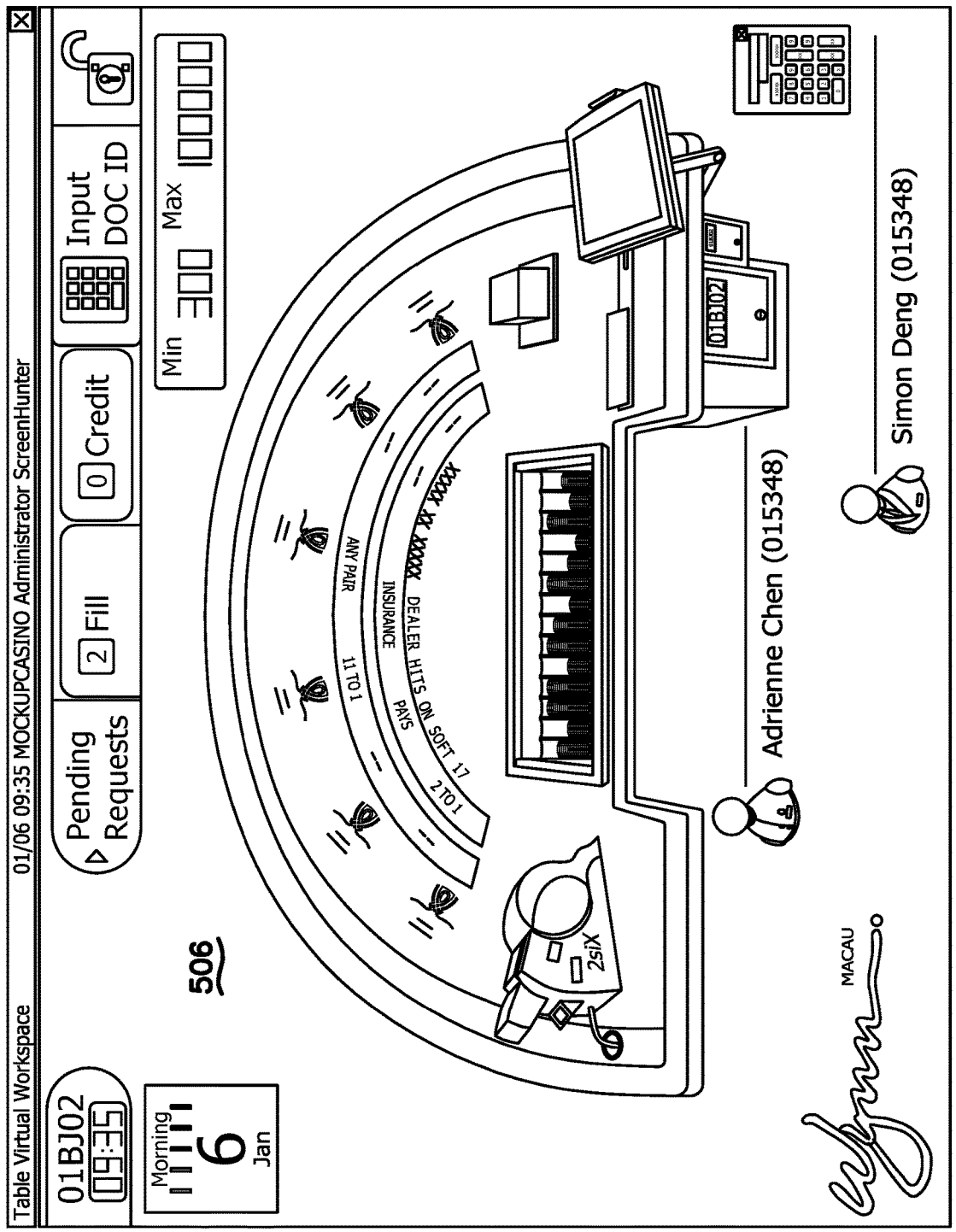
Figure 5H:
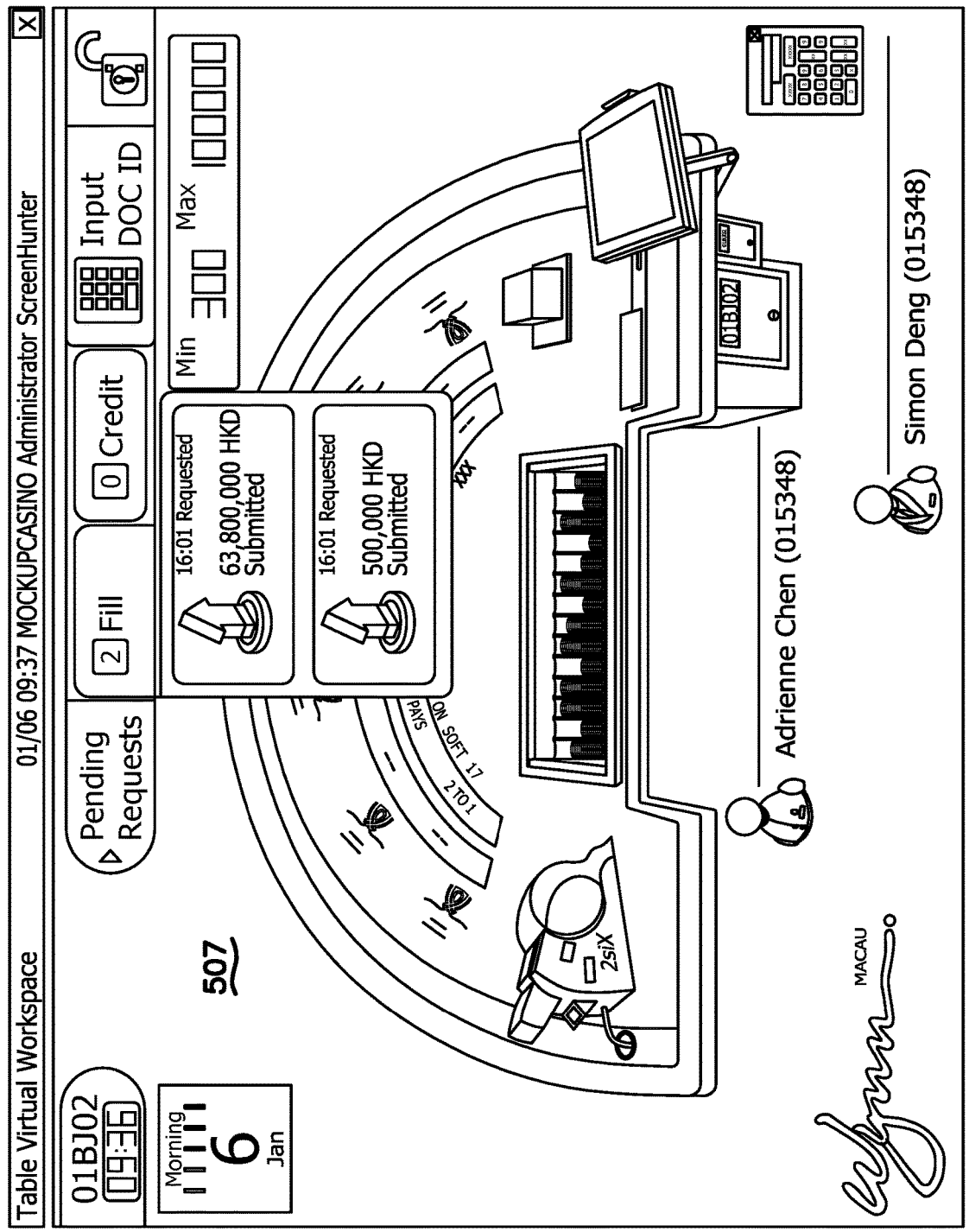
Figure 5I:
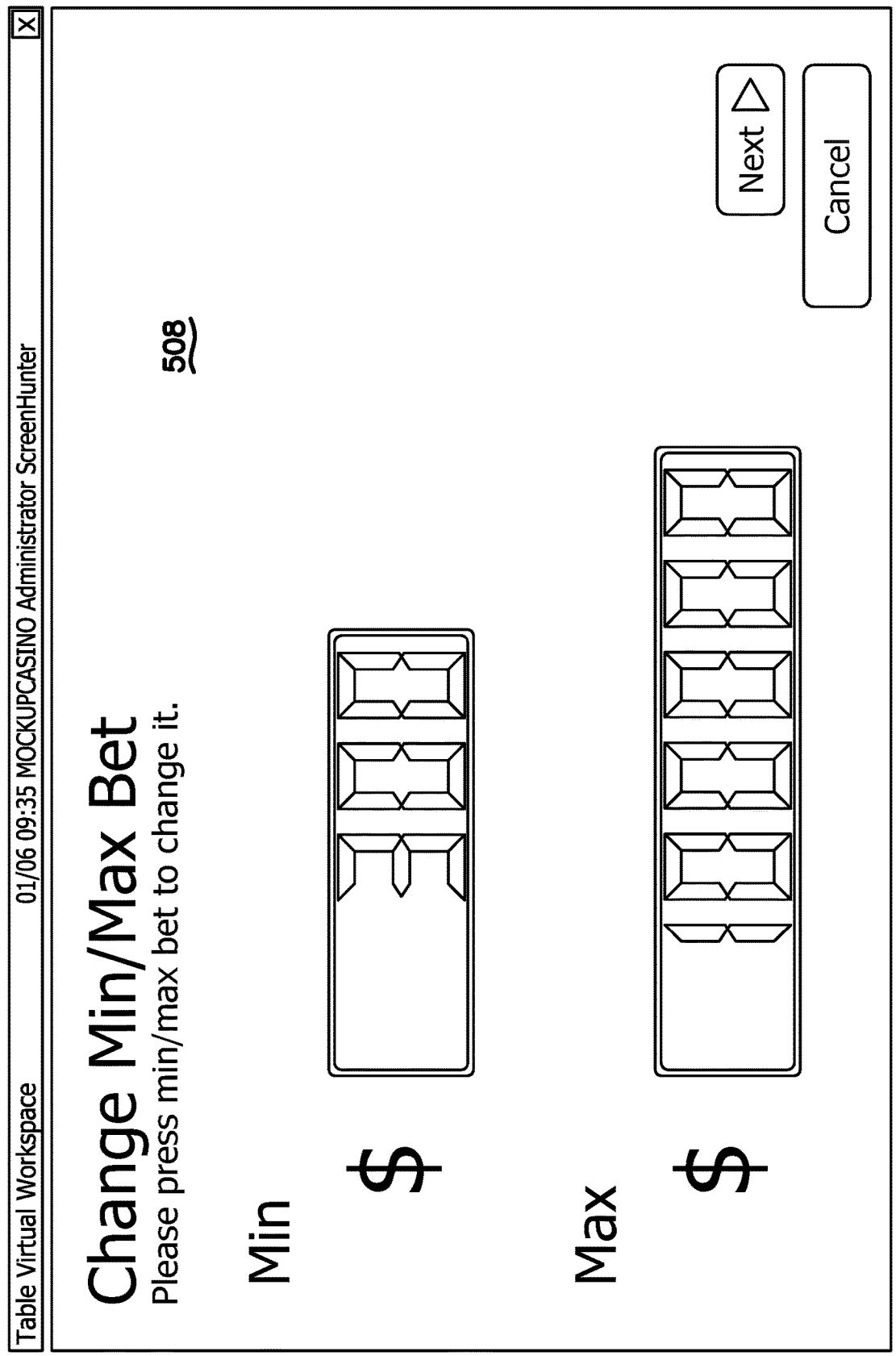
Figure 5J:
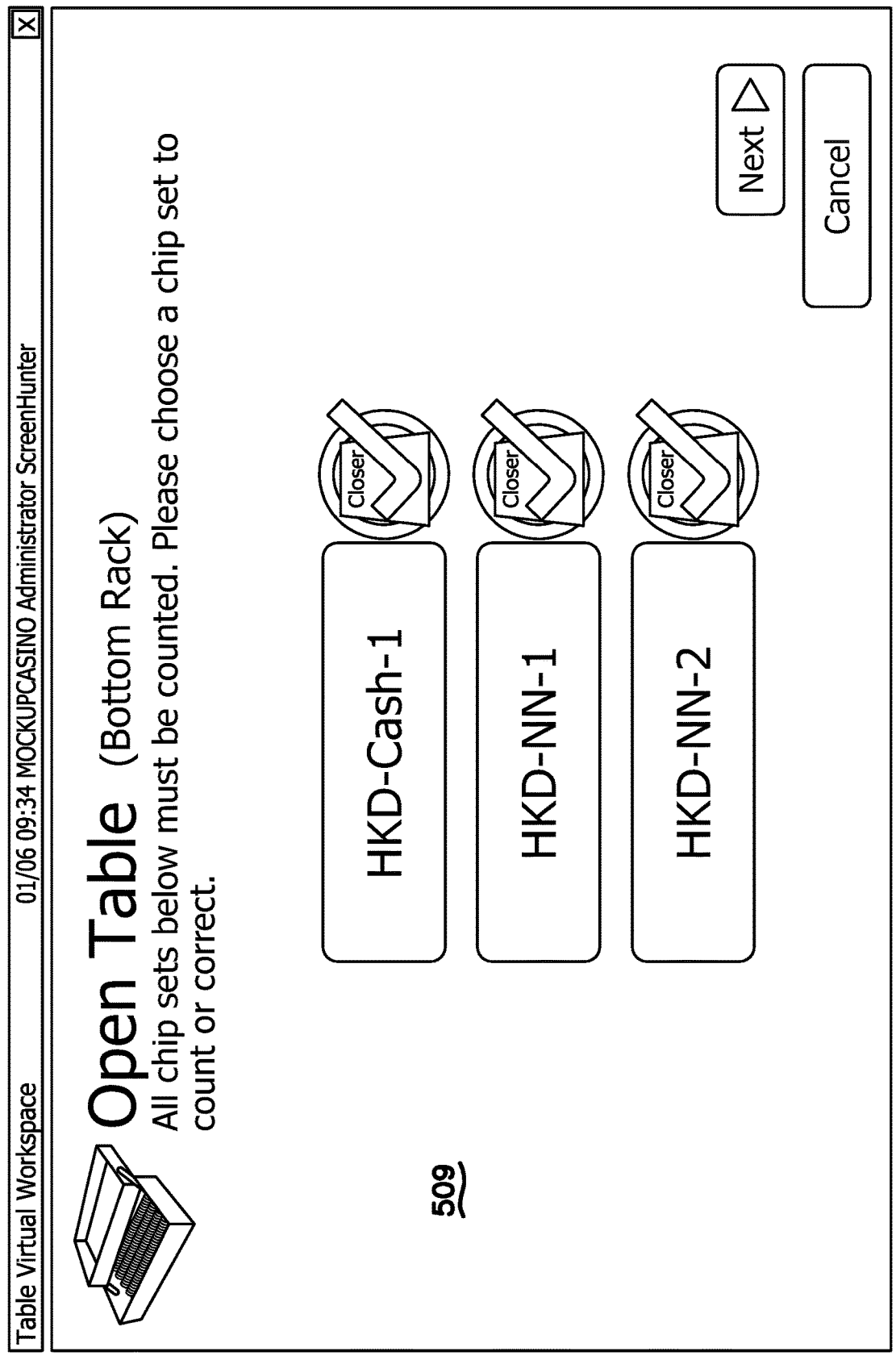
Figure 5K:
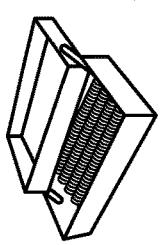
Figure 5L:
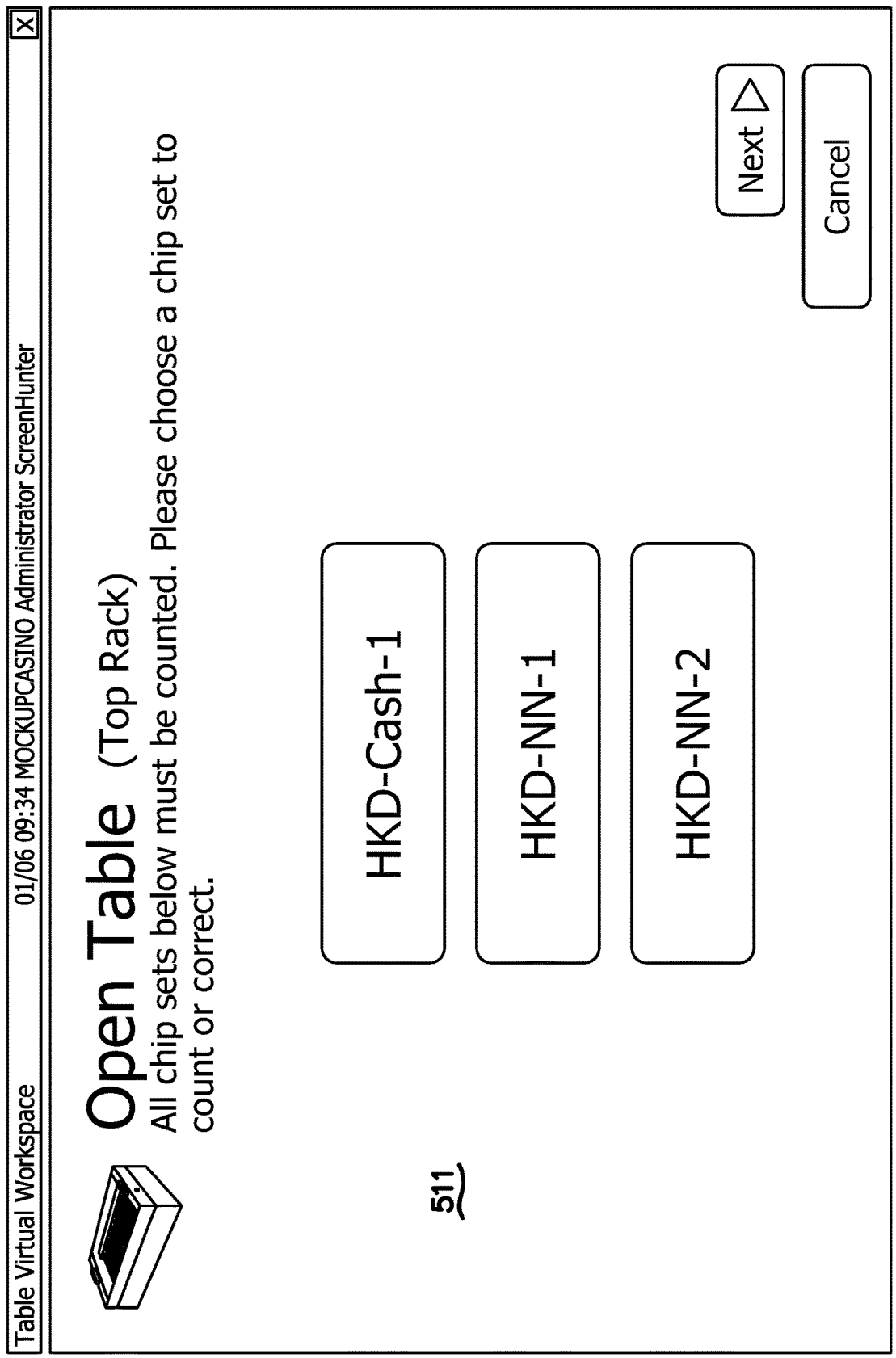
Figure 50:
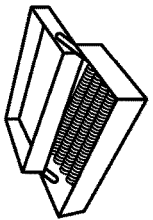
Figure 5P:
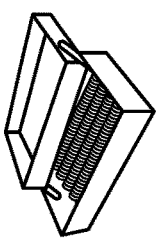
Figure 5R:
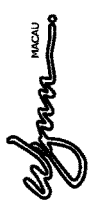
Figure 5S:
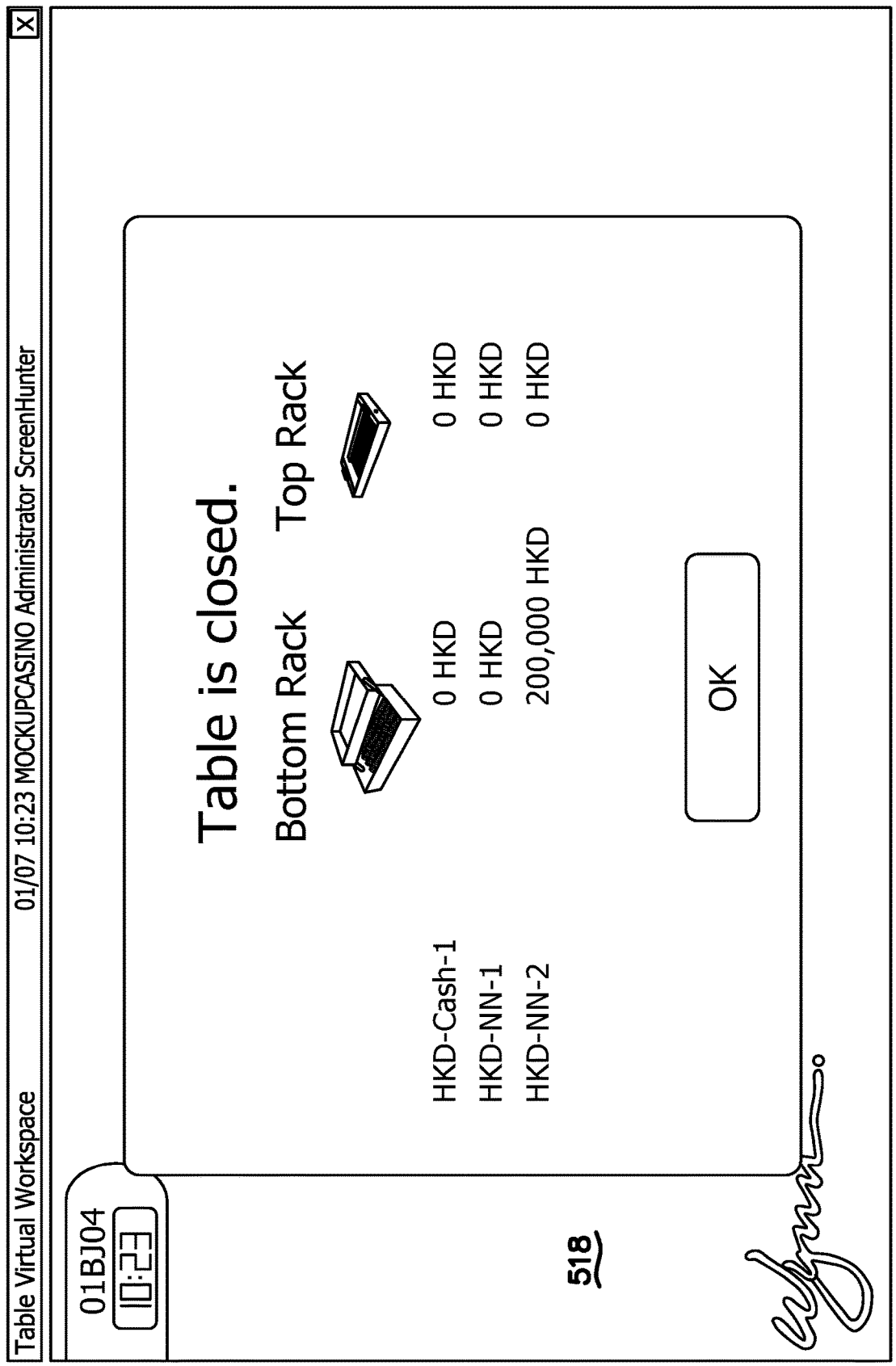
Figure 5T:
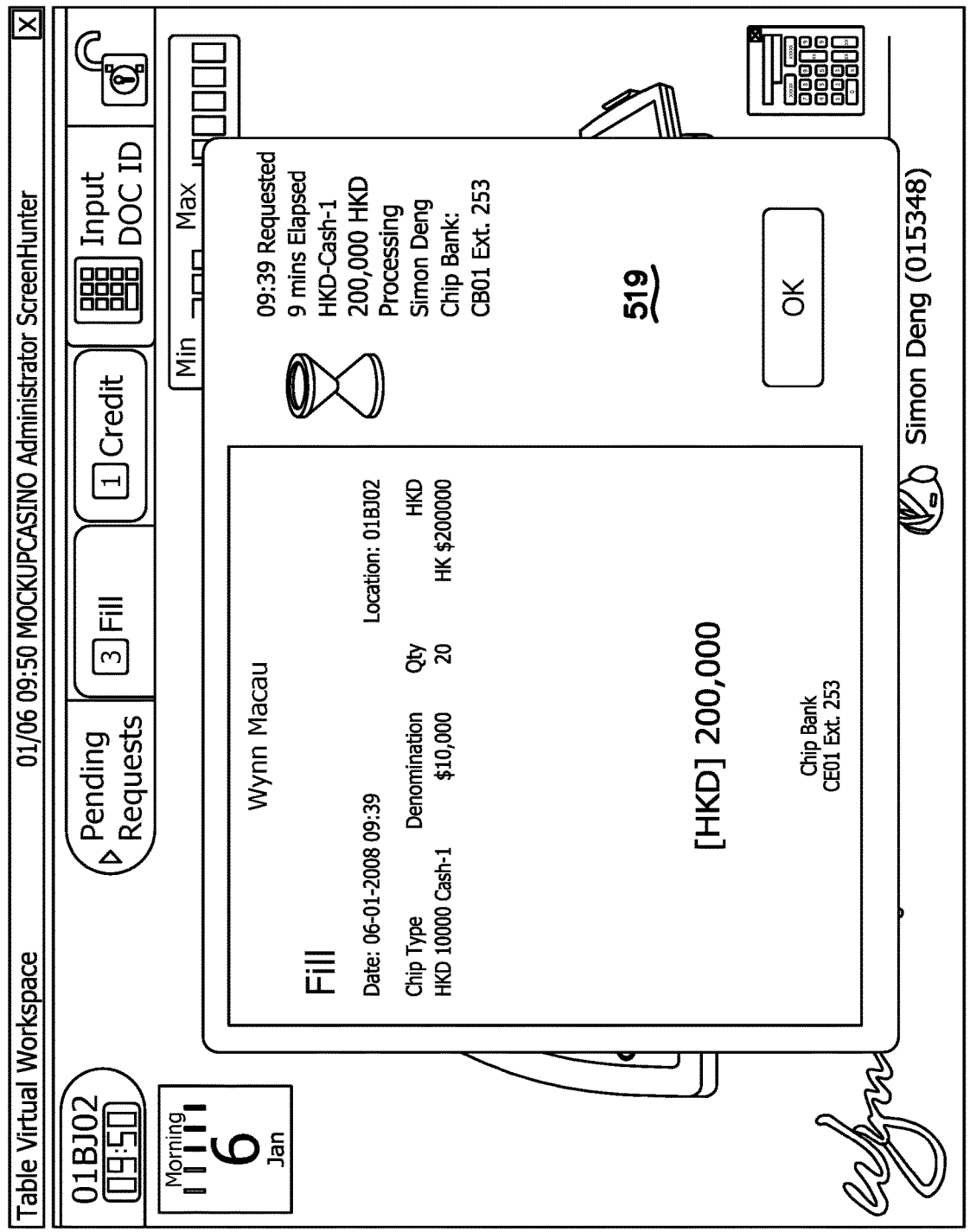
Figure 5U:
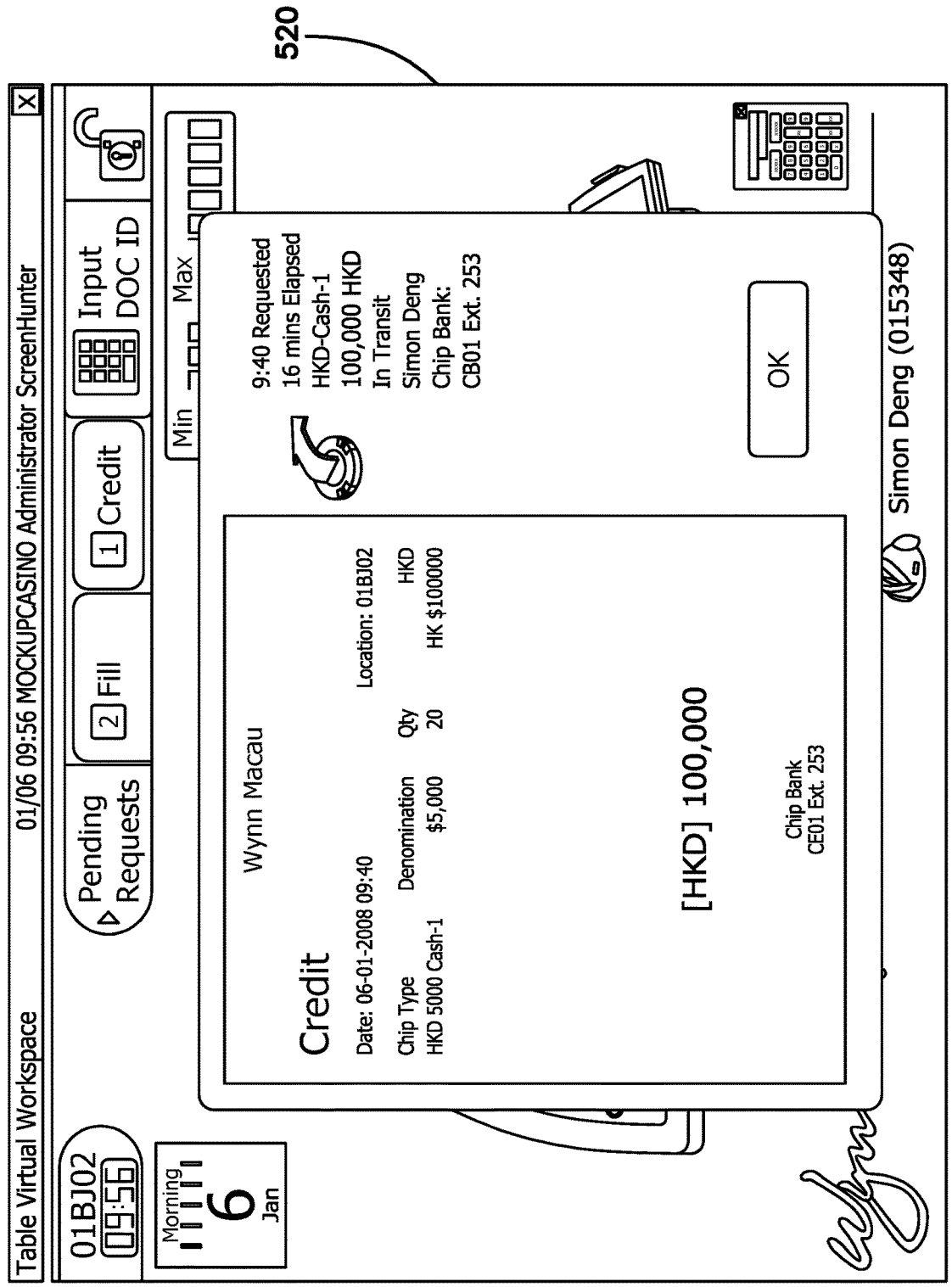
Figure 5W:
Figure 5X:
Figure 5Y:
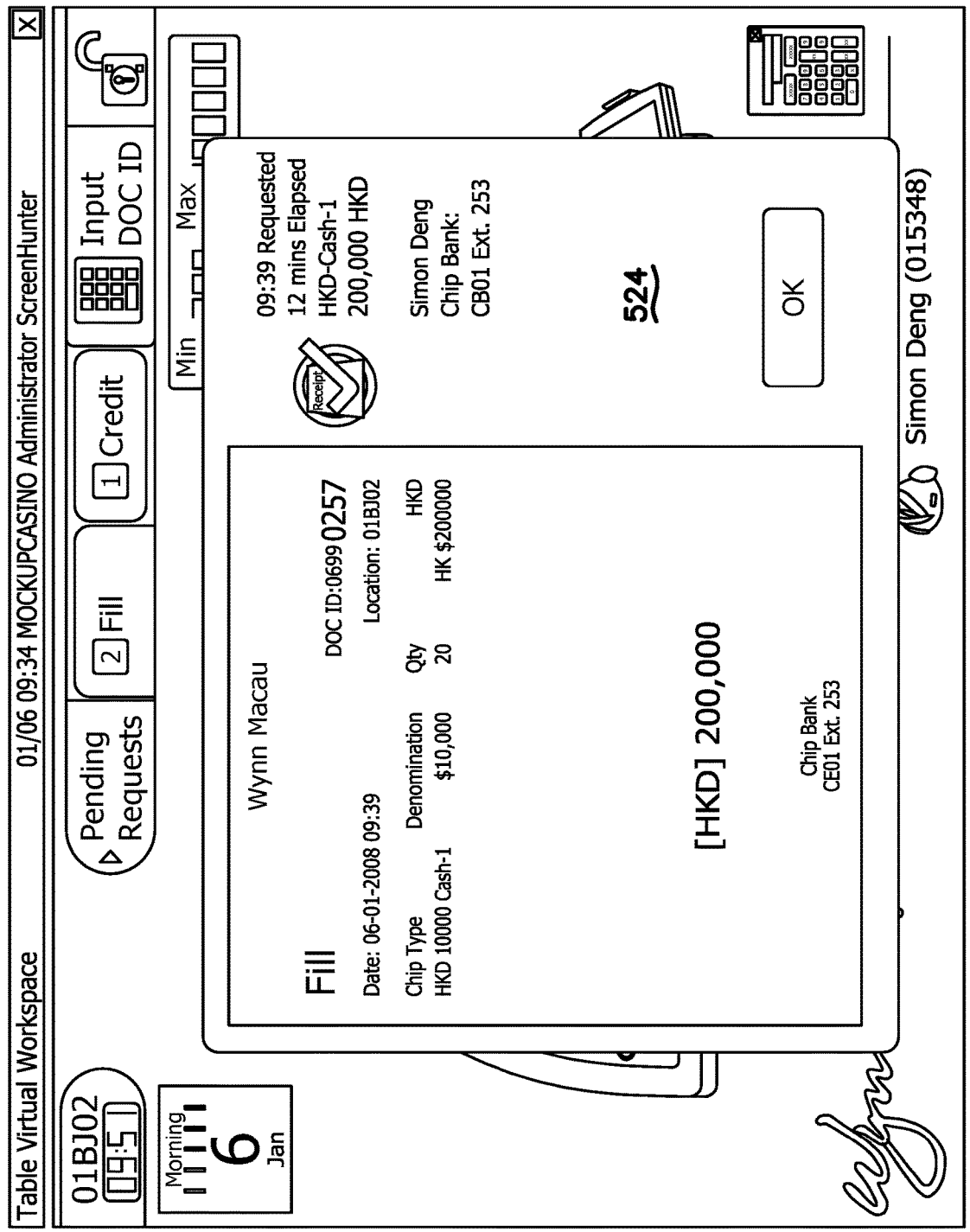
Figure 5A:
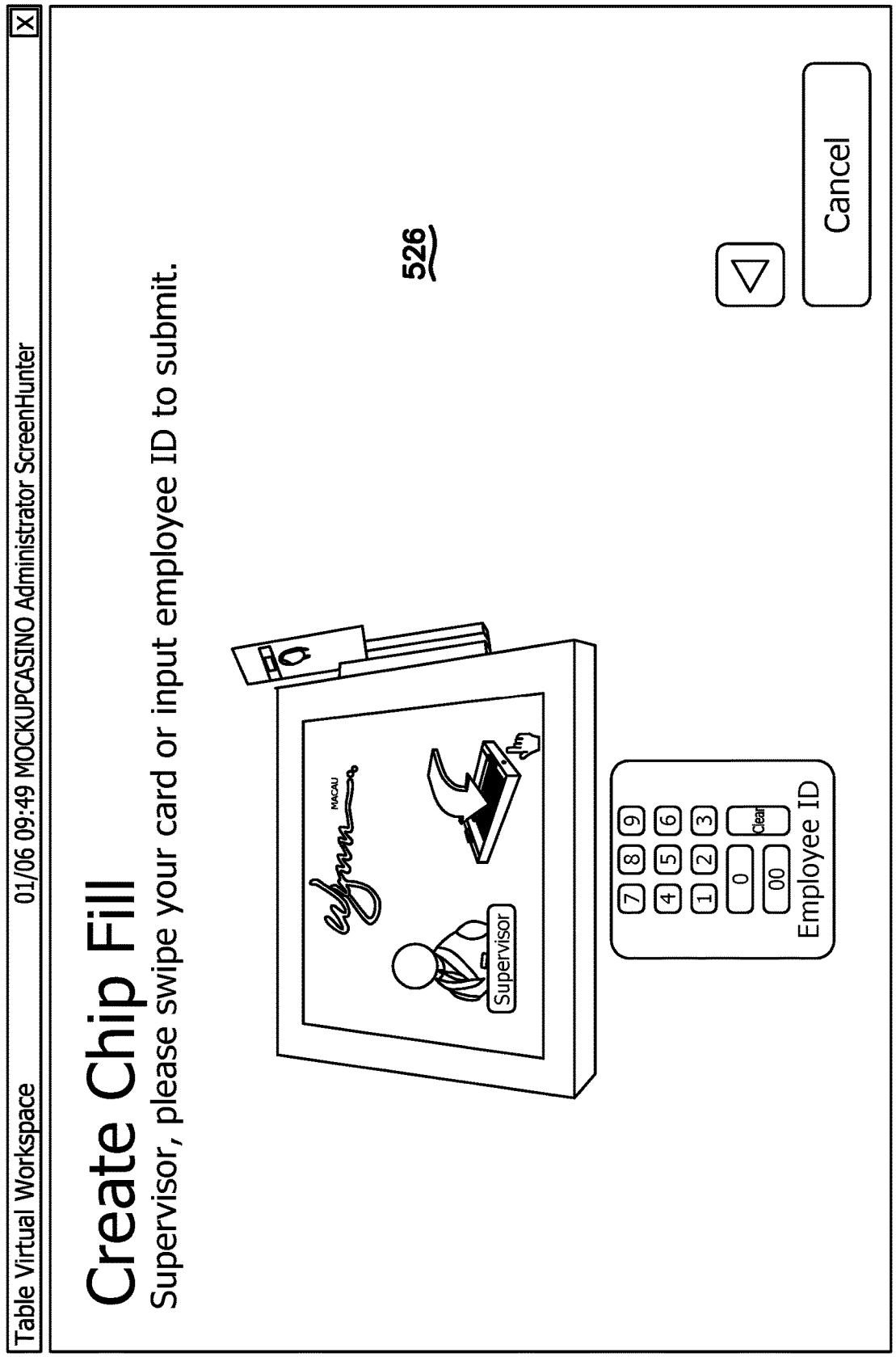
Figure 5C:
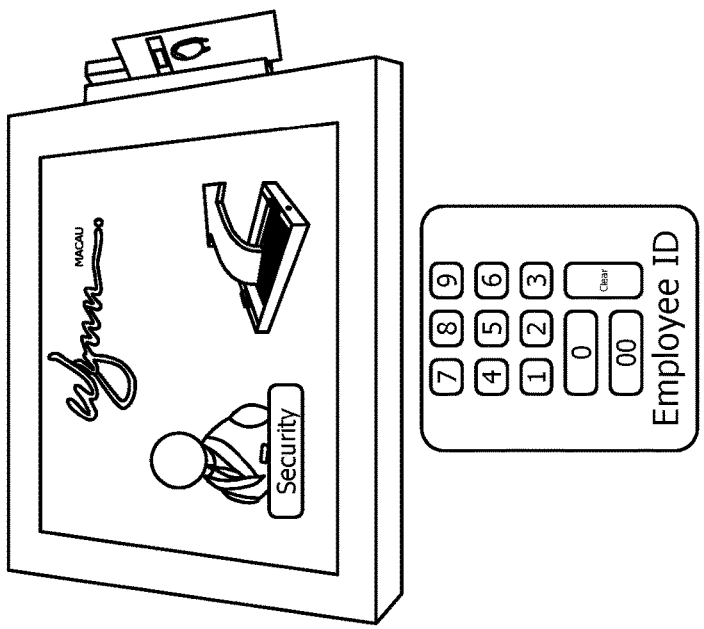
Figure 5D:
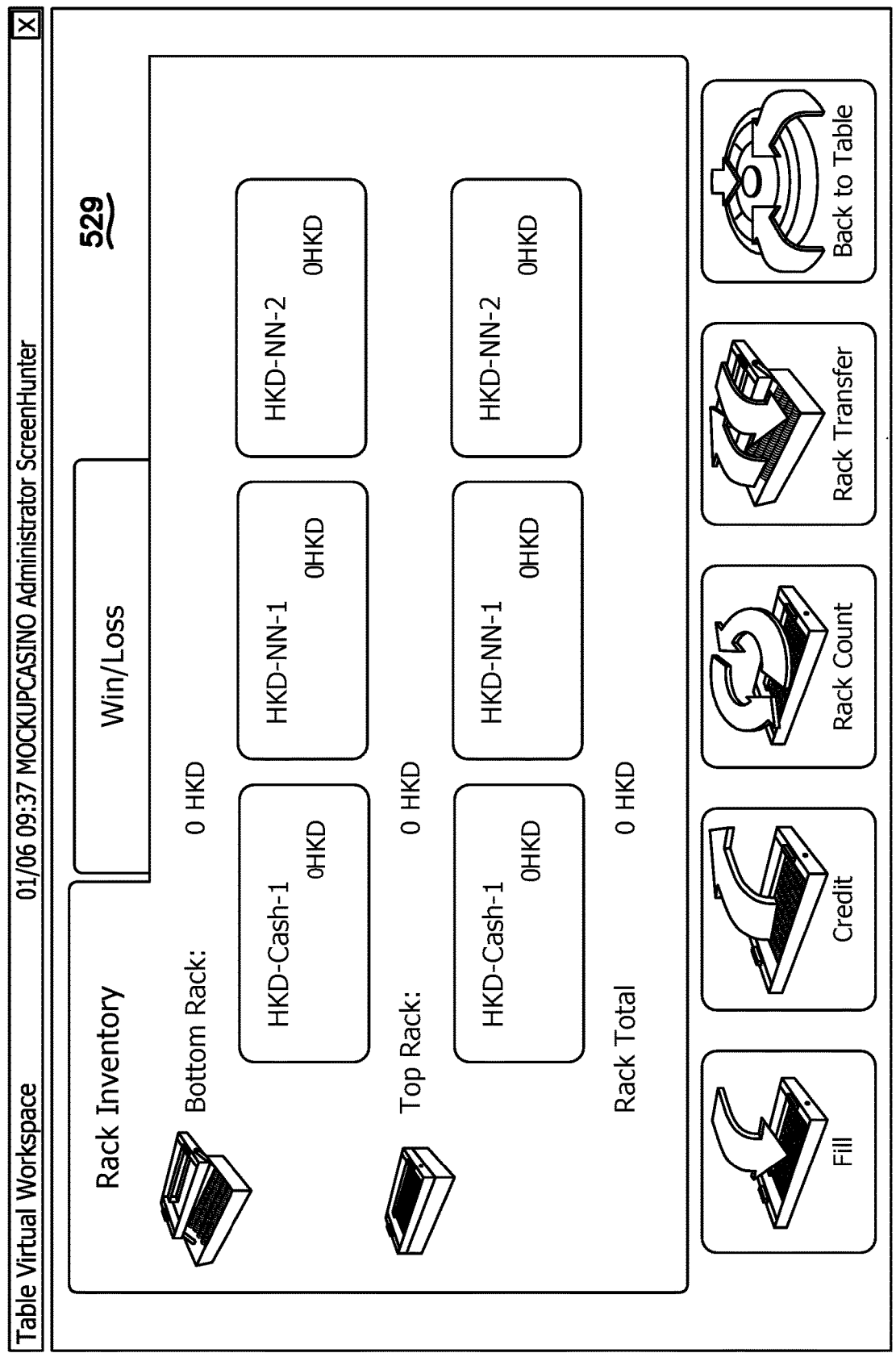
Figure 6A:
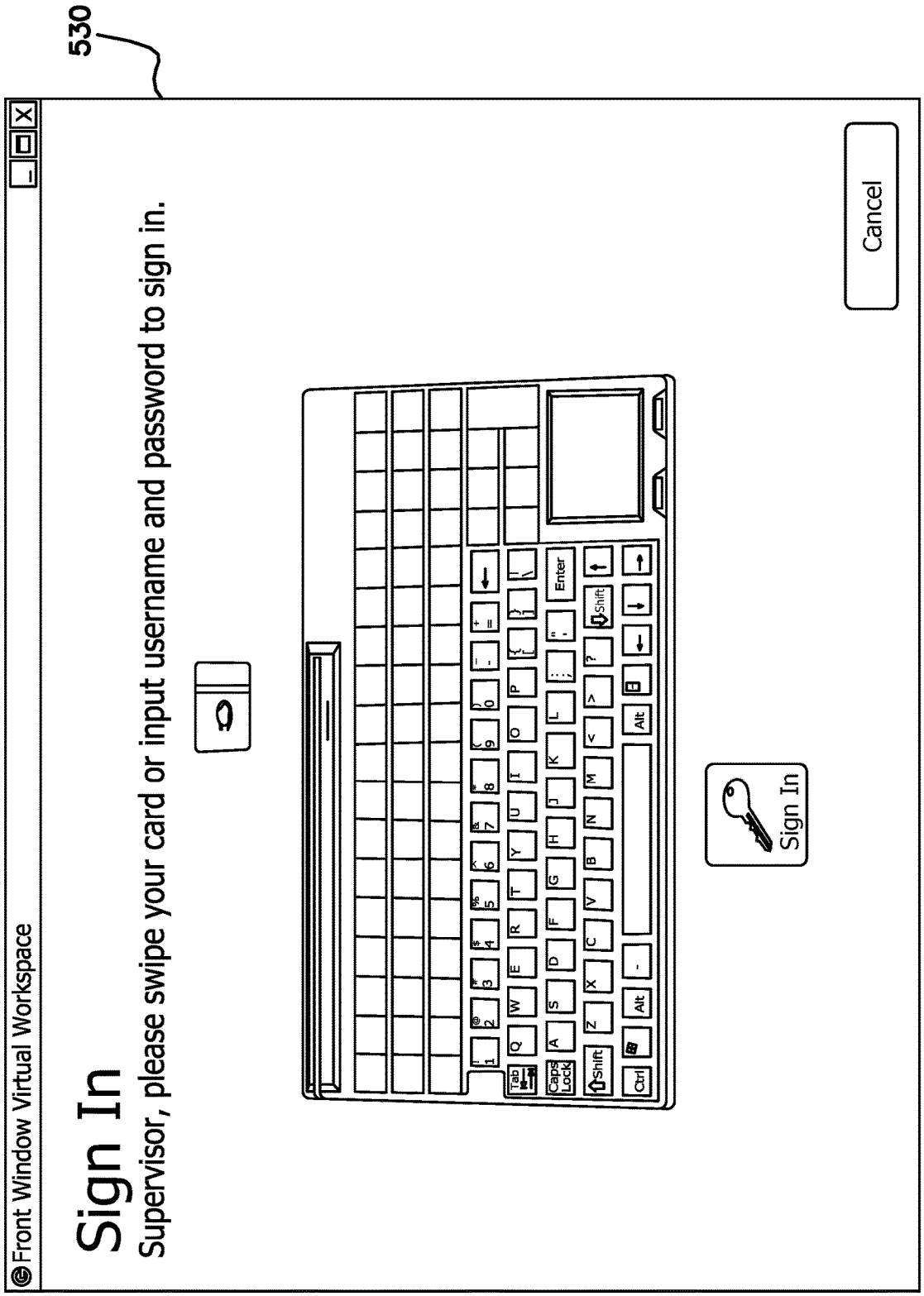
Figure 6D:
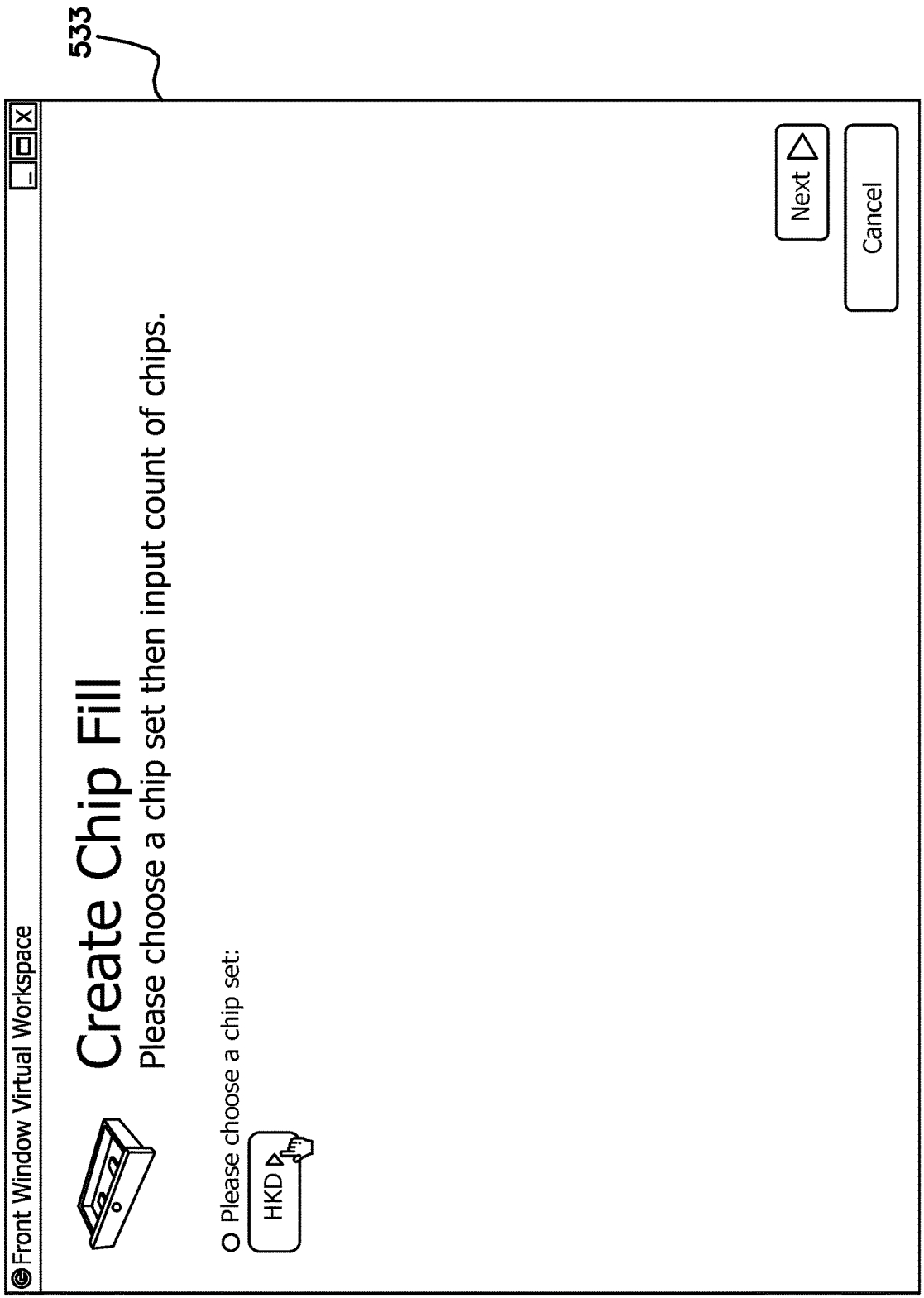
Figure 6F:
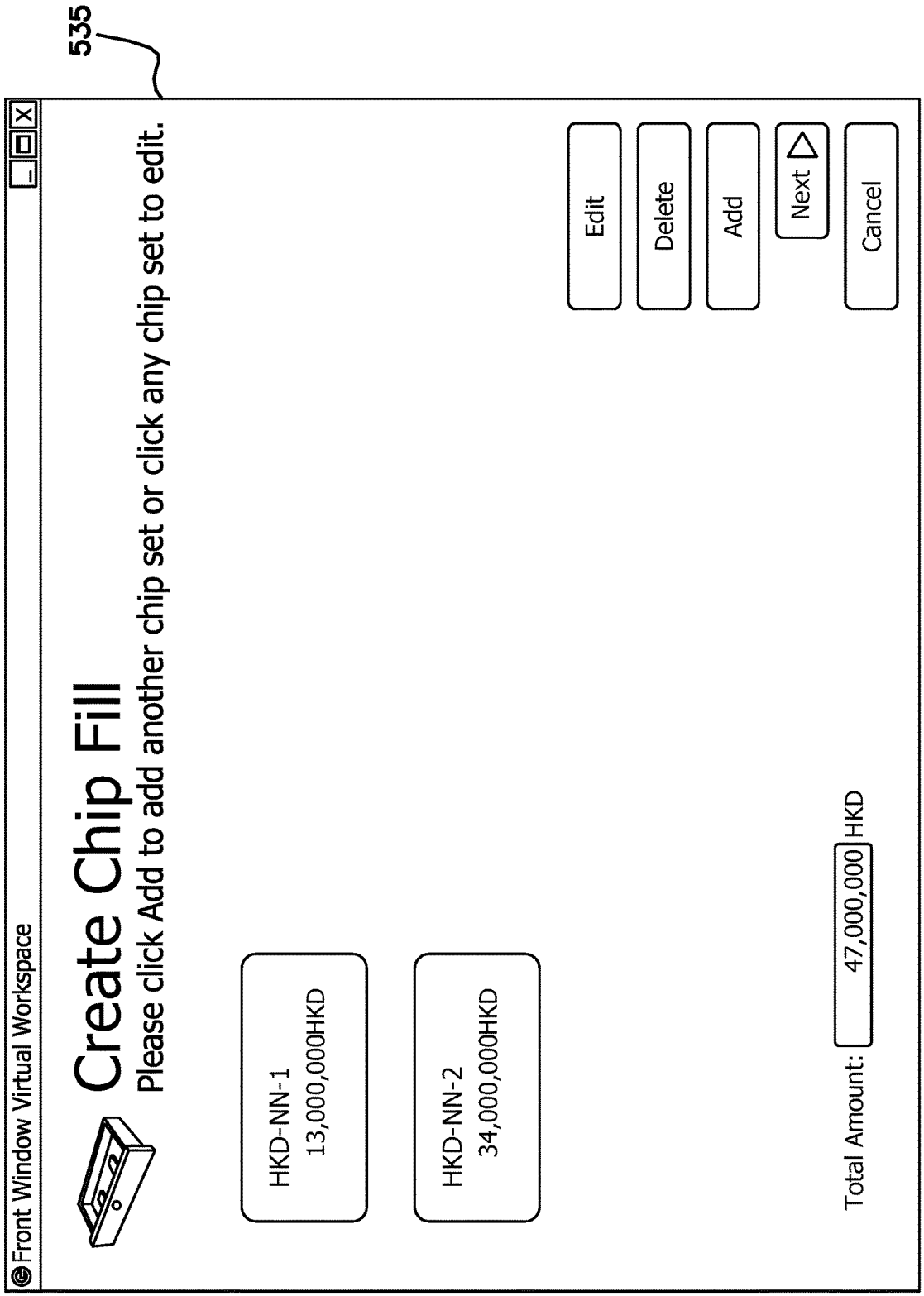
Figure 6G:
Figure 6H:
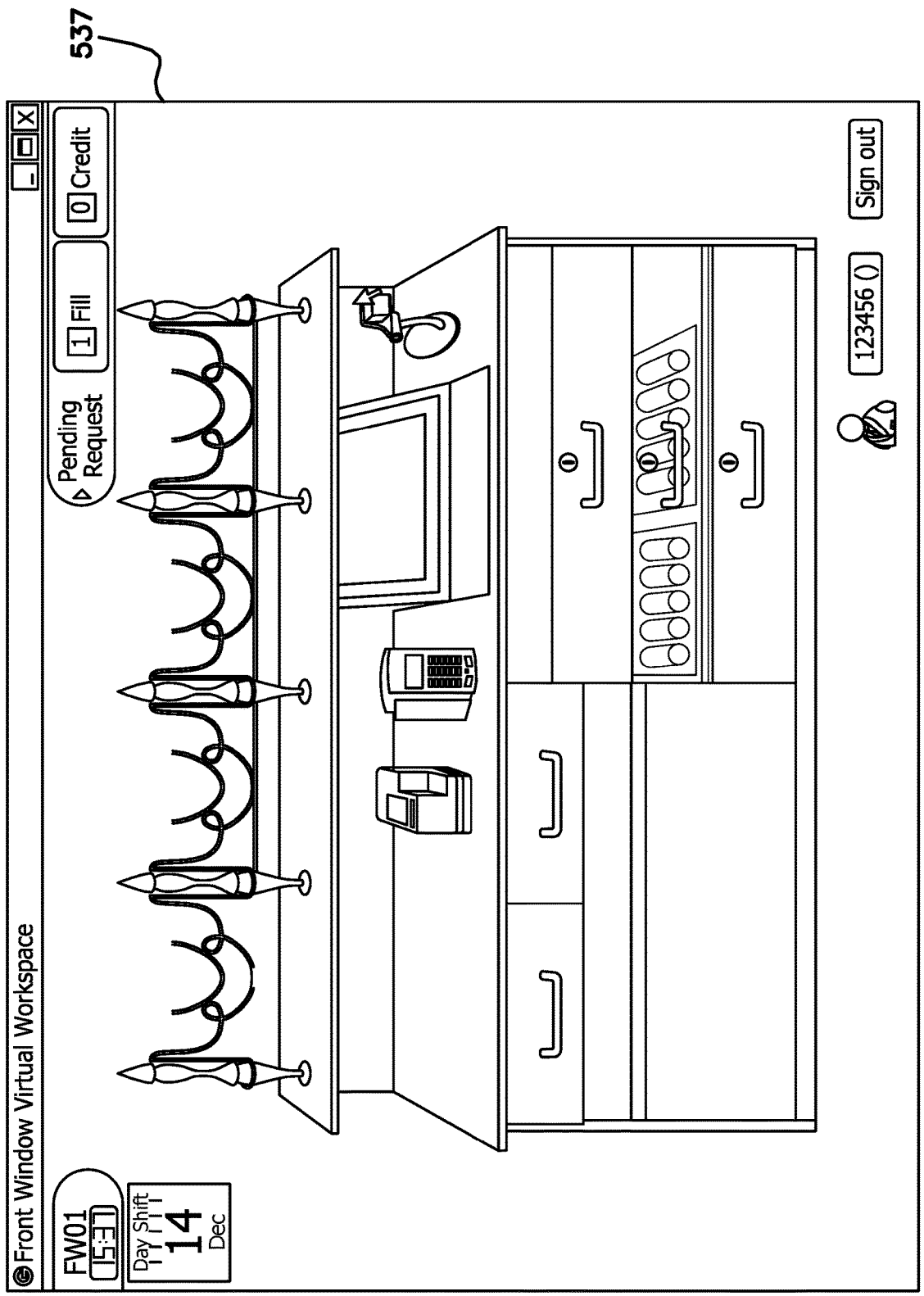

FIG. 4 shows a block diagram 400 of an exemplary business event (table fill request) being handled by the current system. The diagram 400 shows a table virtual workspace 405, cage virtual workspace 410 and gaming services module 415. A table fill request 420 is first initiated by the table virtual workspace 405 which is transmitted by, or via, the gaming services module 415 to the cage virtual workspace 410. The cage virtual workspace 410 responds to the gaming services module 415 with a request in process message 425 which is transmitted by, or via, the gaming services module 415 to the table virtual workspace 405. Next, the cage virtual workspace 410 sends a request in transit message 430 which is transmitted by. or via, the gaming services module 415 to the table virtual workspace 405. Finally, an accept fill request message 435 is initiated by the table virtual workspace 405 which is transmitted by, or via, the gaming services module 415 to the cage virtual workspace 410.

Communications between the various workspaces and the services is facilitated and maintained by the business event bus 310. Each workspace includes store and forward capability in the event that the workspace cannot connect to the business event bus 310 or service. In one embodiment, the system utilizes both queue and topics as the messaging mechanism. Queues are utilized when there is a need to utilize a group of receivers collaborating in a load balance mode wherein only a single receiver processes the message. Topics are utilize when a message needs to deliver to multiple receivers wherein each receiver receives a copy of the same message. Each virtual workspace communicates with the services using a single queue. System servers are configured in a load balance mode to provide almost unlimited scaling. Virtual workspaces receive messages using topics whereby each virtual workspace has a unique topic allowing other virtual workspaces such as the pit virtual workspace to receive the same messages. In this manner, other virtual workspaces are able to track the state of other workspaces by reading from the same topics.

One of a plurality of online data stores maintains and stores business event messages in a manner optimized for online data processing allowing certain reports (e.g., master gaming reports and win/loss reports) to be generated. Other data stores maintain and store corresponding data. As detailed more below, data from the online database is propagated to the enterprise data warehouse 155 from which more complex business intelligence reports are generated. In one embodiment, the online database is configured to: 1. gather all data items; 2. organize and normalize gathered data according to a master-detail design pattern; and 3. selectively de-normalize data to improve performance.

The propagation of the data from the online database to the enterprise data warehouse 155 is facilitated by transformation to an operation data store (ODS) periodically. The ODS consolidates data from multiple data sources (e.g., patron management system and food and beverage system). Data from the ODS is then periodically propagated to the enterprise data warehouse 155. ODS isolates online date stores from the enterprise data warehouse 155 allowing the simple addition of new data stores while minimizing the impact on the propagation of data from ODS to the enterprise data warehouse 155.

With the embodiments of the present invention, a business operation requires one or more steps to complete. For example, a chip fill request comprises multiple steps (see FIG. 4) while a buy-in operation has only a single step. All business operations are handled by the business process service regardless of the number of steps required to complete. The business process service manages the full life cycle of each business process by keeping track of the state using a system such as IProcess workflow engine developed and marketed by TIBCO. IProcess transitions workflows to a next required step. IProcess assigns a unique case ID to a new workflow item allowing the workflow item to be tracked. Each subsequent related workflow item has the case ID embedded therein such that IProcess is able to match subsequent workflow items with the related workflow items.

The system according to the embodiments of the present invention, is configured to operate with multiple applications. Once a message is received and processed, the system routes the message to an appropriate destination based on message type. For example, responsive to a fill request message, the fill request message is routed by the system to cage virtual workspace. On the other hand, if the message is related to a rating, the message is routed by the system to patron management application. The messages are routed by placing the messages onto a queue or topic in the enterprise business event bus 310. The business event bus 310 supports at least two types of routing mechanisms comprising a message type and message property with message type. Using such elements of the message, routing decisions are made based upon configuration (e.g., all fill requests from the pits go to a designated queue) or evaluation rules (e.g., all fills from Property Club X exceeding amount Y and during prime operating hours, are routed to the queue servicing the main chip bank).

Routing (by message type) services retrieves the queue/topic information based on the message type. For example, a rating related transaction is dispatched to the patron management system via integration services. Integration services handles non-compliant applications which cannot be sent via the enterprise business event bus.

Routing (by message property with message type) retrieves routing information based on the property of a message. For example, with a fill request the request includes a property along with the primary and the backup chip bank. Routing services then determines which chip bank to route the request by placing the message into the correct queue/topic of the enterprise business event bus. A response to the fill request needs to return to the table requesting the fill. Accordingly, each table is configured to receive messages via topics. Routing services retrieves the topic name from the message property and places the message into the correct topic.

The system includes security in the form of authentication and authorization. Only valid users are permitted to access and utilize the system. In one embodiment, authentication is facilitated by Active Directory (AD) developed and marketed by Microsoft of Redmond, Wash. In such an embodiment, each user of the system must have a valid, active account in AD. Casinos have varying levels of required security relative to accessing the system based on redundant security systems already prevalent in most casinos. For example, table game personnel sign in to the system using an ID card which is swiped through a card reader. This is enough security given the security cameras and physical security in the pit areas. The card swipe is quick and desired more so than enhanced system in the game table area. In other areas, having less security, personnel may be required to access the system via a card swipe and entry of an ID password. In one embodiment, the system secures permission against an AD global group. The group represents a single user. The various AD user accounts that represent this user are collected under the AD global group. The system treats the group as a user for use in securing permissions to the system.

The system models its permissions in the context of businesses processes and are tied closely to the underlying software and database design. Thus, there are read/write/update/delete permissions for every data object in the system. The system presents the business processes (e.g., fill, credit, view report, etc.) as the units of function and data to secure.

The system can be adapted to a large number of different environments using different configurations. A configuration service manages configurable parameters. A system management configuration database stores parameter information of configurations. All table specific, game specific, role specific and user specific information is stored in the system management configuration database. For user and workspace specific configuration, the key into the database is the AD user account and the AD workspace name, respectively. An administrative tool generates an association between the data in the AD user account and the data in the system management database.

Figure 5N:
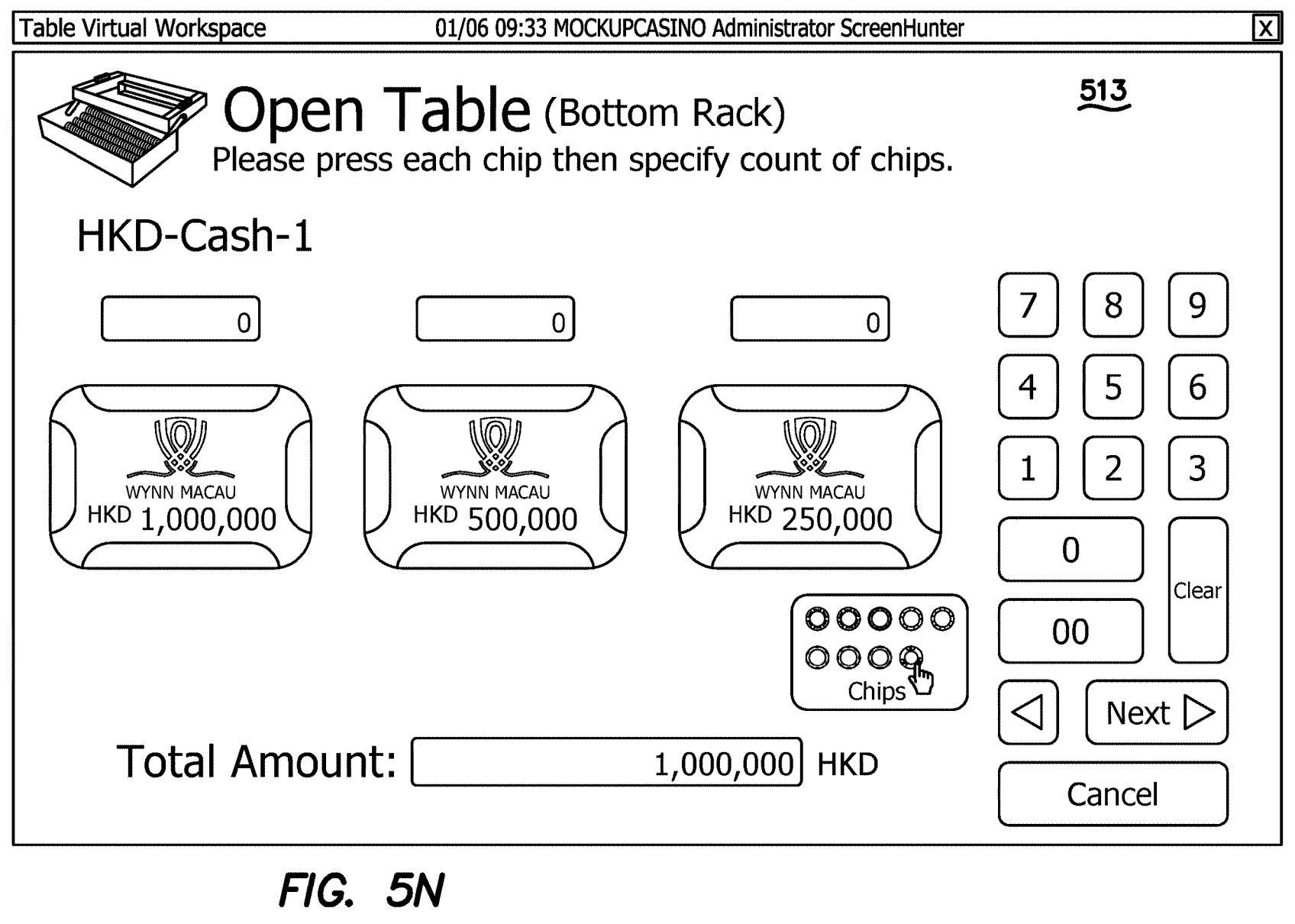

FIGS. 5a-5dd illustrate user screen shots 500-529 of a virtual table workspace according to the embodiments of the present invention. Screen shots 501-504 show screens used to open the virtual table workspace by inputting a PIN or swiping an ID card. The same procedure may be used to switch out personnel. Screen shot 505 shows the virtual table while screen shot 506 shows the virtual table with two (2) fill requests pending. Screen shot 507 shows the two fill requests in drop-down style responsive to a user clicking on the fill icon. Screen shot 508 shows table minimum and maximum fields which may be changed via the screen 508 and one or more subsequent verification screens. Screen shots 509-518 show chip counting GUI which allow the dealer to input the chip counts and chip types when opening and closing tables. Screen shots 519-520 show chip fill and credit status windows permitting dealers to determine when the fill or credit requests will be fulfilled. Screen shots 521-528 show chip fill and credit GUIs allowing dealers to input ship fill and credit requests. Screen shot 529 shows a Rack Inventory and Win/Loss GUI.

FIGS. 6a-6l illustrate user screen shots 530-541 of a front window workspace according to the embodiments of the present invention. Screen shot 530 shows a virtual front window workspace sign in GUI. Screen shot 531 shows a virtual front window workspace. Screen shot 532 shows a GUI depicting active fill, credit and chip count icons. Screen shots 533-538 show various stages of the chip fill creation process. Screen shots 539-541 show various chip count windows.

Figure 7A:
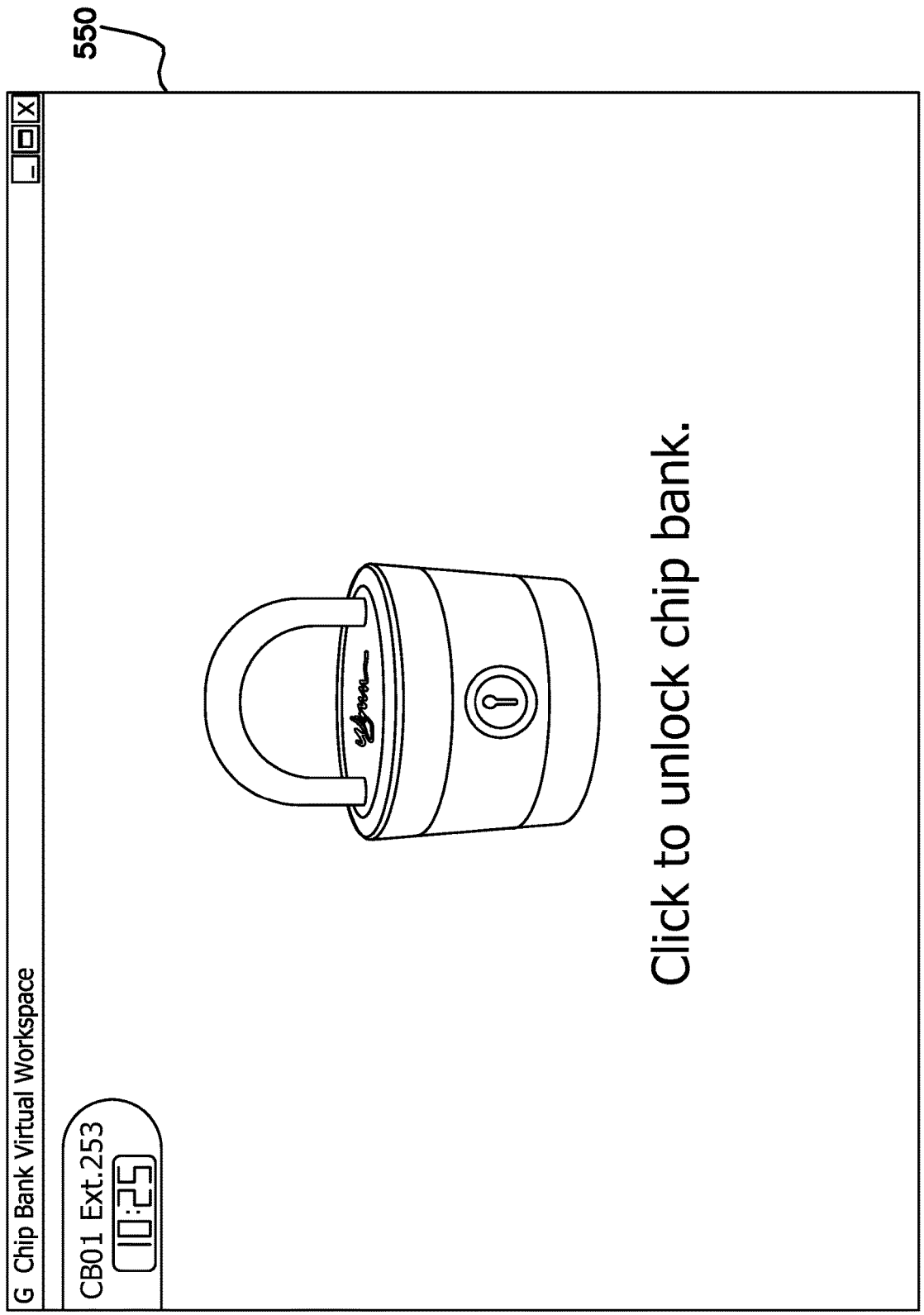
FIGS. 7a-7x illustrate user screen shots of a chip bank virtual workspace according to the embodiments of the present invention.
Figure 7B:
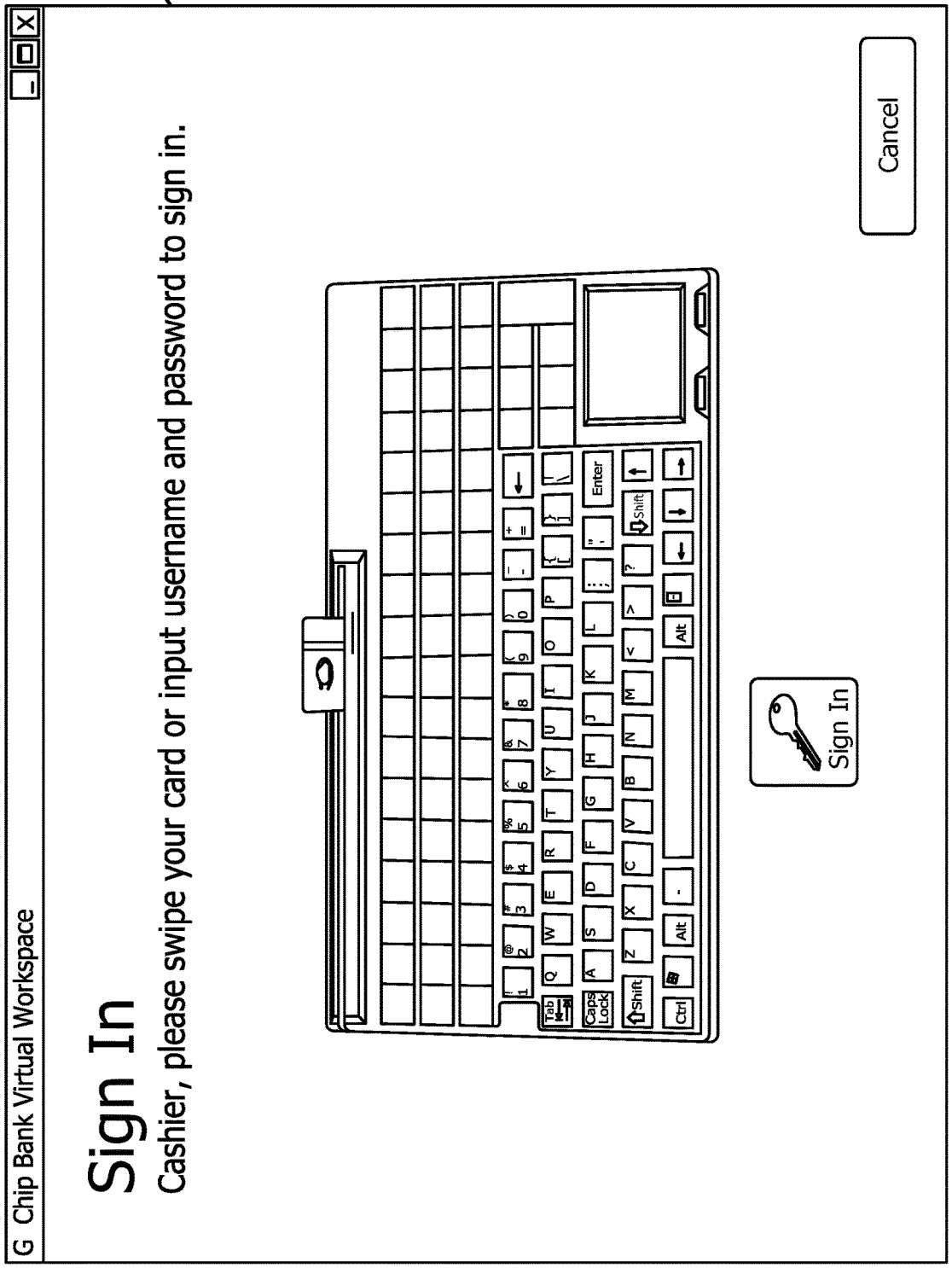
Figure 7C:
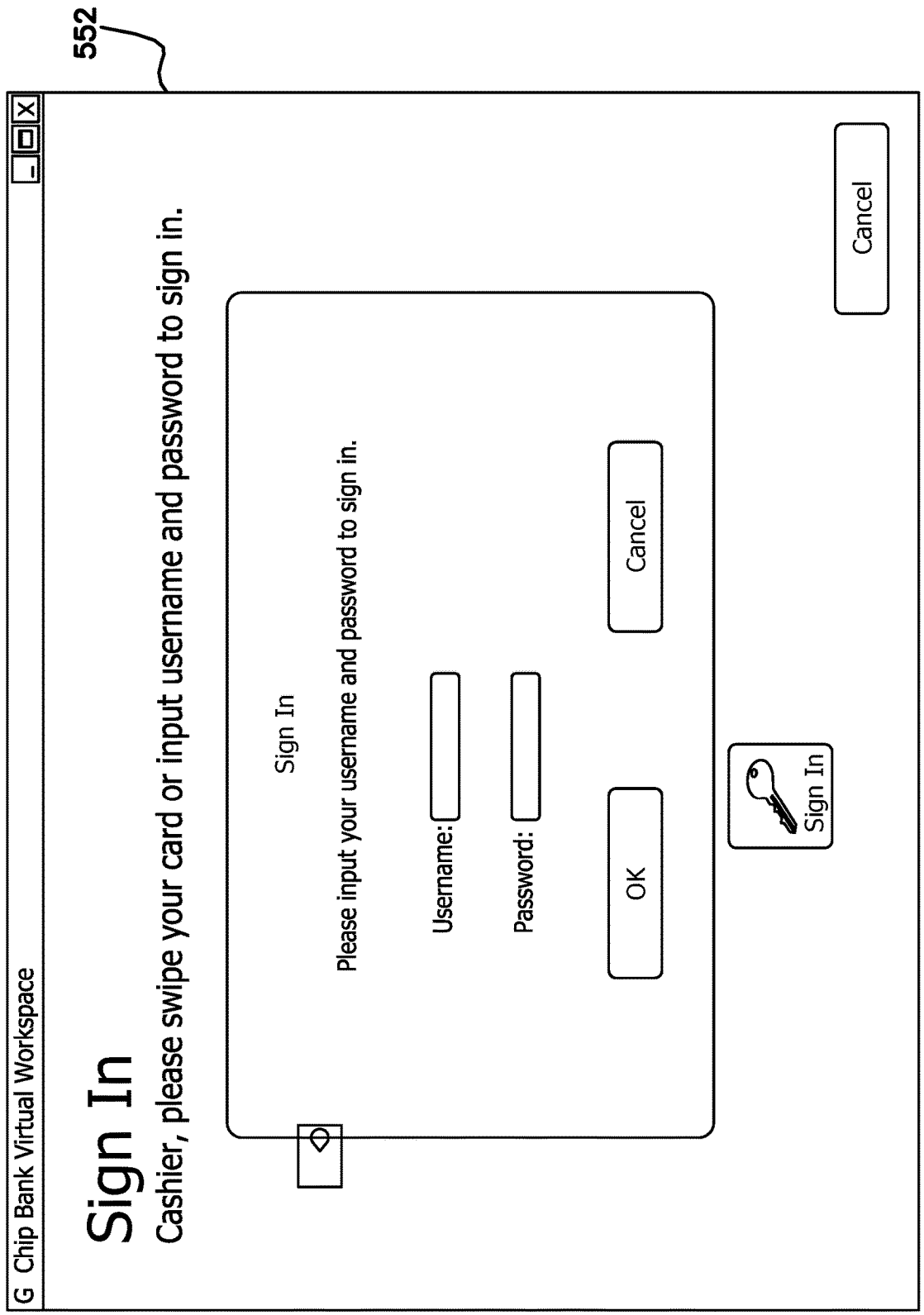
Figure 7D:
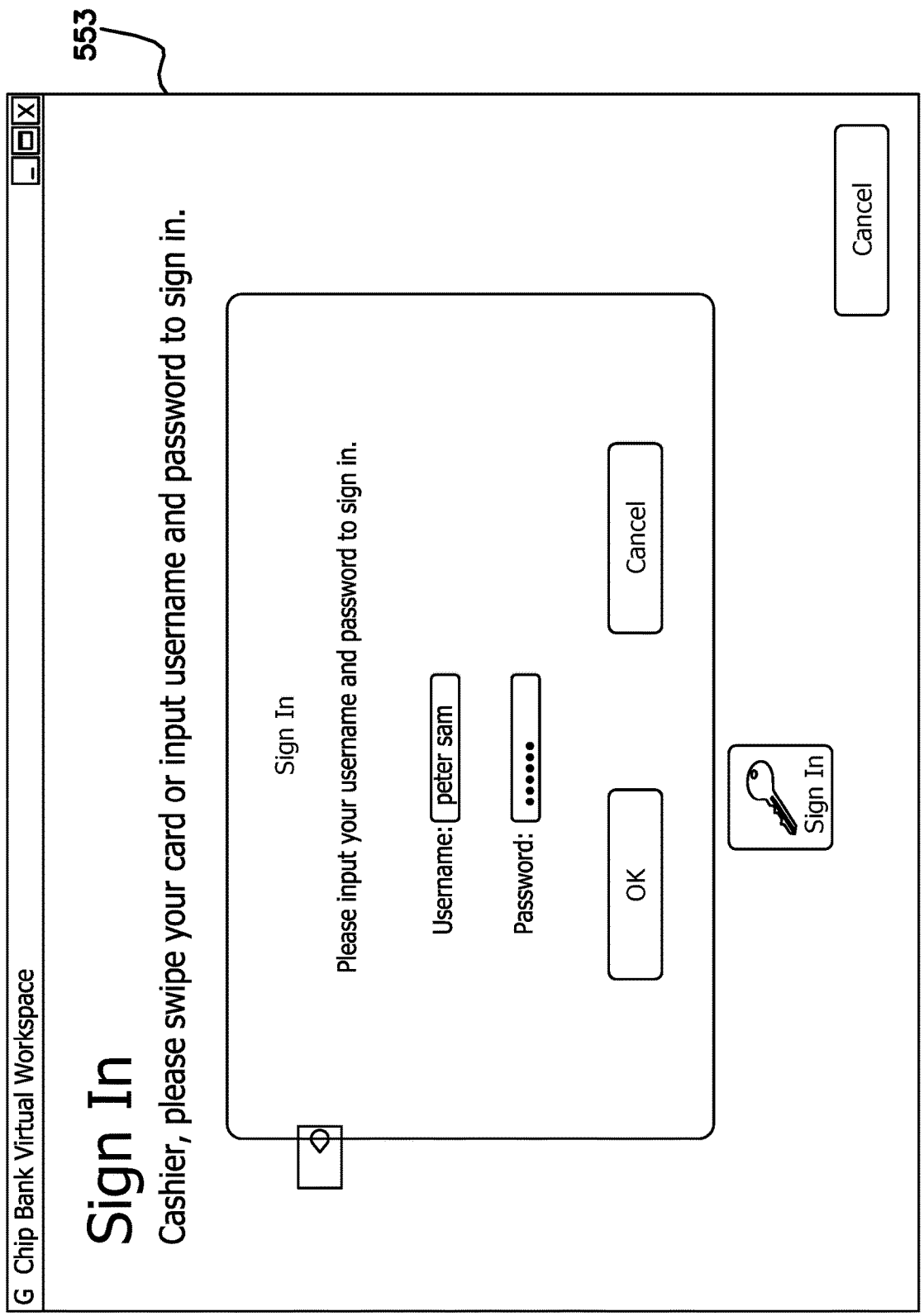
Figure 7E:
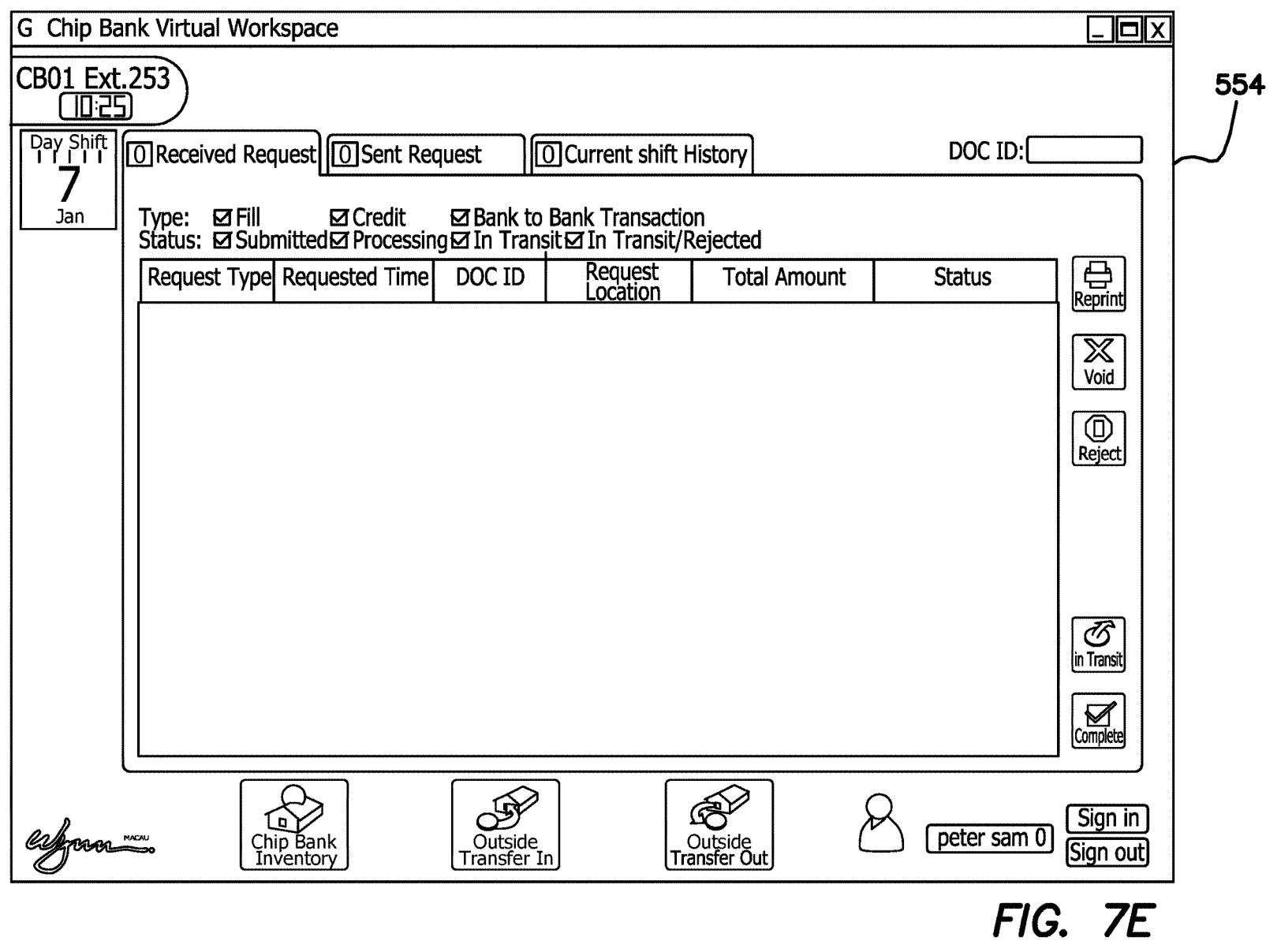
Figure 7K:
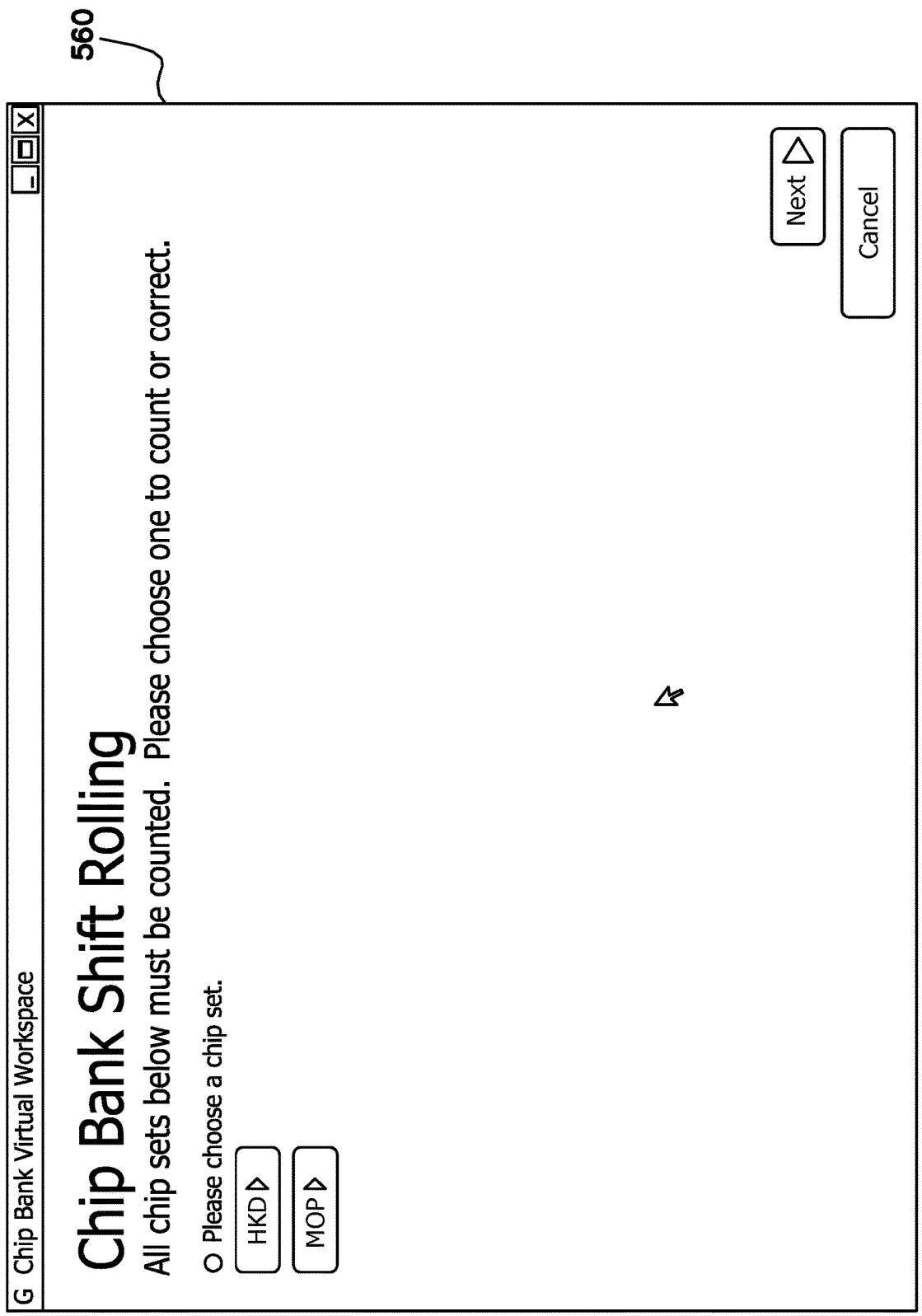
Figure 7N:
Figure 7P:
Figure 7R:
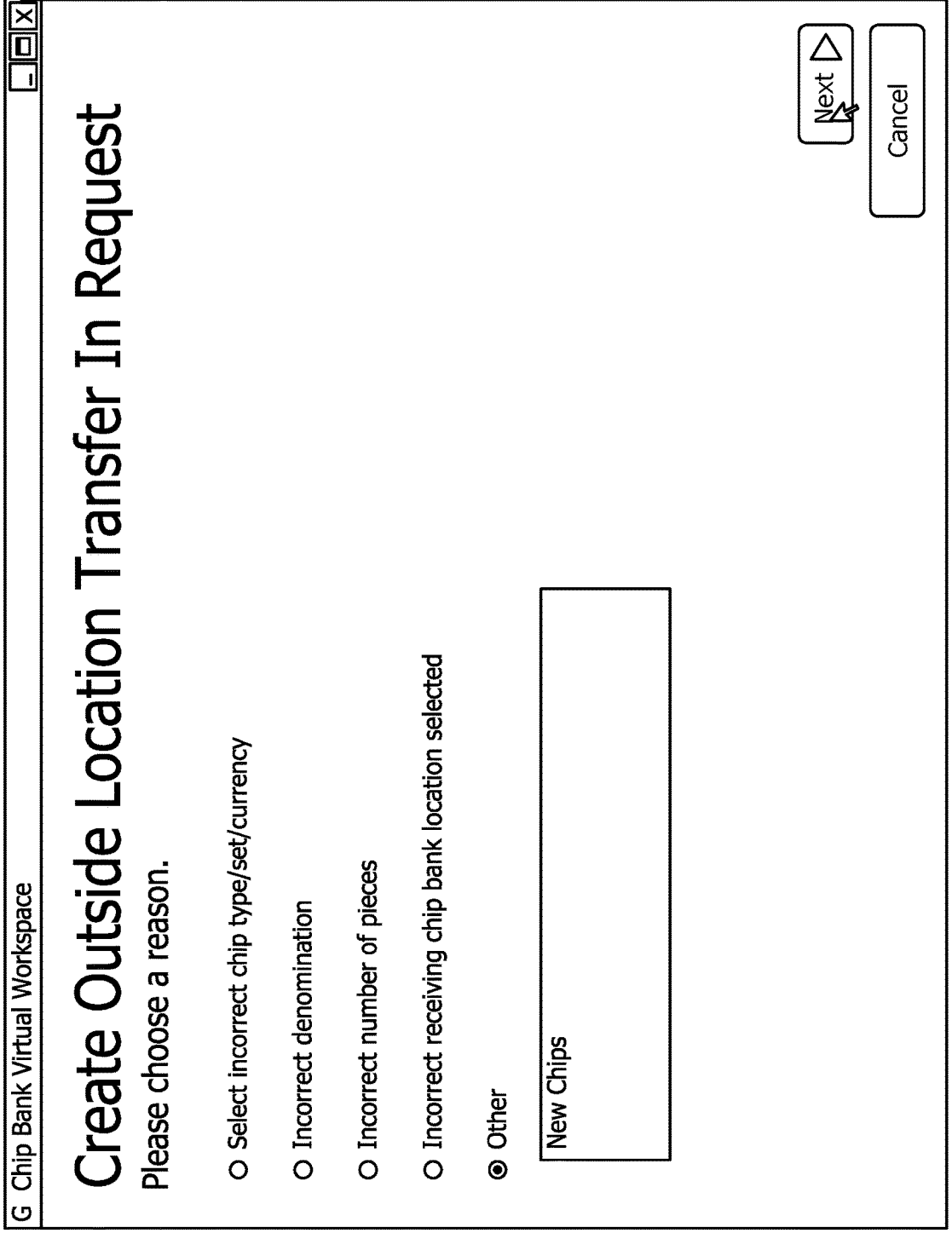
Figure 7U:
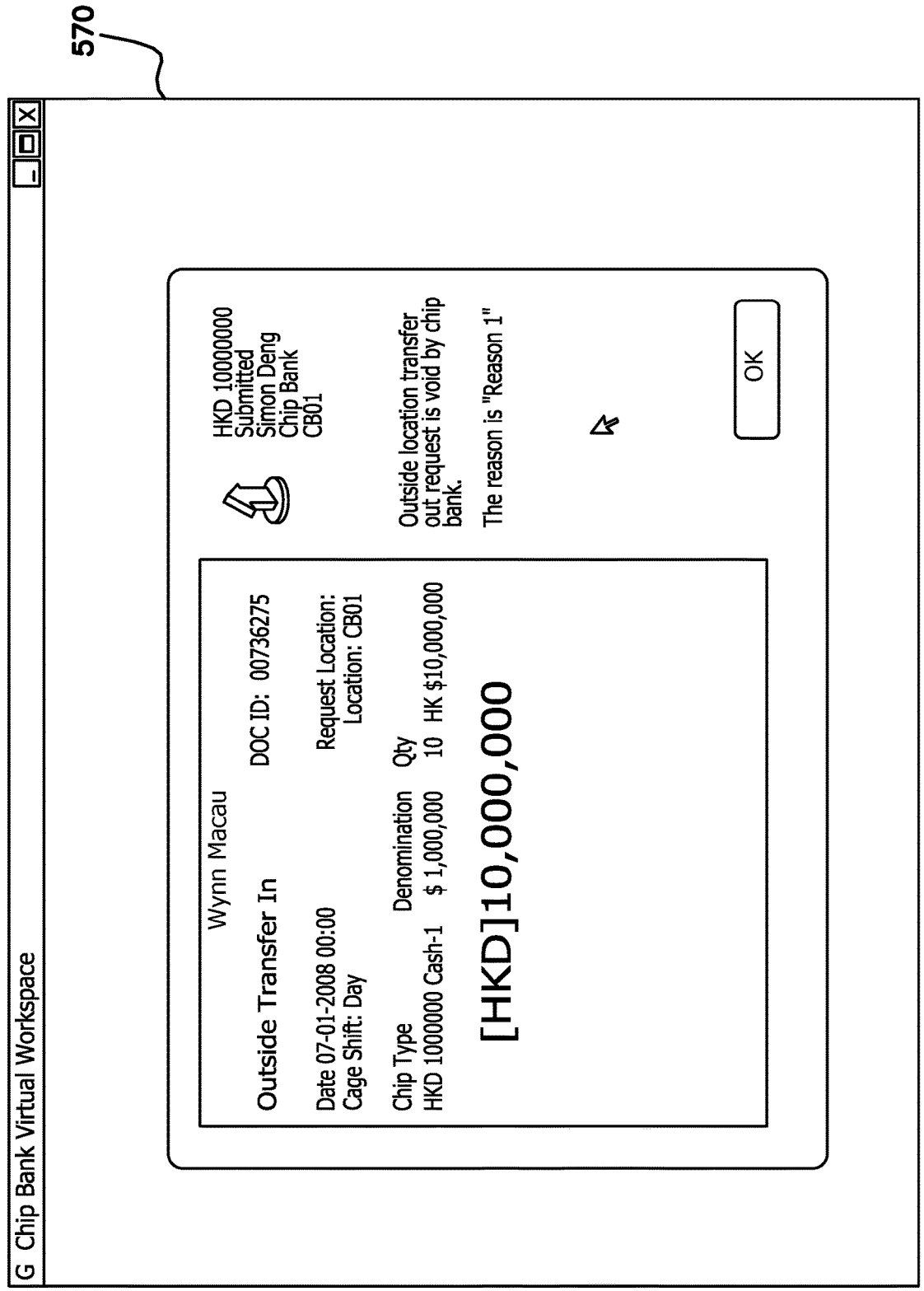
Figure 7W:
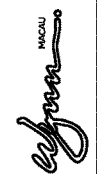
Figure 7X:
Figure 8A:
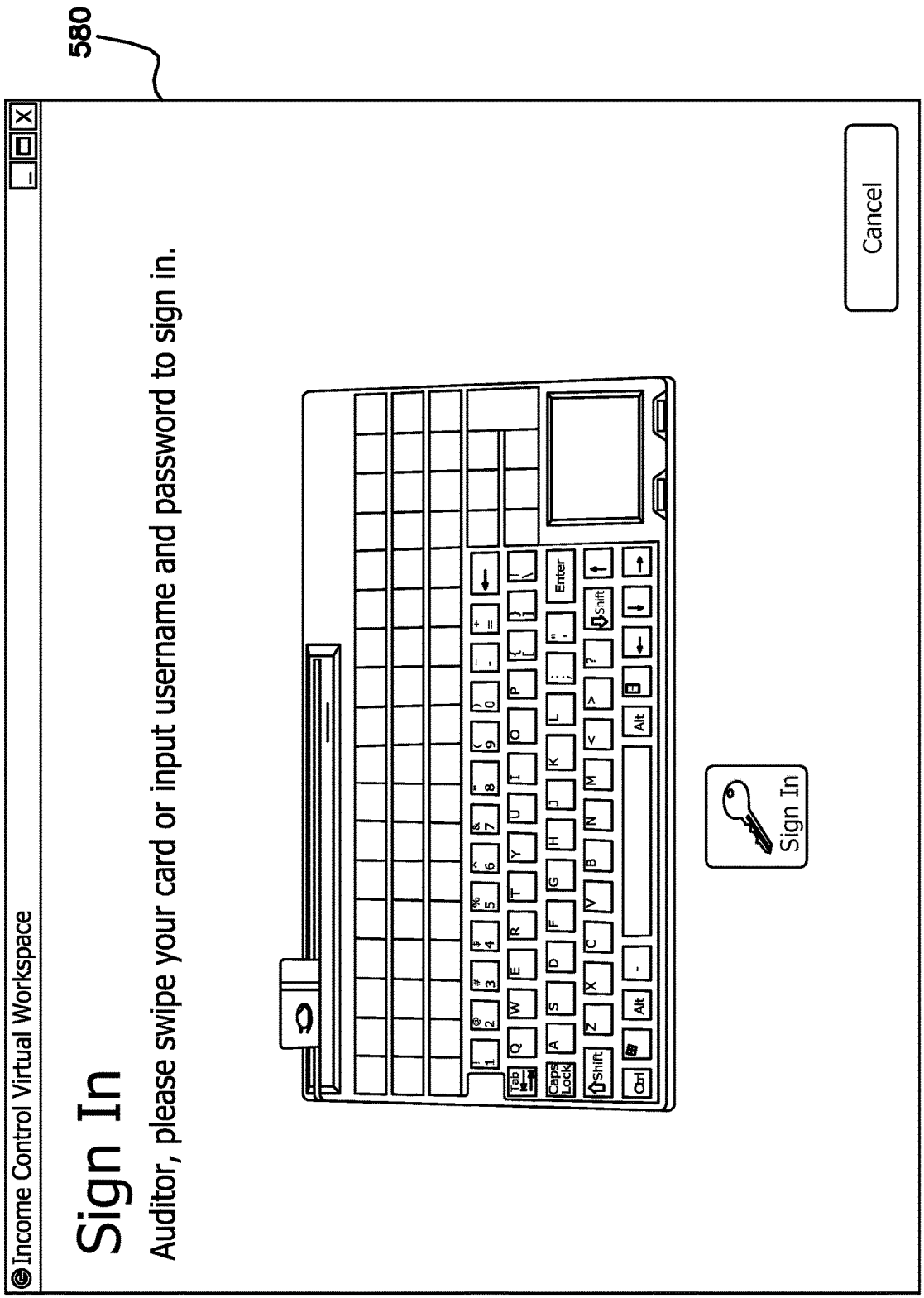
Figure 8B:
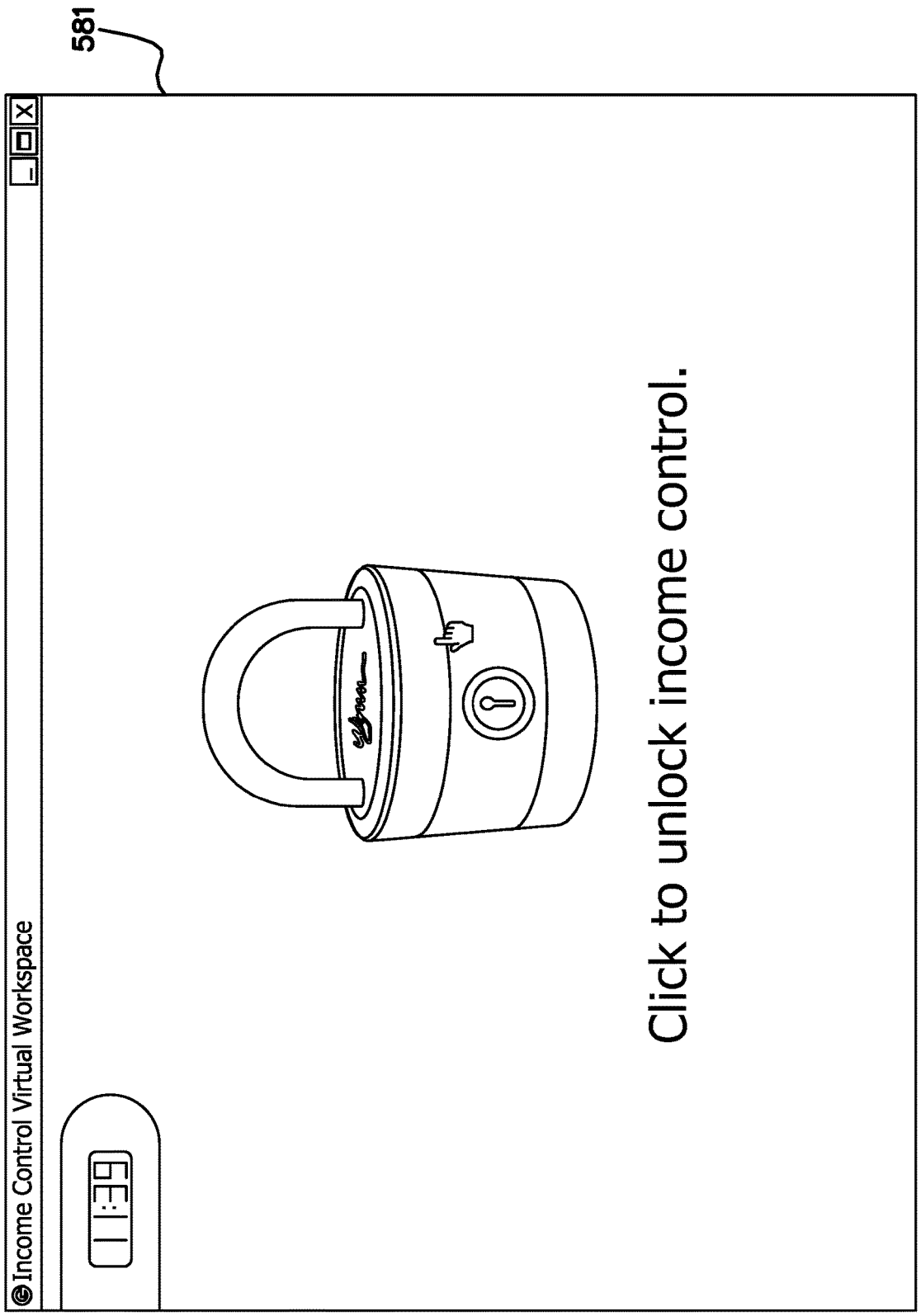
Figure 8C:
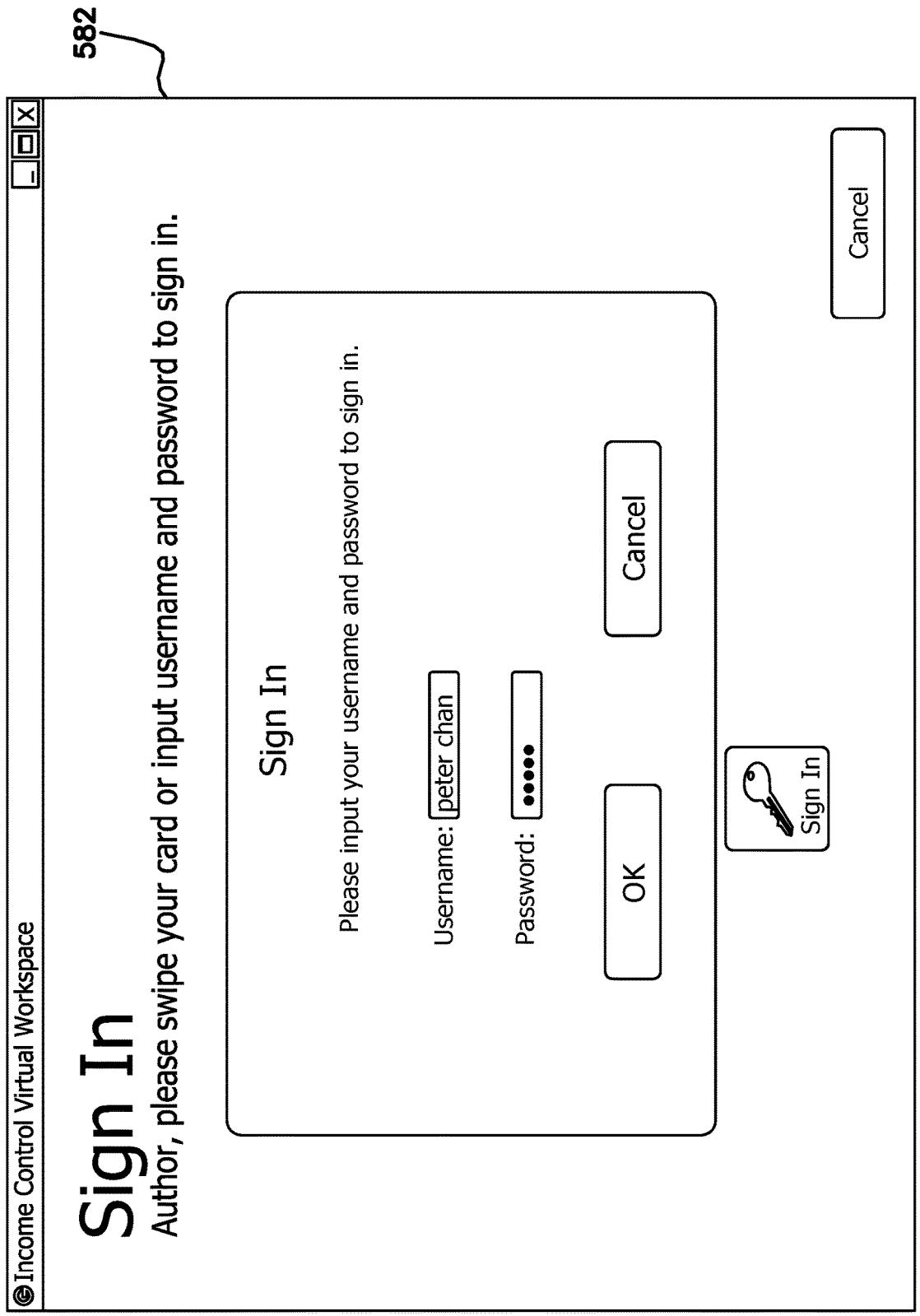
Figure 8E:
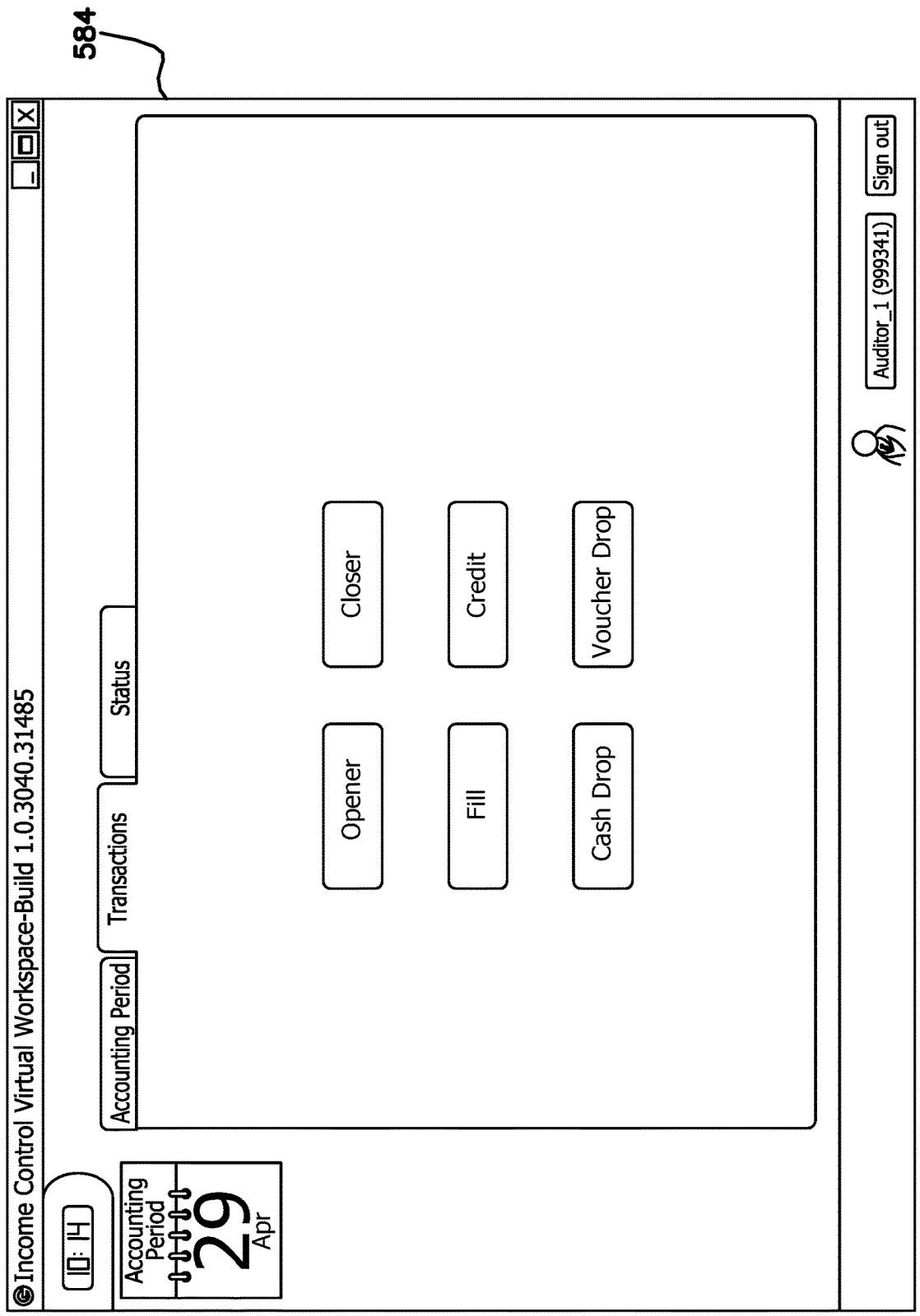
Figure 9A:
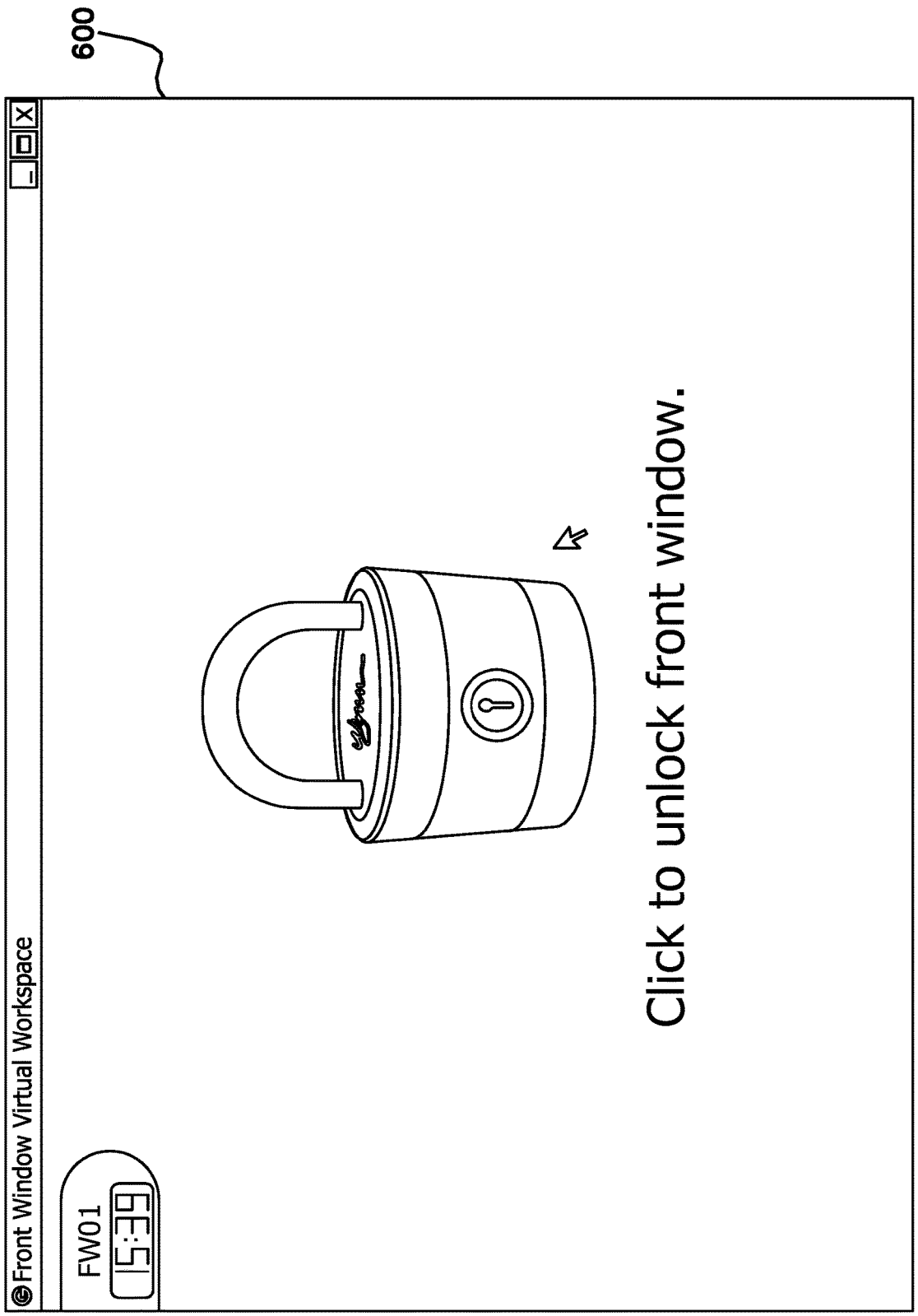
Figure 9B:
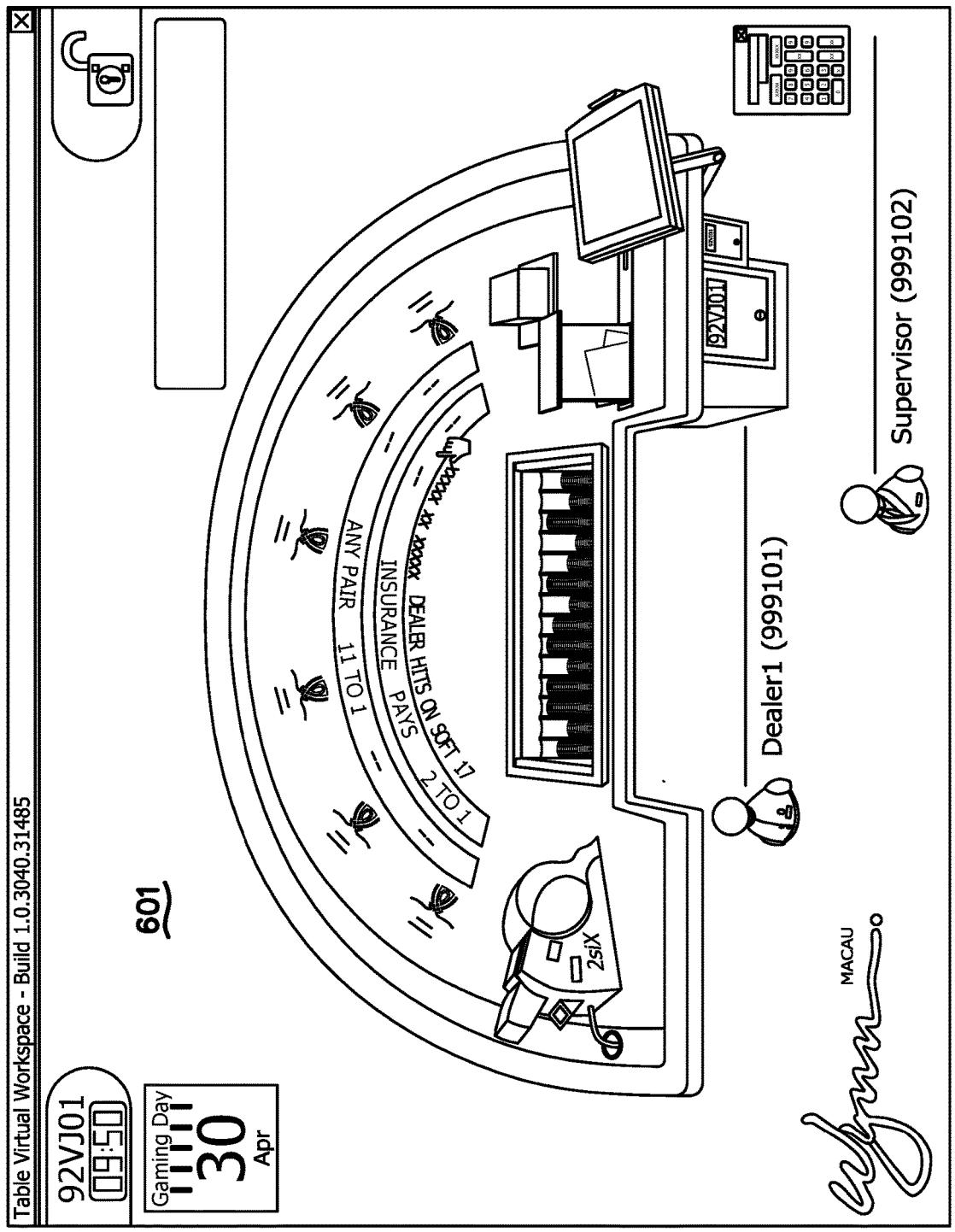
Figure 9C:
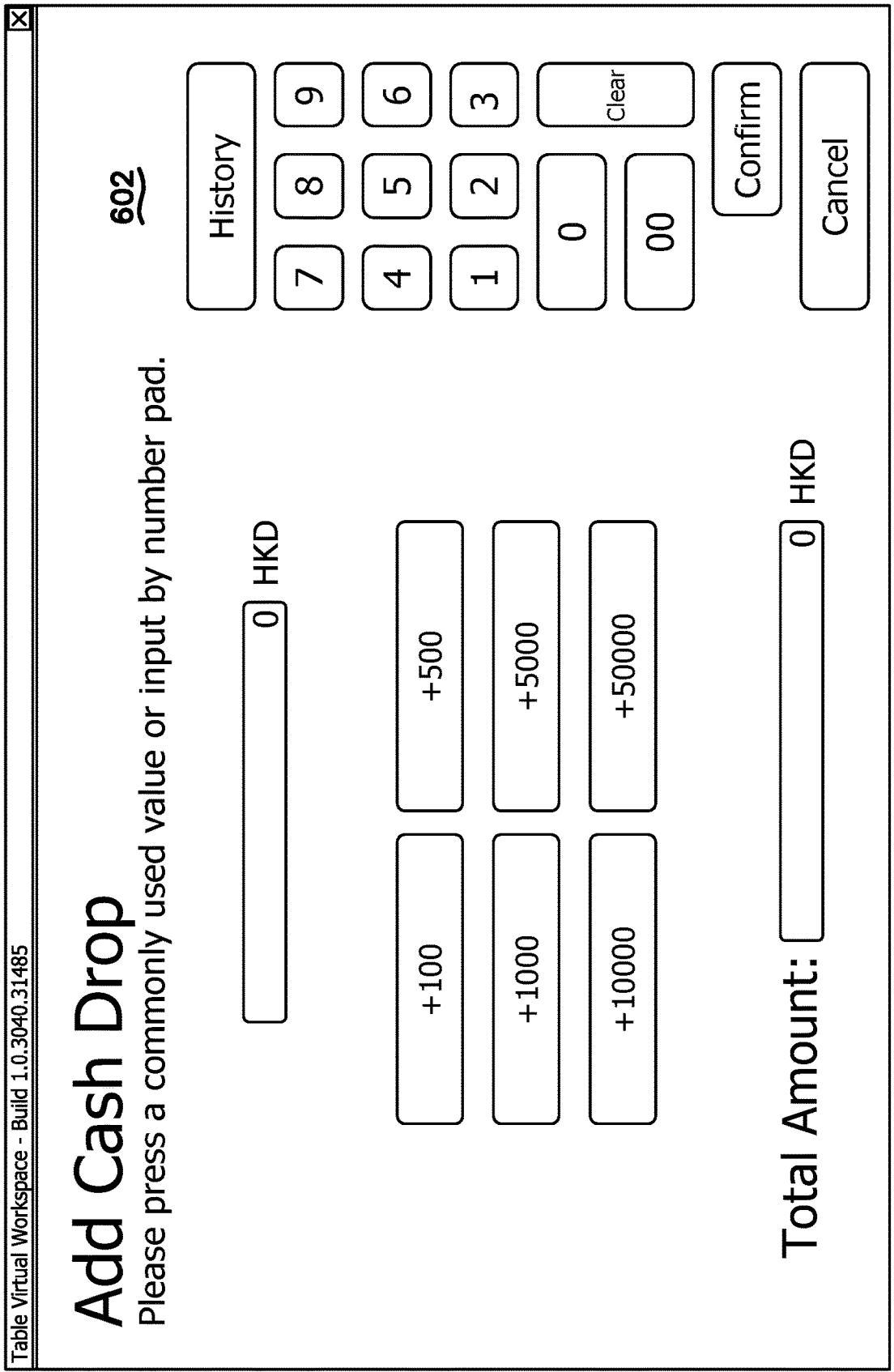
Figure 9E:
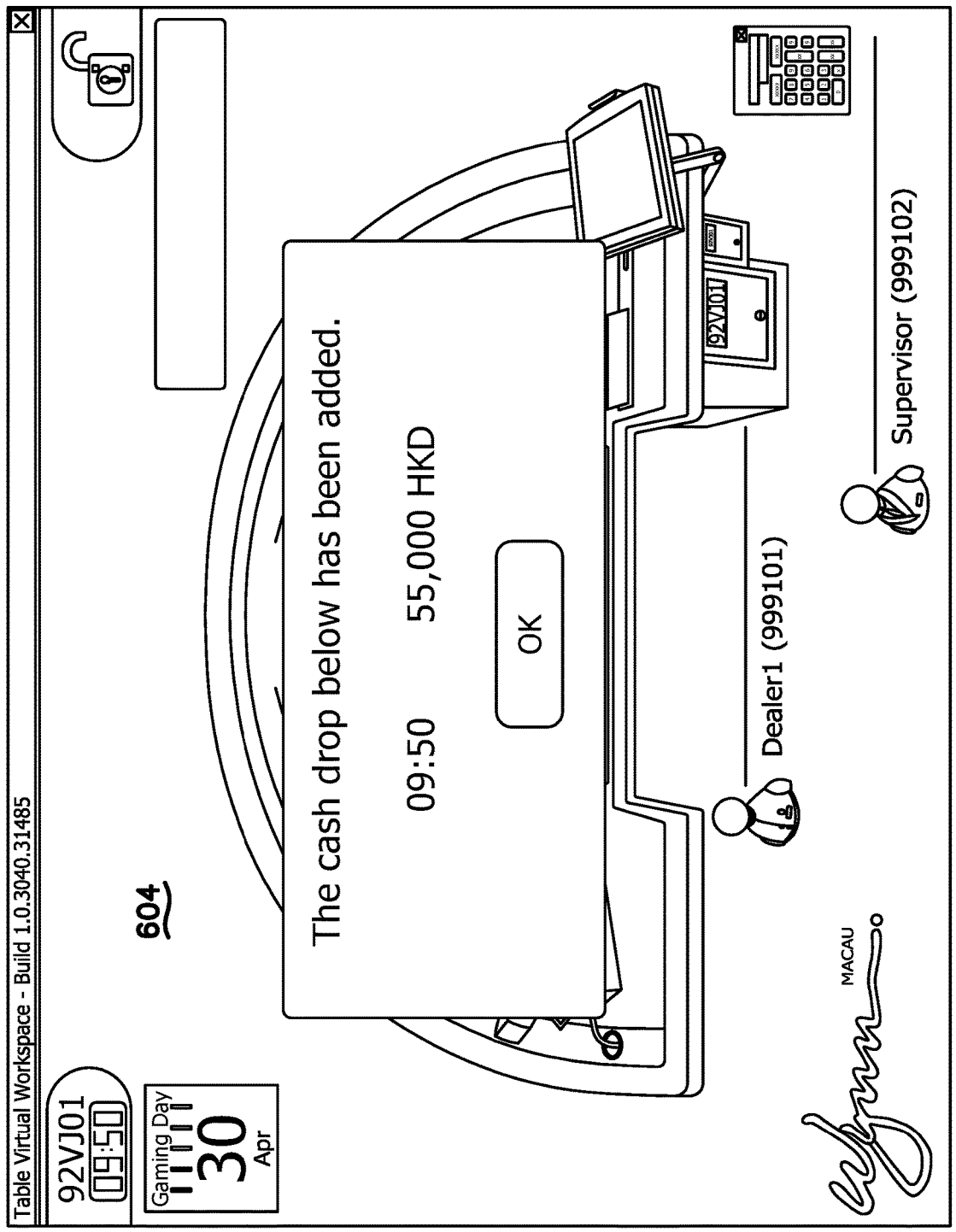
Figure 9G:
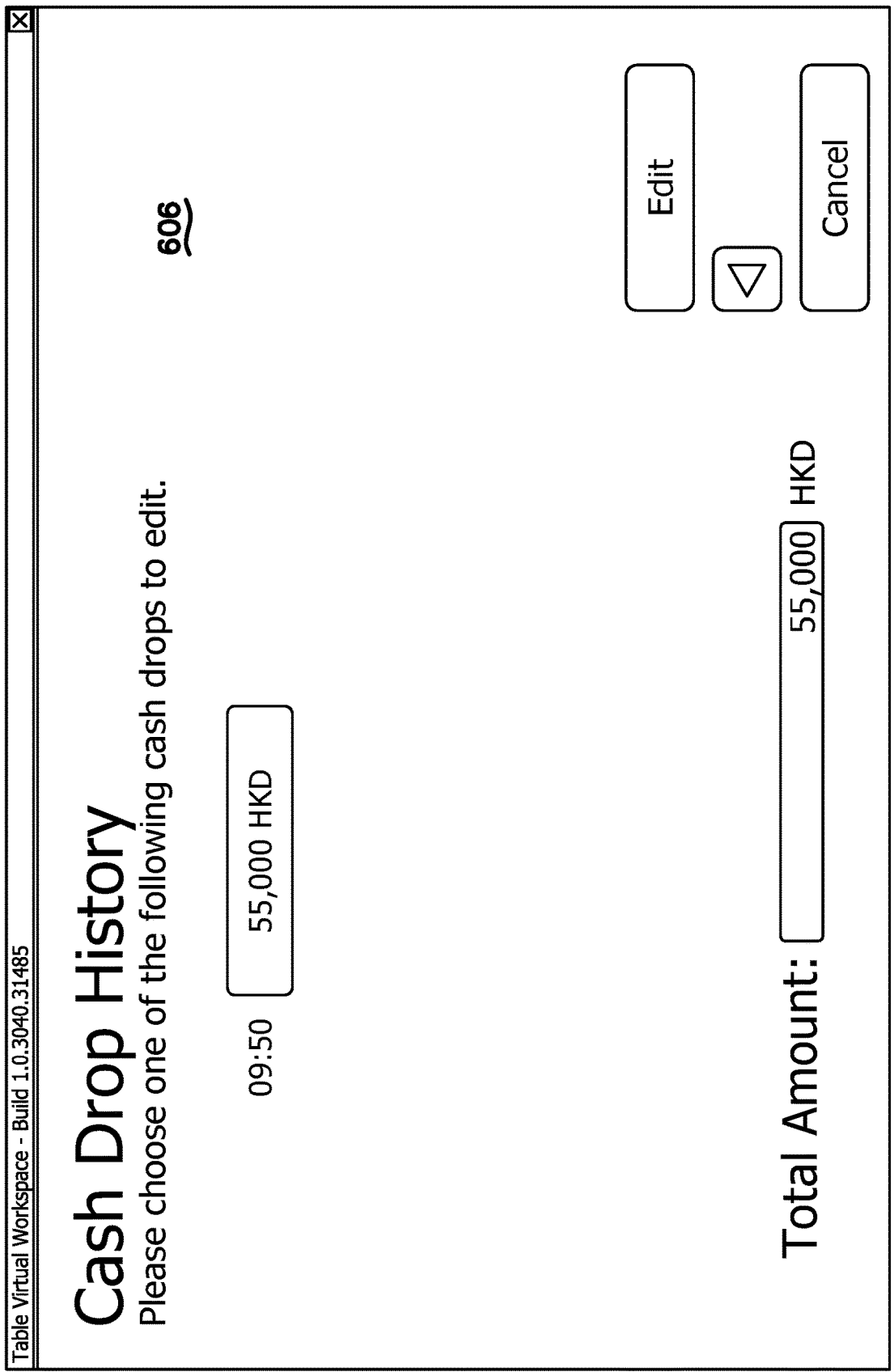
Figure 9K:
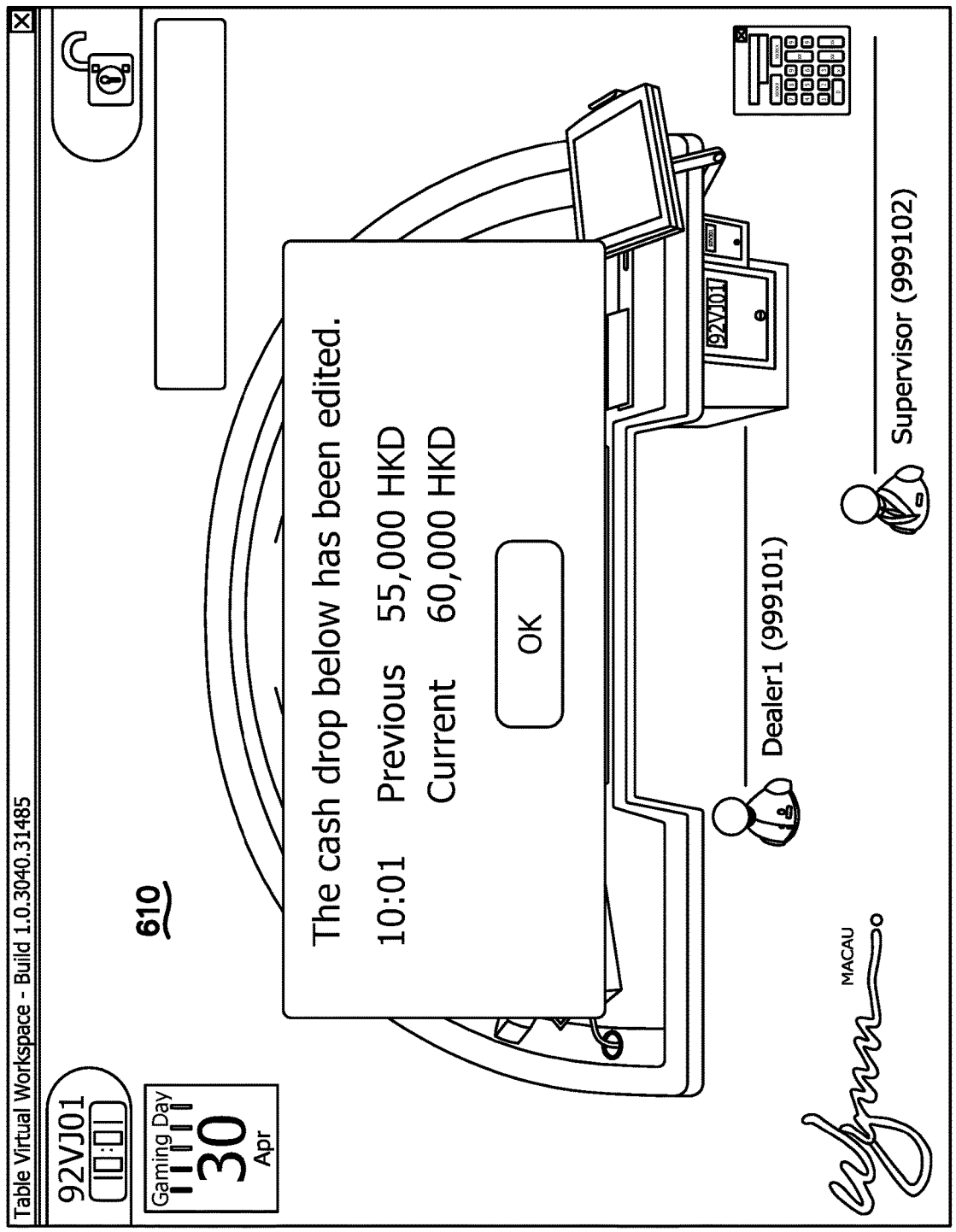
Figure 10A:
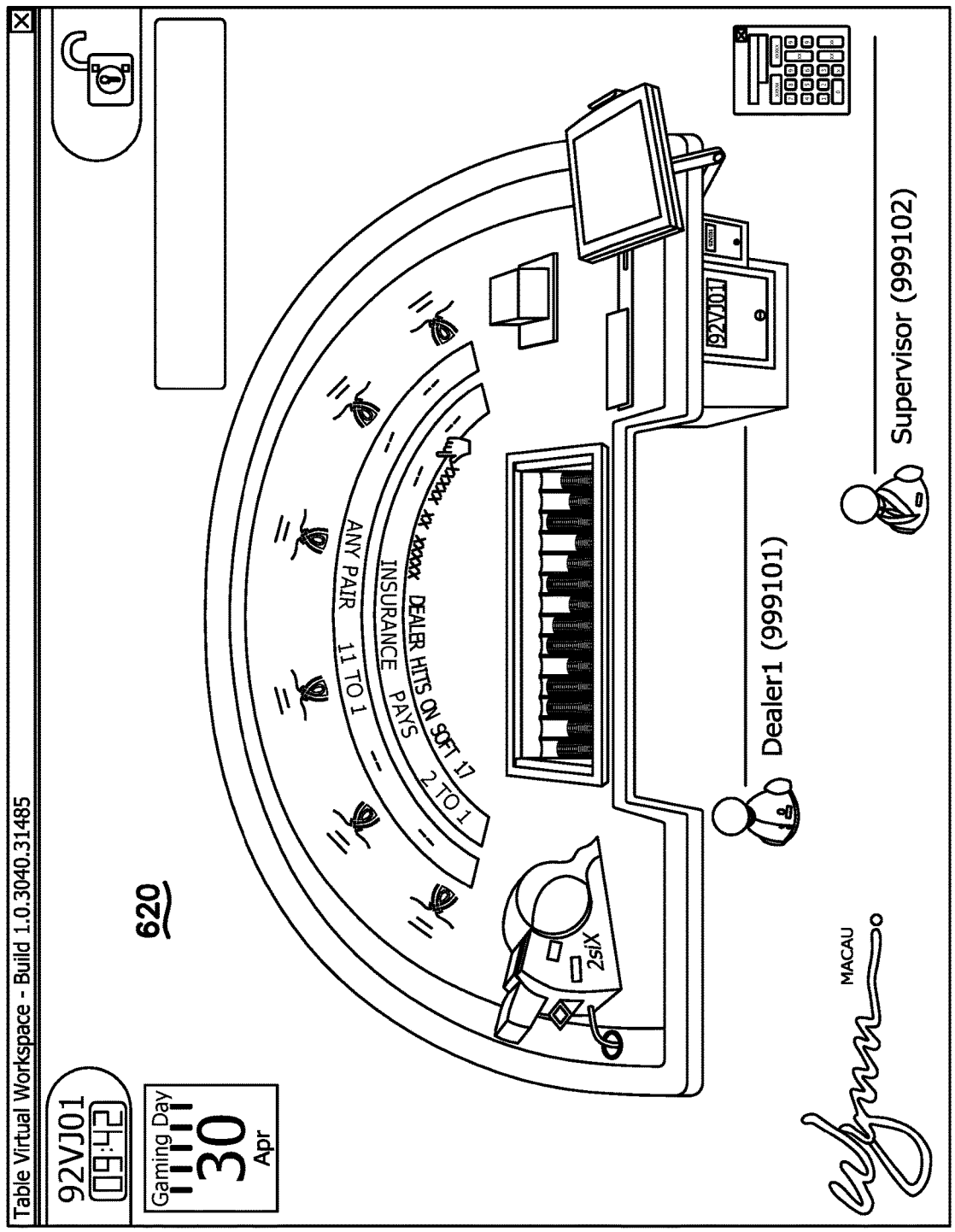
Figure 11B:
Figure 11C:
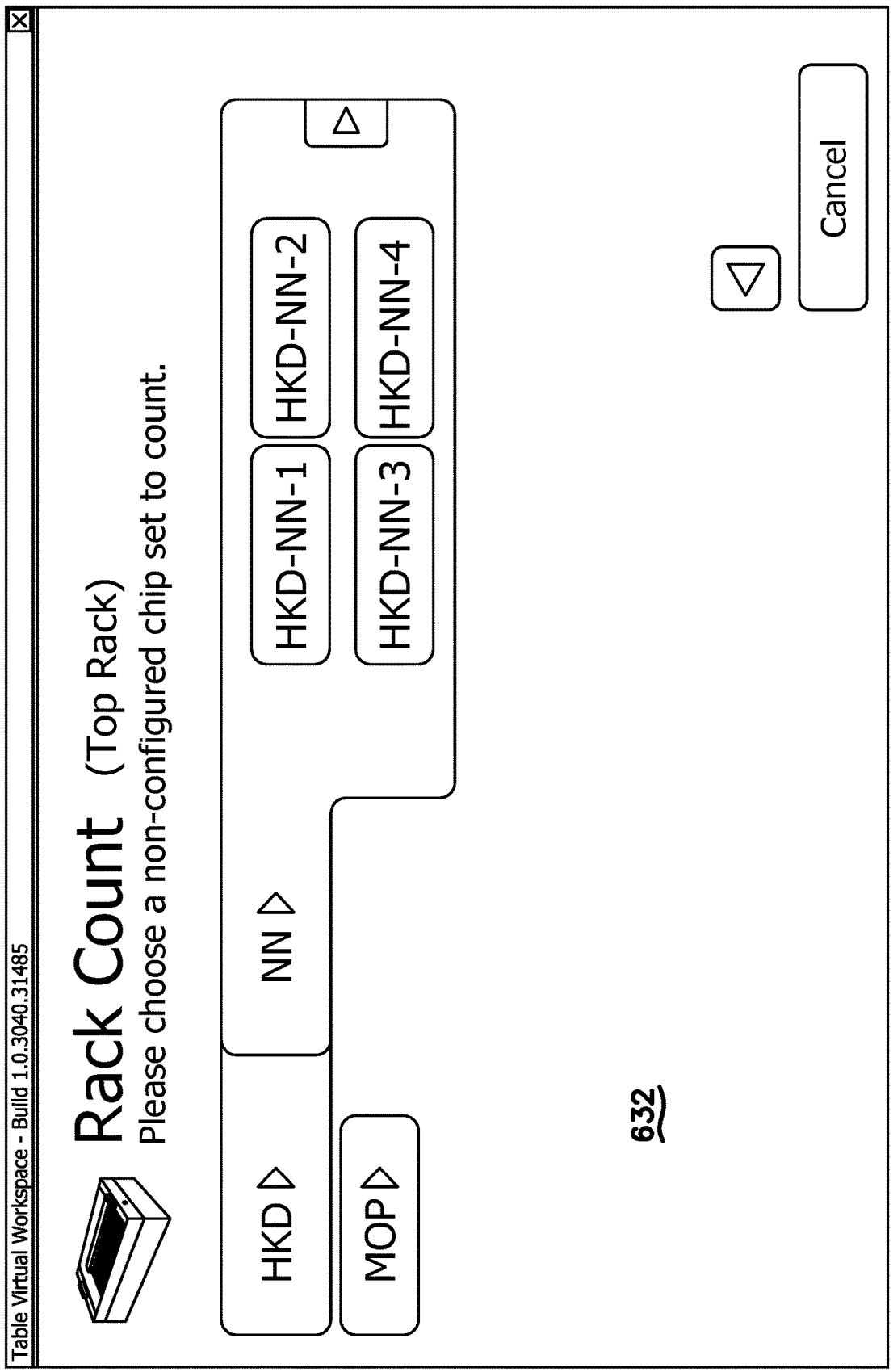
Figure 11D:
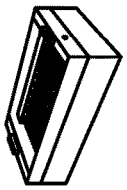
Figure 11E:
Figure 11F:
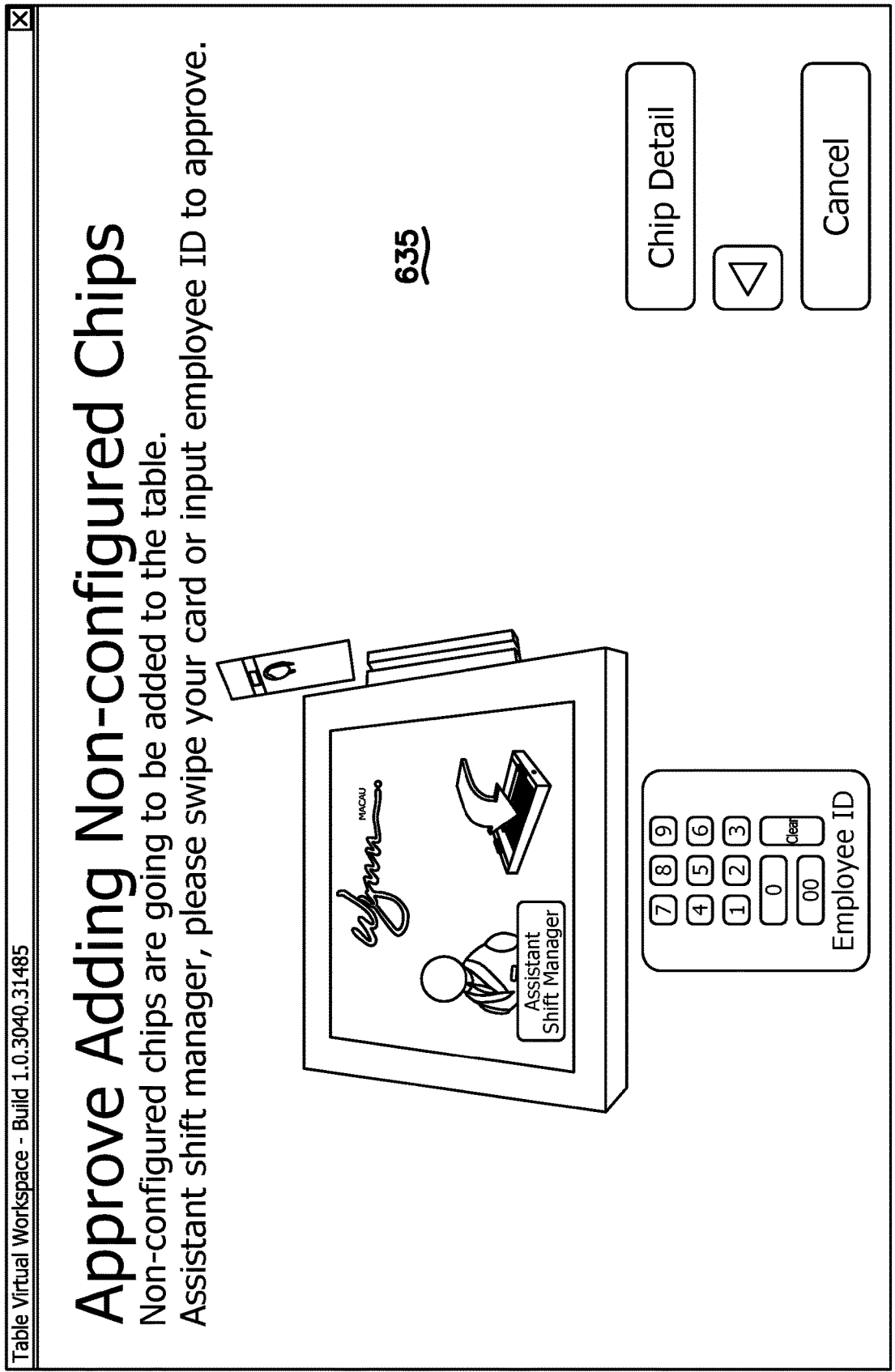
Figure 11I:
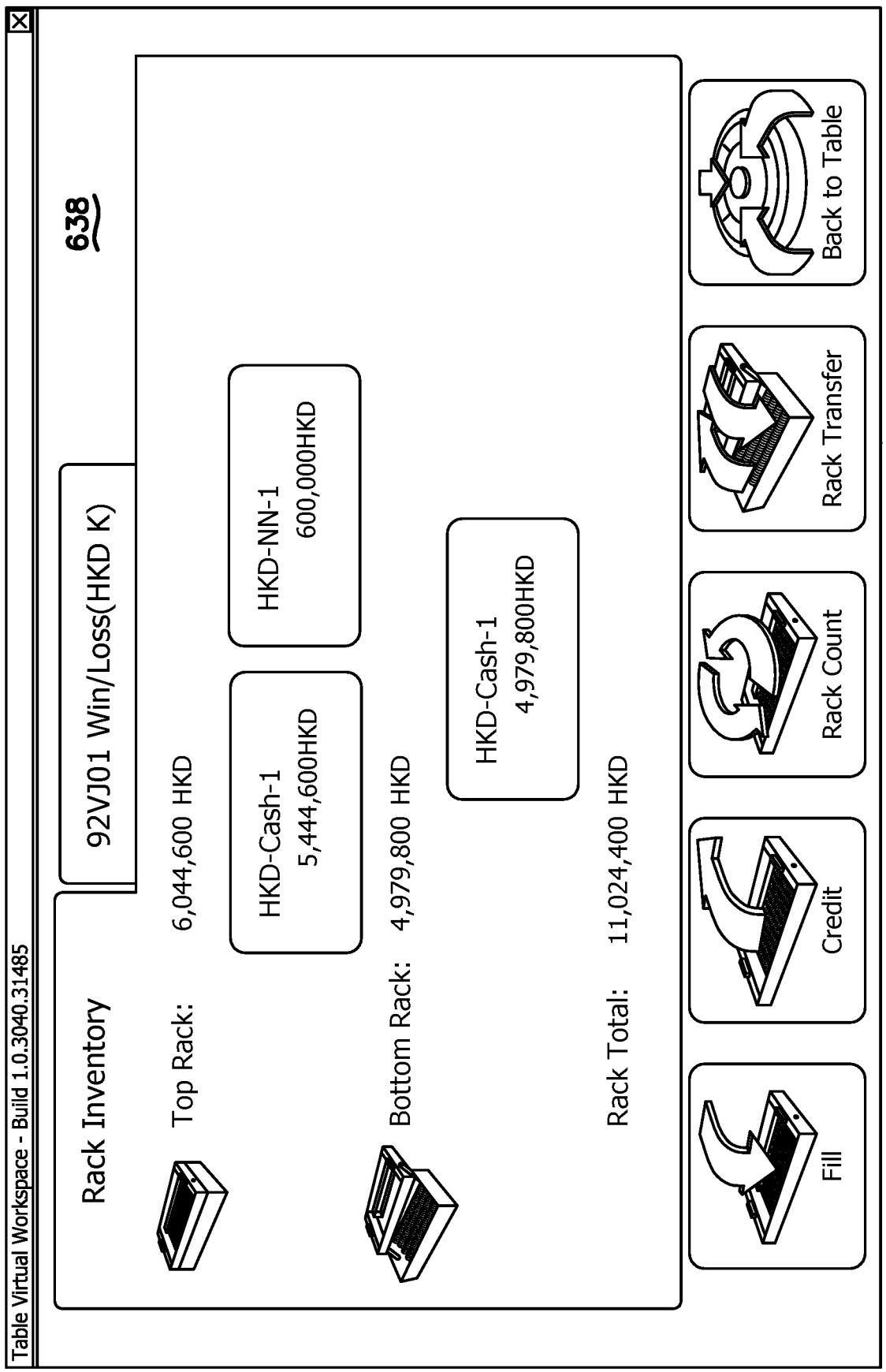
Figure 12A:
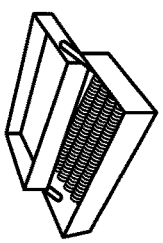
Figure 12E:
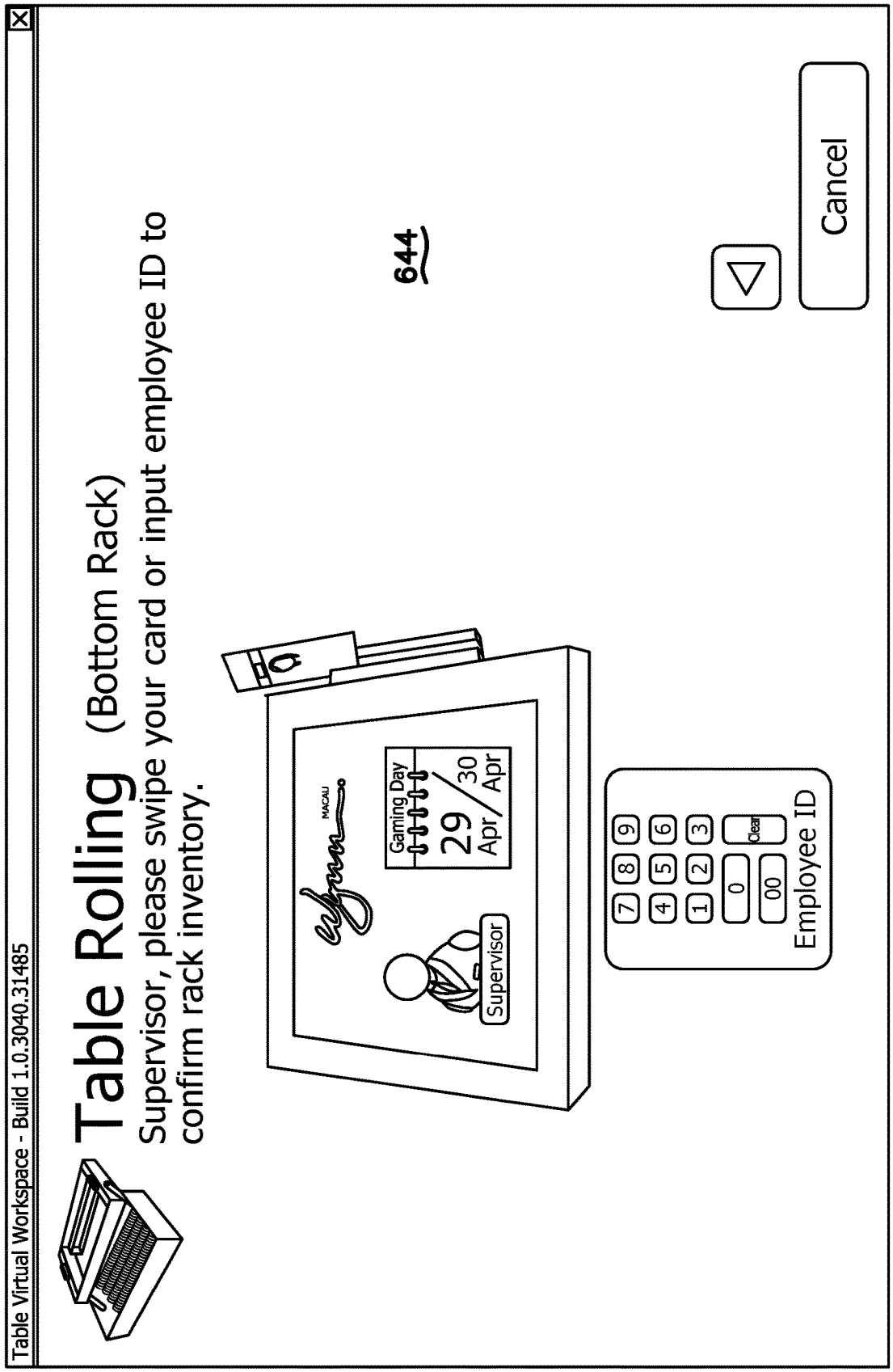
Figure 12F:
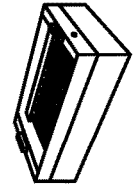
Figure 12J:
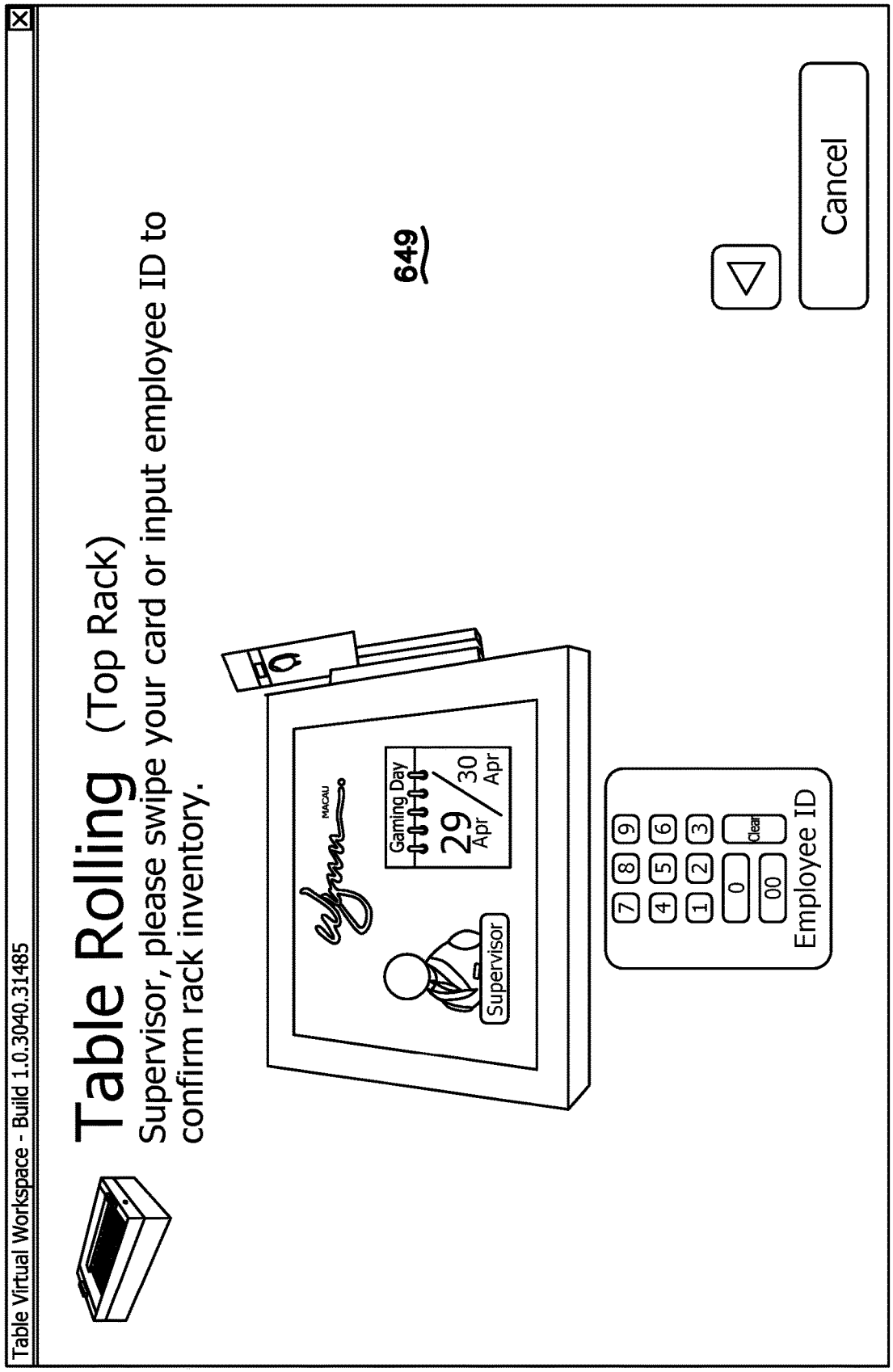
Figure 12K:
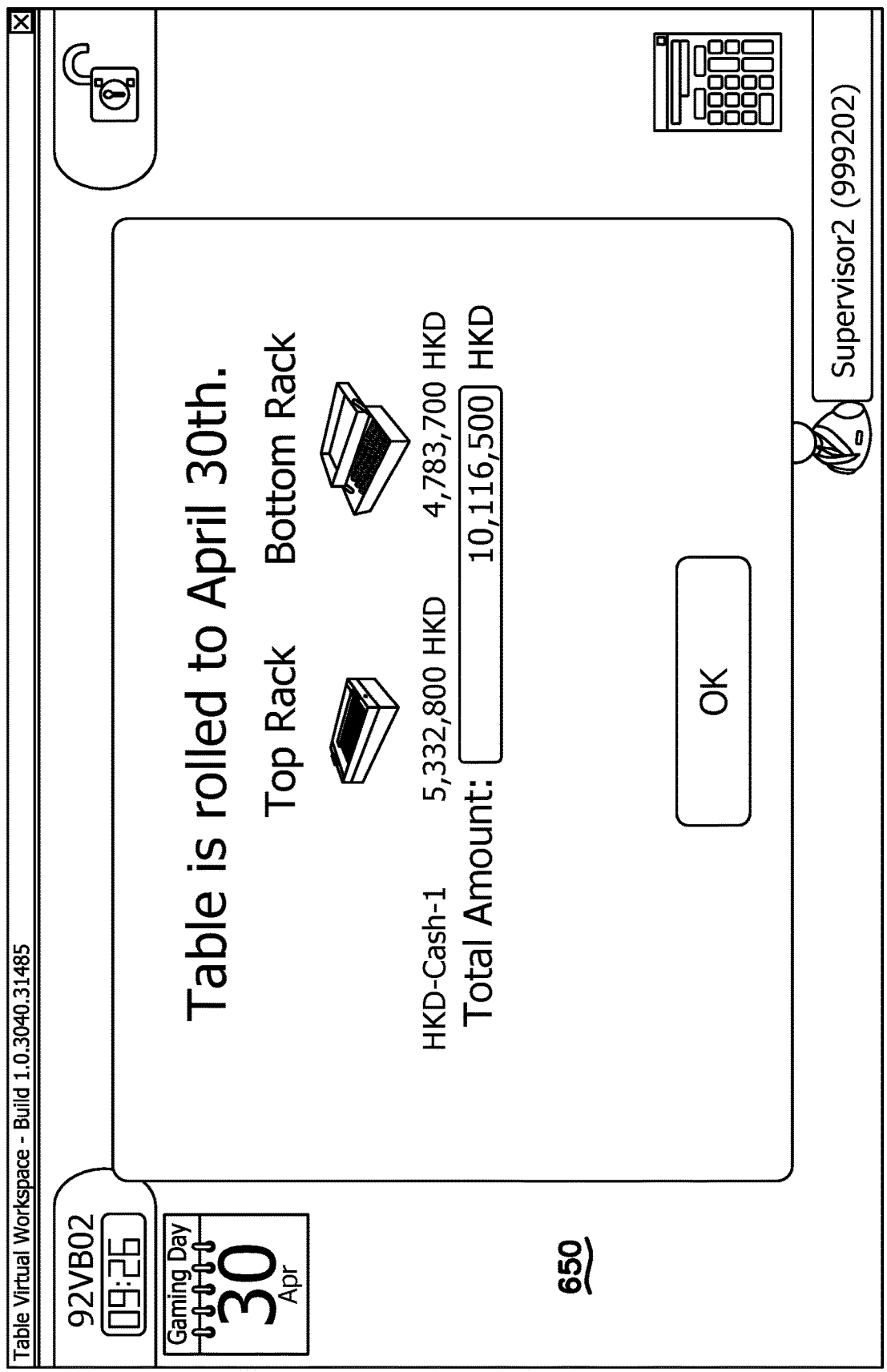
Figure 13B:
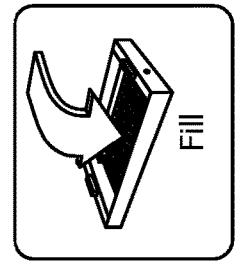
Figure 14A:
Figure 14C:
Figure 14E:

FIGS. 7a-7x illustrate user screen shots 550-573 of a chip bank virtual workspace according to the embodiments of the present invention. Screen shots 550-553 show sign in processes for accessing the chip bank. The sign in procedures include inputting a username and password and swiping a user card. Screen shots 554-557 show historical data regarding chip bank transactions by date. Screen shots 558-559 show chip bank inventory data. Screen shots 560-566 chip bank shift rolling procedures. Screen shots 567-573 show procedures for creating an outside transfer in request.

FIGS. 8a-8l illustrate user screen shots 580-591 of an income control virtual workspace according to the embodiments of the present invention. Screen shots 580-582 show sign in procedures for an income control virtual workspace. Screen shot 583 allows a user to select an accounting period. Screen shots 584-590 show transaction histories (fill, credit, cash drops and voucher drops). Screen shot 591 shows a table status.

FIGS. 9a-9k illustrate user screen shots 600-610 of a cash drop procedure according to the embodiments of the present invention. Screen shots 600-610 show cash drop GUIs allowing a dealer to undertake cash drops.

FIGS. 10a-10h illustrate user screen shots 620-627 of a rack count according to the embodiments of the present invention. Screen shots 620-634 show rack count GUIs allowing a dealer to undertake rack counts.

FIGS. 11a-11i illustrate user screen shots 630-638 of non-configured chip rack count procedures according to the embodiments of the present invention.

FIGS. 12a-12k illustrate user screen shots 640-650 of table rolling procedure according to the embodiments of the present invention.

FIGS. 13a-13e illustrate user screen shots 660-664 of a table win/loss procedure according to the embodiments of the present invention.

Figure 14D:
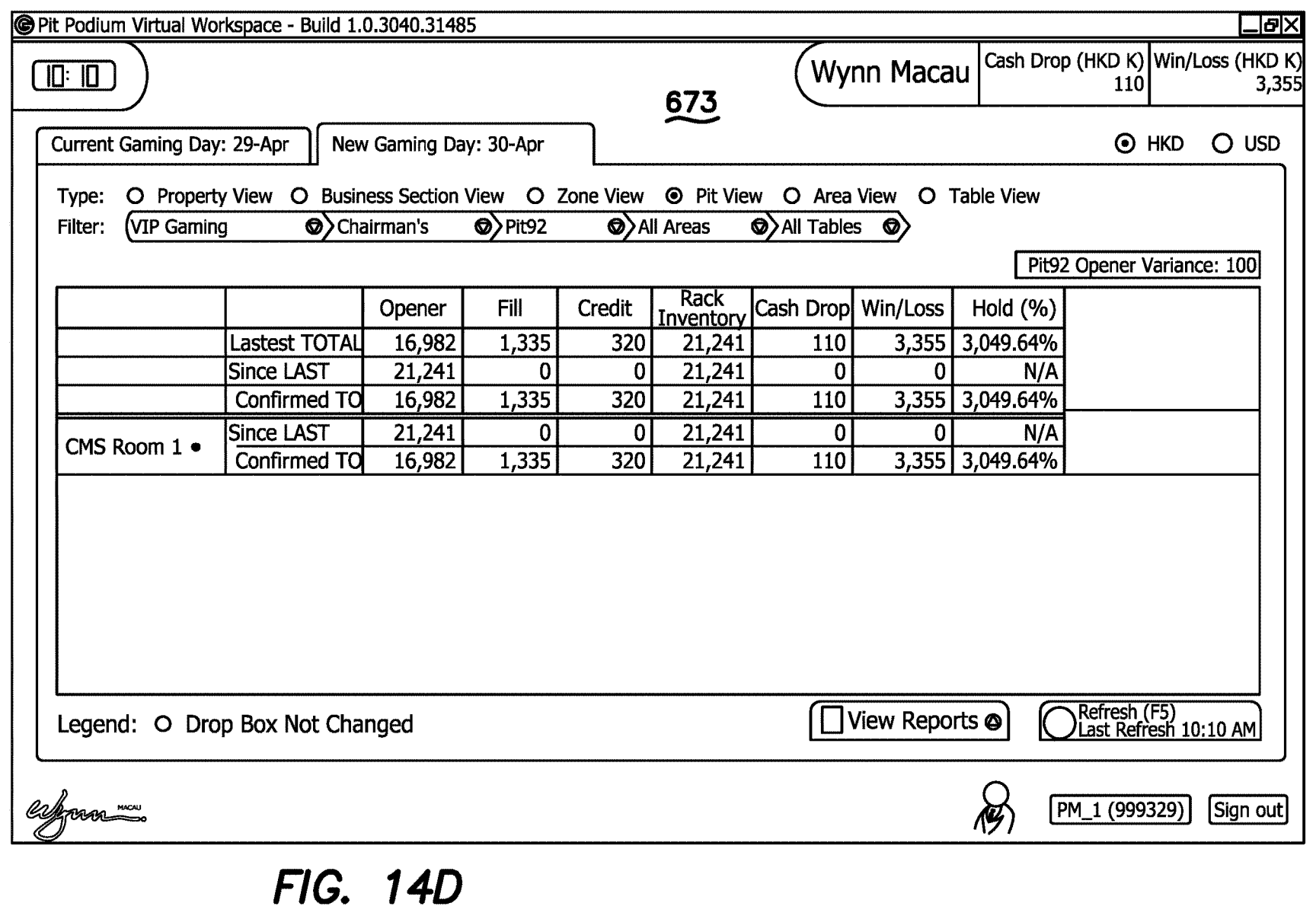

FIGS. 14a-14f illustrate user screen shots 670-675 of a pit podium according to the embodiments of the present invention.

Although the invention has been described in detail with reference to several embodiments, additional variations and modifications exist within the scope and spirit of the invention.

We claim:

1. A chip management system comprising:
   a gaming table workstation configured to display a virtual table workspace, the virtual table workspace comprising:
   a gaming table image that corresponds to a gaming table associated with the gaming table workstation;
   a credit request button that is configured to initiate a request for a credit of either a first amount of cash chips or a second amount of non-negotiable chips;
   a fill request button that is configured to initiate a request for a fill of a third amount of cash chips; and
   a confirmation window that is displayed in response to a selection of the credit request button, the confirmation window configured to display a confirmation of the first amount of cash chips and the second amount of non-negotiable chips; and
   a cage workstation configured to display a front window workspace, the front window workspace comprising:
   a front-counter image that corresponds to a front counter associated with the front window workspace; and
   a fill interface configured to respond to the request for the fill of the third amount of cash chips.

2. The chip management system of claim 1, wherein:
   the virtual table workspace further comprises:
   a transaction window comprising:
   a first field corresponding to a first transaction amount of cash chips; and
   a second field corresponding to a second transaction amount of non-negotiable chips, wherein, the first field and the second field are displayed simultaneously.

3. The chip management system of claim 2, wherein:
   the chip management system further comprises a separate workstation that is coupled to the gaming table workstation;
   the separate workstation is operatively coupled to the gaming table workstation by a business event bus; and
   one or more of the first transaction amount of cash chips or the second transaction amount of non-negotiable chips are communicated from the gaming table workstation to the separate workstation using the business event bus.

4. The chip management system of claim 1, wherein:
the confirmation window further comprises:
   a time that the request for the credit was initiated; and
   an indication whether a credit of cash chips or non-negotiable chips is being requested.

5. The chip management system of claim 1, wherein:
the cage workstation is a first cage workstation;
the chip management system further comprises a second cage workstation; and
the chip management system is configured to route the request for the fill of the third amount of cash chips to either the first cage workstation or the second cage workstation.

6. The chip management system of claim 1, wherein:
the virtual table workspace further comprises a chip credit interface that includes an option to credit the first amount of cash chips or the second amount of non-negotiable chips.

7. The chip management system of claim 1, wherein:
the virtual table workspace further comprises a chip count interface that includes fields for counting a first denomination of cash chips and a second denomination of non-negotiable chips.

8. A table workstation comprising:
a gaming table workstation configured to display a virtual table workspace, the virtual table workspace comprising:
   a gaming table image;
   a credit request button positioned around a periphery of the gaming table image, the credit request button configured to initiate a request for a credit of either or both of a first type of chips or a second type of chips that are non-negotiable;
   a fill request button positioned around the periphery of the gaming table image, the fill request button configured to initiate a request for a fill of the first type of chips that have a cash value; and
   a confirmation window that is displayed in response to a selection of either the credit request button or the fill request button, the confirmation window configured to display a confirmation for the request for the credit of the second type of chips that are non-negotiable and the request for the fill of the first type of chips that have the cash value.

9. The table workstation of claim 8, wherein:
the table workstation is connected to a cage workstation via a business event bus; and
the cage workstation is configured to display a front window workspace that includes a fill interface configured to respond to the request to fill the first type of chips using the business event bus.

10. The table workstation of claim 9, wherein:
the cage workstation is configured to respond to multiple requests from multiple table workstations using the business event bus.

11. The table workstation of claim 9, wherein:
the request for the credit includes a first amount of the first type of chips and a second amount of the second type of chips; and
the cage workstation is configured to respond to the request with a third amount of the first type of chips that is equal to the first amount plus the second amount.

12. The table workstation of claim 8, wherein:
the virtual table workspace further comprises a chip count interface that includes fields for counting denominations of the first type of chips and the second type of chips.

13. A casino management system comprising:
a gaming table workstation configured to display a virtual table workspace, the virtual table workspace comprising:
   a credit request button that is configured to initiate a request for a credit of either cash chips or non-negotiable chips; and
   a fill request button that is configured to initiate a request for a fill of cash chips;
a first cage workstation configured to display a first front window workspace that includes a first fill interface configured to respond to the request for the credit of cash chips; and
a second cage workstation configured to display a second front window workspace that includes a second fill interface configured to respond to the request for the credit of cash chips, wherein
the gaming table workstation is configured to display a confirmation window that includes a confirmation for a first amount of cash chips and a second amount of non-negotiable chips in response to the credit request.

14. The casino management system of claim 13, wherein:
the casino management system further comprises a business event bus; and
the gaming table workstation, the first cage workstation, and the second cage workstation are operably connected by the business event bus.

15. The casino management system of claim 14, wherein:
the casino management system further comprises a pit workstation that is operatively coupled to the business event bus.

16. The casino management system of claim 15, wherein:
the pit workstation is configured to display a pit podium workspace that includes an interface for tracking the non-negotiable chips received at a gaming table associated with the gaming table workstation.

17. The casino management system of claim 16, wherein:
the pit podium workspace includes an interface for tracking cash chips and non-negotiable chips received from a plurality of gaming tables associated with the pit workstation.

18. The casino management system of claim 13, wherein:
the first cage workstation and the second cage workstation are configured to fill cash chips in exchange for the credit of either or both of cash chips or non-negotiable chips.

* * * * *